United States Patent [19]
Pall et al.

[11] Patent Number: 6,074,869
[45] Date of Patent: Jun. 13, 2000

[54] FIBROUS WEB FOR PROCESSING A FLUID

[75] Inventors: David B. Pall, Roslyn Estates; Richard L. Manteuffel, Centerport, both of N.Y.

[73] Assignee: Pall Corporation, East Hills, N.Y.

[21] Appl. No.: 08/776,300

[22] PCT Filed: Jul. 27, 1995

[86] PCT No.: PCT/US95/09972

§ 371 Date: Apr. 11, 1997

§ 102(e) Date: Apr. 11, 1997

[87] PCT Pub. No.: WO96/03194

PCT Pub. Date: Feb. 8, 1996

Related U.S. Application Data

[63] Continuation-in-part of application No. 08/281,772, Jul. 28, 1994, Pat. No. 5,582,907, application No. 08/376,190, Jan. 20, 1995, Pat. No. 5,846,438, application No. 08/389,264, Feb. 16, 1995, Pat. No. 5,586,997, and application No. 08/429,731, Apr. 25, 1995, Pat. No. 5,714,073.

[51] Int. Cl.[7] .............................. B01L 11/00; B01D 27/02; C12M 3/02; D04H 1/04
[52] U.S. Cl. .................. 435/286.5; 435/91.2; 435/288.6; 422/101
[58] Field of Search .............................. 435/286.5, 288.6, 435/91.2; 422/101

[56] References Cited

U.S. PATENT DOCUMENTS

| | | |
|---|---|---|
| 2,399,258 | 4/1946 | Taylor . |
| 2,574,221 | 11/1951 | Modigliani . |
| 2,656,873 | 10/1953 | Stephens . |
| 2,664,375 | 12/1953 | Slayter . |
| 2,785,442 | 3/1957 | Boggs . |
| 2,939,761 | 6/1960 | Stein . |
| 3,051,602 | 8/1962 | Schairbaum . |
| 3,134,704 | 5/1964 | Modigliani . |
| 3,266,966 | 8/1966 | Patchell . |
| 3,314,840 | 4/1967 | Lloyd et al. . |
| 3,412,865 | 11/1968 | Lontz et al. . |
| 3,438,587 | 4/1969 | Jackson . |

(List continued on next page.)

FOREIGN PATENT DOCUMENTS

| | | |
|---|---|---|
| 0284232 | 9/1988 | European Pat. Off. . |
| 313348 | 4/1989 | European Pat. Off. . |
| 397403 | 11/1990 | European Pat. Off. . |
| 0572106 | 12/1993 | European Pat. Off. . |
| 0597577 | 5/1994 | European Pat. Off. . |
| 4237604 | 5/1994 | Germany . |
| 54-046811 | 4/1979 | Japan . |
| 9218677 | 10/1992 | WIPO . |
| 9304763 | 3/1993 | WIPO . |
| 9409200 | 4/1994 | WIPO . |

OTHER PUBLICATIONS

XP 002080046 Derwent Publication, AN 92–396048 (1991).

Schwartz et al., "New Concepts . . . Melt–Blown . . . Microfibers . . . Co–Spun" Mar. 1987, Int'l Nonwovens Tech Conf., p. 206–220 (HiltonHead, SC).

"Breakthrough in Nonwoven Webs Made by Improved Melt–Blowing . . . ", Biax–Fiberfilm Corp. Technical Bulletin 10B, Beenah, WI.

"Melt Blown", J and M Laboratories, Inc., Brochure, Dawsonville, GA.

Kerr, "Hydrophilic Nylon", paper presented Mar. 8–9, 1994, Charlotte, N.C. (Allied Fibers).

Websters Third New International Dictionary, p. 623, 1993.

Kirk–Othmer Concise Encyclopedia of Chemical Technology, pp. 349–350, 1985.

*Primary Examiner*—Daniel Zirker
*Attorney, Agent, or Firm*—Leydig, Voit & Mayer, Ltd

[57] ABSTRACT

The present invention provides a melt-blown fibrous web with a high degree of weight uniformity. The present invention also provides methods of preparing, processing and using such fibrous webs, as well as products incorporating such fibrous webs.

44 Claims, 15 Drawing Sheets

U.S. PATENT DOCUMENTS

| | | |
|---|---|---|
| 3,441,468 | 4/1969 | Siggel et al. . |
| 3,454,534 | 7/1969 | Crovatt, Jr. . |
| 3,459,613 | 8/1969 | Copenhefer et al. . |
| 3,477,892 | 11/1969 | Plymale . |
| 3,490,975 | 1/1970 | Lightwood et al. . |
| 3,506,420 | 4/1970 | Jackson et al. . |
| 3,526,557 | 9/1970 | Taylor . |
| 3,579,403 | 5/1971 | Stroop . |
| 3,595,245 | 7/1971 | Buntin . |
| 3,615,995 | 10/1971 | Buntin . |
| 3,650,866 | 3/1972 | Prentice . |
| 3,676,239 | 7/1972 | Soehngen . |
| 3,676,242 | 7/1972 | Prentice . |
| 3,704,198 | 11/1972 | Prentice . |
| 3,705,068 | 12/1972 | Dobo et al. . |
| 3,755,527 | 8/1973 | Keller et al. . |
| 3,787,265 | 1/1974 | McGinnis et al. . |
| 3,795,571 | 3/1974 | Prentice . |
| 3,801,400 | 4/1974 | Vogt et al. . |
| 3,825,379 | 7/1974 | Lohkamp et al. . |
| 3,825,380 | 7/1974 | Harding et al. . |
| 3,833,438 | 9/1974 | Kaneko et al. . |
| 3,836,416 | 9/1974 | Ropiequet . |
| 3,849,241 | 11/1974 | Butin et al. . |
| 3,854,917 | 12/1974 | McKinney et al. . |
| 3,933,557 | 1/1976 | Pall . |
| 3,940,302 | 2/1976 | Matthews et al. . |
| 3,978,185 | 8/1976 | Buntin et al. . |
| 4,021,281 | 5/1977 | Pall . |
| 4,032,688 | 6/1977 | Pall . |
| 4,048,364 | 9/1977 | Harding et al. . |
| 4,113,794 | 9/1978 | Thompson et al. . |
| 4,116,738 | 9/1978 | Pall . |
| 4,130,602 | 12/1978 | Thompson . |
| 4,136,133 | 1/1979 | Thompson . |
| 4,172,820 | 10/1979 | Lundberg et al. . |
| 4,226,751 | 10/1980 | Lundberg et al. . |
| 4,238,175 | 12/1980 | Fujii et al. . |
| 4,240,864 | 12/1980 | Lin . |
| 4,297,454 | 10/1981 | Thompson . |
| 4,340,479 | 7/1982 | Pall . |
| 4,380,570 | 4/1983 | Schwartz . |
| 4,415,608 | 11/1983 | Epperson et al. . |
| 4,416,777 | 11/1983 | Kuroda et al. . |
| 4,428,908 | 1/1984 | Ashley et al. . |
| 4,475,972 | 10/1984 | Wong . |
| 4,477,575 | 10/1984 | Vogel et al. . |
| 4,478,620 | 10/1984 | Tamura . |
| 4,491,012 | 1/1985 | Peterson . |
| 4,523,995 | 6/1985 | Pall et al. . |
| 4,552,707 | 11/1985 | How . |
| 4,594,202 | 6/1986 | Pall et al. . |
| 4,617,124 | 10/1986 | Pall et al. . |
| 4,650,506 | 3/1987 | Barris et al. . |
| 4,689,003 | 8/1987 | Schreiner et al. . |
| 4,701,267 | 10/1987 | Watanabe et al. . |
| 4,726,901 | 2/1988 | Pall et al. . |
| 4,731,215 | 3/1988 | Schwartz . |
| 4,738,740 | 4/1988 | Pinchuk et al. . |
| 4,764,324 | 8/1988 | Burnham . |
| 4,774,001 | 9/1988 | Degen et al. . |
| 4,786,603 | 11/1988 | Degen et al. . |
| 4,810,470 | 3/1989 | Burkhardt et al. . |
| 4,826,642 | 5/1989 | Degen et al. . |
| 4,838,972 | 6/1989 | Daamen et al. . |
| 4,839,297 | 6/1989 | Freitag et al. . |
| 4,849,340 | 7/1989 | Oberhardt . |
| 4,855,063 | 8/1989 | Carmen et al. . |
| 4,857,453 | 8/1989 | Ullman et al. . |
| 4,880,548 | 11/1989 | Pall et al. . |
| 4,883,764 | 11/1989 | Kloepfer . |
| 4,889,630 | 12/1989 | Reinhardt et al. . |
| 4,921,654 | 5/1990 | Hou et al. . |
| 4,925,566 | 5/1990 | Bardot et al. . |
| 4,925,572 | 5/1990 | Pall . |
| 4,936,998 | 6/1990 | Nishimura et al. . |
| 4,943,522 | 7/1990 | Eisinger et al. . |
| 4,983,292 | 1/1991 | Morgan, Jr. ............................ 210/491 |
| 4,999,080 | 3/1991 | Boich . |
| 4,999,287 | 3/1991 | Allen et al. . |
| 5,006,464 | 4/1991 | Chu et al. . |
| 5,006,474 | 4/1991 | Horstman et al. . |
| 5,030,710 | 7/1991 | Speranza et al. . |
| 5,061,170 | 10/1991 | Allen et al. . |
| 5,069,945 | 12/1991 | Wrasidlo . |
| 5,079,080 | 1/1992 | Schwartz . |
| 5,079,174 | 1/1992 | Buck et al. . |
| 5,089,122 | 2/1992 | Chmiel . |
| 5,102,484 | 4/1992 | Allen et al. . |
| 5,114,673 | 5/1992 | Berger et al. . |
| 5,122,211 | 6/1992 | Roach . |
| 5,137,635 | 8/1992 | Seita et al. . |
| 5,145,689 | 9/1992 | Allen et al. . |
| 5,160,486 | 11/1992 | Schlipfenbacker et al. . |
| 5,160,746 | 11/1992 | Dodge, II et al. . |
| 5,240,862 | 8/1993 | Koenhen et al. . |
| 5,254,668 | 10/1993 | Dominguez et al. . |
| 5,260,222 | 11/1993 | Patel et al. . |
| 5,266,219 | 11/1993 | Pall et al. . |
| 5,271,895 | 12/1993 | McCroskey et al. . |
| 5,273,565 | 12/1993 | Milligan et al. . |
| 5,298,165 | 3/1994 | Oka et al. . |
| 5,302,346 | 4/1994 | Vogel et al. . |
| 5,306,536 | 4/1994 | Moretz et al. . |
| 5,330,715 | 7/1994 | Blake et al. . |
| 5,369,179 | 11/1994 | Havens . |
| 5,393,493 | 2/1995 | Makino et al. . |
| 5,498,340 | 3/1996 | Granger et al. . |
| 5,582,907 | 12/1996 | Pall . |
| 5,586,997 | 12/1996 | Pall et al. . |

FIBROUS WEB FOR PROCESSING A FLUID

This application is a continuation-in-part application of application Ser. No. 08/281,772, filed Jul. 28, 1994, now U.S. Pat. No. 5,582,907; Ser. No. 08/376,190, filed Jan. 20, 1995, Now U.S. Pat. No. 5,846,438; Ser. No. 08/389,264, filed Feb. 16, 1995; now U.S. Pat. No. 5,586,997; and Ser. No. 08/429,731, filed Apr. 25, 1995 now U.S. Pat. No. 5,714,073, which are incorporated by reference in their entireties.

TECHNICAL FIELD OF THE INVENTION

The present invention pertains to fibrous webs, particularly melt-blown fibrous webs, and their preparation. Such fibrous webs are particularly suitable as filtration media, and for separating plasma or serum from blood. They are also useful wherever a substantially uniform porous medium is desirable.

BACKGROUND OF THE INVENTION

Melt-Blowing Processes

In one existing melt-blowing process, molten resin is extruded through a row of linearly disposed holes drilled in linear array on about 1 to 2 mm centers into a flat surface about 1 to 2 mm wide, with the surface being located as shown in FIG. 1 at the apex of a member having a triangular cross section, and with the angles at the apex being about 45° to 60° to the center line. Surrounding the apex 11 as shown in FIG. 1 are two slots 12, 13, one on each side, through which is delivered heated air, which attenuate the molten resin extruded through the holes, thereby forming a stream of fibers. The fibers are collected on one side of a moving screen which is separated from the nozzle tips by about 10 or more cm, with the other side of the screen being connected to a suction blower. In operation, most of the fibers are collected on the screen to form a low density web with a rough surface; however, a significant proportion of the fibers escape into the surroundings, and a suction hood is provided from which they are collected and sent to waste.

The collected web is quite weak, with tensile strengths well below about 1.5 kg/cm$^2$. The fibers have a wide size distribution, with the largest fibers being ten or more times larger than the smallest, and the average fiber diameter is about five to seven or more times the smallest fiber diameter. Many of the fibers are twinned, with a twin being defined as two parallel fibers adhering to each other along a length of 20 or more times their average diameters, while others are roped, i.e., consist of two or more fibers twisted about each other in a form resembling a rope. Roped fibers behave in practice, for example in filtration, much like a single fiber of diameter about equal to that of the rope. Both twinning and roping cause the collected web to have a high pressure drop and low filtration efficiency. Fibers bonded in a twin are less efficient in a filter than two separate fibers. Shot—i.e., small pellets of unfiberized resin interspersed in the web—are also a problem. Typically, the collected web produced as described above reflects a compromise between making shot and rope. This web also tends to have a rough, rather fuzzy surface, that is undesirable for many applications, for example, for use in disposable clothing.

The system for producing webs described above is inefficient by virtue of its geometry. When the two air streams converge, a portion of the energy required to form fibers of the resin is dissipated in proportion to the component of their velocities perpendicular to the center line of the apparatus. A further inefficiency is the rectangular shape of the air stream which acts on each nozzle; if for example 0.5 mm diameter holes are located on 2 mm centers, a rectangular air stream 2 mm wide acts on each 0.5 mm diameter resin passageway. Because the liquid stream is circular, that portion of the air issuing from a corner of the rectangle farthest from the resin nozzle is relatively ineffective, generating a high degree of turbulence with a relatively small contribution to fiber formation. As a result of these inefficiencies, the cost of energy to compress and heat the air in this process is much larger than it would be if each resin nozzle were to receive its own supply of air through a circular annulus. Due to the high volume of air required to fiberize a given weight of resin, the distance from the resin nozzle outlet to the fiber collection surface in usual practice exceeds about 10 to 13 cm, and this relatively long passage through very turbulent air causes the undesirable roping and twinning in the fibers of the collected web. Attempting to operate at much less than 10 cm makes collection on the vacuum screen difficult, unless the fibers are so hot as to be semi-molten, which produces a near to solid product which is inefficient as a filter. In a basic deficiency of this system, the molten resin is disrupted external to the fiberizing die and is simultaneously attenuated to form fibers; there is no clear delineation between disruption and fiber formation, and as a result control of fiber formation is poor.

Another existing system producing attenuated fibers provides for disrupting the molten resin externally to the die. The fibers produced are collected in a randomly oriented heterogenous intertwined arrangement on the mandrel. By the time the fibers reach the mandrel, they are either already broken up or disrupted into discontinuous lengths, or they are still attached to the orifice from which they are spun by a portion which is molten.

The present invention employs self-contained individual fiberizing nozzles comprising an annular air passage. These fiberizing nozzles are capable of making fibrous sheet media with average fiber diameters of about 2 μm or less, and can be operated at a die-to-collector distance (hereinafter DCD) in the range of about 2.5 to about 11.0 cm, e.g., in the range of about 2.8 to about 9.0 cm, and make product with controlled orientation of the fibers.

Such a fiberizing nozzle is depicted in FIG. 2, wherein the fiberizing nozzle 21 contains a capillary 22 through which the molten resin is pumped and a circular annulus 23 through which hot air is delivered. The pumped resin exits the capillary 22 into the resin disruption zone 24 and then into the nozzle channel 25 where the resin, now fragmented into tiny droplets, is carried in the air stream out of the nozzle tip 26, beyond which the individual tiny droplets are elongated into fibers.

Because the air supply is used more efficiently and is correspondingly less in proportion to the weight of the product web, the fiberized product of the present invention can be collected as a web by impinging it on a solid collecting surface, as opposed to the vacuum backed screen of the inefficient apparatus summarized earlier. In another marked improvement on the prior art, the DCD (distance between the nozzle tip 26 in FIG. 2 and the target collecting surface) may be shortened to under about 5.5 cm, illustratively, about 2.5 to about 5.5 cm, e.g., about 2.8 to about 5.5 cm, i.e., about one half or less than used for other systems, thereby reducing the width of the fiber stream and further improving fiber collection efficiency.

The fibers of the instant invention are formed within the fiberizer nozzle, and can be seen by direct observation through a microscope to be fully formed and not in contact with the orifice out of which the fiber stream passes. The absence in the invention of disruption external to the orifice is essential to the formation of a web in which the fibers are continuous and distinctly oriented in a controlled fashion.

Thus the fibers of the present invention are generated, controlled, and collected in a manner which produces a web of oriented fibers, contrasted with an heterogeneous intertwined arrangement for making fibers, that has no control over the path of the fibers.

While finer fibers and improved collection are made possible in existing systems by the use of individual nozzles, their use has the disadvantage that the product web has a stripy appearance. The stripes reflect the spacing between adjacent nozzles.

The present invention provides for ameliorating at least some of the disadvantages of the prior art melt-blown fibrous webs and the methods for producing them.

The present invention provides a convenient means to collect the output of individual fiberizing nozzles in the form of a web which is not only substantially free of striping, but is characterized by a high degree of uniformity, for example by weight distribution varying less than about 1% over a fifty cm span. Such a degree of uniformity makes the product useful in applications such as diagnostic devices, as well as for other applications where near to perfect uniformity is required. The products of the present invention are substantially free of shot and roping.

Diagnostic Devices

As indicated above, the present invention provides a uniform product that is especially desirable for use in diagnostic devices.

Many body fluid processing protocols, particularly those involving diagnostic testing, include determining whether a particular substance, e.g., a target analyte, is present in the body fluid. Many of these tests rely on calorimetric or spectrophotometric evaluation of a reaction of a fluid component with one or more specific reagents. Other tests include, for example, evaluating changes in pH or electrical conductance to determine the presence of the analyte. However, these tests may yield less than optimum results, since, for example, the fluid may fail to efficiently wet the test device, and/or other substances present in the body fluid may interfere with the particular substance to be analyzed and/or cause difficulties in interpreting the test results.

Illustratively, when the body fluid to be tested is blood, the red color due to the presence of red blood cells and/or the hemoglobin released by hemolyzed red cells may interfere with diagnostic tests which employ color change as part of their procedure. Accordingly, many body fluid testing protocols include separating one or more components from the body fluid before testing. For example, plasma or serum may be separated from blood before subjecting the plasma or serum to analysis, so that cellular material, e.g., red and/or white blood cells, will not interfere with the test results.

One technique for separating plasma or serum from other blood components, for example, cellular components such as red and white blood cells, includes obtaining blood, e.g., from a finger prick, and placing the blood on a blood test strip. The test strip, which includes at least one porous element, allows blood to flow into the strip, and a portion of plasma to be separated from the cells contained in the blood sample. Some test strips may include a plurality of porous elements that allow the passage of plasma or serum therethrough, wherein at least one element may include one or more reagents that react with the analyte so that the presence of the analyte in the plasma or serum may be determined.

However, the prior art test strips suffer from a number of drawbacks. A particular drawback is a lack of product reproducibility, as the strips are difficult to produce with a sufficient degree of uniformity. For example, some strips are insufficiently uniform to provide for efficient and/or reproducible plasma separation. Illustratively, some strips include fibrous webs having a stripy appearance resulting from a lack of uniform fiber distribution, e.g., ridges of fibers. In order to minimize the effects of non-uniformity, some test strips include multiple layers of webs, e.g., about layers or more, to provide for reliable separation. In view of the number of layers, such devices may require a relatively large amount of blood to provide sufficient plasma for a diagnostic test.

Other devices, with or without fibrous media, fail to provide a sufficiently large plasma front ahead of the front of cellular material to allow testing of the plasma without interference from the cellular material, consequently, the failure of these devices to efficiently separate plasma may require the use of a relatively large blood sample to assure that sufficient plasma is available to be tested.

Additionally, since some devices include one or more reagents preplaced in one or more areas of the device a lack of product reproducibility from one device to another may lead to the failure of the plasma to contact the reagent(s) in a particular location and/or to contact the reagent(s) for a sufficient amount of time. For example, since some preplaced reagents are soluble, devices that allow the plasma to pass through too quickly may fail to allow the plasma to dissolve the reagent, leading to an inaccurate test result. Accordingly, due to a lack of uniformity, two devices may provide different test results for the same patient using consecutive drops of blood, and it may be difficult to determine which, if either, of the devices have provided an accurate result.

Furthermore, particularly for some of those strips including at least two porous elements secured to each other, it may be awkward and/or difficult to bond the elements together. Not only is the bond obtained by simply compressing two or more layers or elements together generally weak, but the layers tend to be undesirably compressed when they are pressed together to form the bond, which in turn decreases the effectiveness of plasma separation. Bonding using commercial "sticky" adhesives adversely affects flow from a layer to its neighbor(s); thus, the permeability of the bond, or the area near the bond, may be adversely affected.

Accordingly, there is an ongoing need in the art for body fluid processing devices and methods for using them that provide for efficient separation of at least one desired component of the body fluid in sufficient amounts for analysis. Such processing devices are preferred to be easy to use, whether it is by patients, or by medical personnel such as physicians, nurses, or lab technicians. Moreover, the devices should perform separation in a manner such that the test results are accurate and reproducible.

Additionally, the devices are preferred to allow efficient separation of plasma from blood without removing a significant proportion of the substance(s) or material(s) in the plasma to be analyzed or determined, e.g., glucose, cholesterol, lipids, serum enzymes, nucleic acids, viruses, bacteria, and/or coagulation factors, to name but a few.

The present invention provides for ameliorating at least some of the disadvantages of the prior art test strips and methods for using them. The present invention can also be used for protocols involving the processing of non-biological fluids. These and other advantages of the present invention will be apparent from the description as set forth below.

SUMMARY OF THE INVENTION

The present invention provides at least one substantially uniform fibrous web, which is preferably a melt-blown web.

The melt-blown fibrous web, which is a non-woven web, is substantially uniform with respect to at least one of, and more preferably, at least two of, fiber diameter, weight distribution when measured in both the longitudinal and transverse directions per unit of area, thickness, and voids volume. Preferably, the melt-blown web comprises fibers having a closely controlled average fiber diameter, with a narrow distribution of fiber diameters and a uniform weight distribution.

Embodiments of melt-blown fibrous webs according to the invention are also substantially free of roping, twinning, and shot. In preferred embodiments they can be characterized by a tensile strength in a first direction at least about 1.5 times, and more preferably, several times, the tensile strength in a second direction 90° to the first direction. The melt-blown fibrous web can be further characterized by a highly desirable rate of wicking after it has been contacted by a liquid. The time required for wicking to spread from the point of application over a stated distance is defined hereinafter and referred to as the lateral flow time, or LFT.

In accordance with the present invention, a device for processing a fluid comprises at least one melt-blown substantially uniform fibrous web. Since the melt-blown webs according to the invention are substantially uniform, test devices including these webs provide accurate and reproducible test results from one device to another, and from one sample of fluid, particularly biological fluid, to a second sample of the same fluid.

The present invention also provides a filter element comprising the present inventive melt-blown fibrous web, as well as a method of filtering a fluid comprising passing the fluid through the melt-blown fibrous web. The present invention may include a housing for the filter element.

In addition, the present invention provides a porous composite structure comprising at least one porous sheet containing thereon a melt-blown fibrous non-woven web, wherein no more than about 10% of the pores of the porous sheet are blocked by the melt-blown fibrous non-woven binder web.

The present invention also provides a method of preparing a melt-blown fibrous non-woven web comprising extruding molten resin from two parallel rows of linearly arranged, substantially equally spaced nozzles to form fibers onto the surface of a cylindrical collector having a longitudinal axis arranged parallel to the rows of nozzles, wherein the rows of nozzles are offset from each other and are angled toward each other. The present invention also provides a method for preparing a melt-blown fibrous non-woven web comprising modifying the present inventive melt-blown fibrous non-woven web to alter the Critical Wetting Surface Tension (CWST) and/or voids volume of the web as to obtain a desired wicking rate or Lateral Flow Time (LFT).

Devices and methods according to the present invention provide for efficient processing of fluid, including biological fluid. For example, devices and methods according to the present invention provide for efficient plasma separation from biological fluids such as blood by contacting at least one melt-blown substantially uniform fibrous web with a sample of the biological fluid. The present invention allows analytes of interest in the separated plasma or serum to be determined accurately and reproducibly. Devices and methods according to the invention also provide for efficiently processing plasma that has already been separated from the biological fluid.

In an embodiment, the melt-blown substantially uniform fibrous webs according to the invention are compatible with a variety of other porous media such as other fibrous and/or non-fibrous media, including membranes, for processing biological fluid, and allow plasma to be passed, e.g., wicked, from the melt-blown webs to these other media. In some embodiments, plasma may be further passed from the downstream membrane to at least one additional porous medium, such as, for example, another membrane, and/or a fibrous web, which is preferably a melt-blown substantially uniform fibrous web.

In accordance with devices and methods according to the invention, substances or analytes of interest, such as lipids, enzymes, nucleic acids and/or viruses, that are in the plasma, or may be transported with serum, can be captured or isolated in or on the melt-blown substantially uniform fibrous web and/or the other porous medium or media downstream of the web. These substances or analytes can be detected or quantified in the web and/or the other media. In some embodiments, at least a portion or a component in the sample of the isolated analyte can be amplified and detected, and the presence of this portion or component indicates the presence of the analyte in the fluid being tested. For example, in accordance with the invention, an analyte such as a virus can be captured or isolated in or on a membrane downstream of the melt-blown substantially uniform fibrous web, and the virus can be lysed to release its viral nucleic acid, i.e., DNA or RNA. Subsequently, a portion of the viral nucleic acid can be amplified and detected by means well known in the art. The detection of the portion of the viral DNA or RNA indicates the presence of the analyte virus.

In describing the present invention, the following terms are used as described below.

(A) Biological Fluid. Biological fluid includes any treated or untreated fluid associated with living organisms, including, but not limited to blood, saliva, lymph, cerebrospinal fluid, ascites fluid, and urine. Biological fluid particularly includes blood, including whole blood, warm or cold blood, and stored or fresh blood; treated blood, such as blood diluted with a physiological solution, including but not limited to saline, nutrient, and/or anticoagulant solutions; one or more blood components, such as platelets suspended in plasma, platelet concentrate (PC), platelet-rich plasma (PRP), platelet-free plasma, platelet-poor plasma (PPP), plasma, packed red cells (PRC), buffy coat; analogous blood products derived from blood or a blood component or derived from bone marrow; red cells suspended in physiological fluid; and platelets suspended in physiological fluid. The biological fluid may include leukocytes, or may have been treated to remove leukocytes. As used herein, biological fluid refers to the components described above, and to similar blood products obtained by other means and with similar properties.

(B) Analyte. Analyte includes but is not limited to at least one of the following: glucose; cholesterol; urea; triglycerides; ketones; bilirubin; urobilinogen; nitrites; theophylline; galactose; lipids; serum enzymes; proteins; hormones; nucleic acids; coagulation factors; growth factors; ions such as potassium, sodium, calcium, and lithium; drugs such as morphine, codeine, heroin, cocaine, steroids, and marijuana; metabolites; pesticides; pollutants; blood components such as plasma, platelets, red blood cells, and leukocytes; viruses; and microorganisms such as bacteria and protozoa. An analyte can be an antigen or an antibody.

An analyte can be determined directly or be treated so that a portion or component of the analyte can be detected. Illustratively, an analyte such as a virus may be treated to release the viral nucleic acid, and a portion of the nucleic acid can be detected.

BRIEF DESCRIPTION OF THE DRAWINGS

FIG. 6A is an end view of another melt-blowing apparatus with two rows of angled and offset fiberizing nozzles, while

DETAILED DESCRIPTION OF THE PREFERRED EMBODIMENTS

Figure 1:
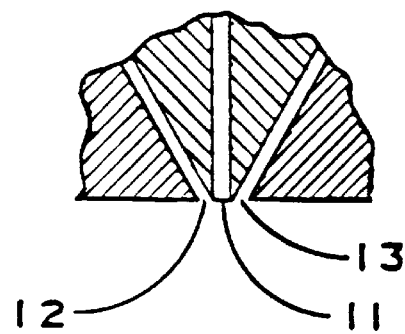
FIG. 1 is a cross-sectional view of a conventional fiberizing orifice.
Figure 2:
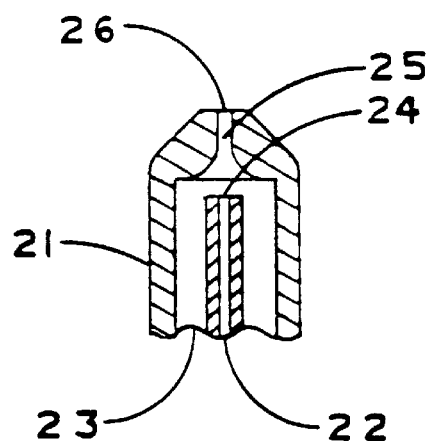
FIG. 2 is a cross-sectional view of a preferred fiberizing nozzle.

The present invention provides at least one melt-blown fibrous web wherein the web is highly uniform. The fibrous web, which comprises a non-woven web, can be characterized in several ways. Preferably, the non-woven web comprises fibers such that 90% of the fibers have a diameter ranging from a minimum fiber diameter to a maximum fiber diameter which is no more than about three times the minimum fiber diameter. In some embodiments, the non-woven web comprises fibers such that 90% of the fibers have a diameter ranging from a minimum fiber diameter to a maximum fiber diameter which is no more than about two times the minimum fiber diameter.

The fibers in the non-woven web can have an average fiber diameter of less than about 15 $\mu$m, for example in the range of 3 to 8 $\mu$m, and may be less than about 2 $\mu$m. In some embodiments, the average fiber diameter can be less than about 1.5 $\mu$m, or less than about 1 $\mu$m. The melt-blown fibrous non-woven web can be further characterized by a weight distribution varying by less than about 10% over a unit area. For example, in some embodiments the weight distribution varies by less than about 10%, e.g., less than about 5%, when measuring in both the longitudinal and transverse directions, with such weight distribution measured along 0.64×13 cm areas and on 2.54 cm squares. In one embodiment, the weight distribution varies by less than 1% when measured as described above.

The melt-blown fibrous non-woven web is also substantially free of roping, twinning, and shot and can be characterized by a tensile strength in a first direction at least about 1.2 times, e.g., at least about 1.5 times, preferably at least about 2 times, and more preferably at least about 4 times, the tensile strength in a second direction 90° to the first direction.

The melt-blown fibrous non-woven web can be further characterized by a 2 cm Lateral Flow Time (LFT) of about 60 seconds or less, e.g., about 15 seconds, in a first direction and/or a 4 cm LFT time of about 300 seconds or less, e.g., about 45 seconds, in a first direction. Even more preferably, the webs have a 2 cm LFT of about 50 seconds to about 20 seconds in a first direction and/or a 4 cm LFT of about 200 seconds to about 64 seconds in a first direction. In some embodiments, the 2 cm LFT can be about 40 seconds or less, e.g., about 10 seconds, in a first direction and/or the 4 cm LFT can be about 225 seconds or less. For example, the webs can have a 2 cm LFT of about 35 seconds to about 12 seconds in a first direction. Such webs can be prepared wherein the LFT in a second direction 90° to the first direction is different than the LFT in the first direction. In an embodiment, the LFT in a first direction exceeds the LFT in a second direction by more than about 5%. Moreover, such webs can be prepared such that the web exhibits substantially no bead front lag in the first and/or second directions.

The present invention also comprises a device for processing a fluid, which can be a biological fluid, wherein the device includes at least one melt-blown fibrous non-woven web as described above. In some embodiments of a device for processing a biological fluid, at least one of the melt-blown fibrous non-woven webs has a Critical Wetting Surface Tension (CWST) of at least about 65 dynes/cm.

The device can also include at least one additional structure, such as a nonporous medium, a porous medium, a biosensor, a capillary, and a housing.

As will be noted in more detail below, embodiments of the device are useful for filtration of fluids, determining the presence of an analyte in fluids, and/or separating plasma from plasma-containing fluids. The device can be used to filter a protein-containing fluid.

Embodiments of the device can be used for determining the presence of at least one analyte in the biological fluid and/or separating a portion of plasma from a plasma-containing biological fluid. The device includes at least one substantially uniform melt-blown fibrous web, said device having a region for receiving a biological fluid sample containing an analyte and other substances, and a region into which said analyte flows, without at least a portion of said other substances. The device can be configured to provide predominantly vertical, or predominantly horizontal flow.

If desired, a web can include the region for receiving the biological fluid sample containing an analyte and other substances, and the region into which said analyte flows, without at least a portion of said other substances. Alternatively, the device can include two or more webs, e.g., a web including a region for receiving the biological fluid sample, and another web including the region into which the analyte flows, without at least a portion of the other substances.

The web can include at least one surface suitable for contacting the biological fluid sample, and, can include at least one surface through which said analyte flows, preferably without at least a portion of said other substances. Fluid can flow through opposing surfaces, or non-opposing surfaces, of a fibrous web.

The present inventive device can also include two or more substantially uniform melt-blown fibrous webs, wherein one of the webs includes a region for receiving a biological fluid sample containing an analyte and other substances, and another web includes the region into which said analyte flows, without at least a portion of said other substances.

In the present inventive device, the fibrous web can be completely uniform as regards voids volume or can contain a compressed portion for a desired effect. For example, the fibrous web can contain a compressed portion which prevents at least some of the other substances, e.g., red and/or white blood cells, from passing therethrough. The compressed portion can prevent the other substances from passing to another portion of the web, or can prevent the other substances from passing out of the web to another medium.

The present inventive device can include, in addition to the fibrous non-woven web, at least one additional porous medium, e.g., a second porous medium such as a membrane. For example, the device can also comprise an additional porous medium, e.g., a membrane, having an upstream surface and a downstream surface, wherein at least a portion of the upstream surface of the additional porous medium is in fluid communication with a surface of the fibrous web, and wherein the additional porous medium allows for the analyte to be captured thereby and prevents at least some of the other substances from passing therein. The porous medium can be coextensive with the fibrous web or can have a cantilevered region which extends beyond the web. In an embodiment, the fibrous web can contain a compressed portion adjacent to a cantilevered region of the additional porous medium which prevents at least some of the other substances, e.g, red and/or white blood cells, from passing therethrough to the cantilevered region.

The additional, or second, porous medium can be of any suitable material in any suitable configuration, e.g., a microporous membrane, including but not limited to a nylon membrane, a polyvinylidene fluoride (PVDF) membrane, a polysulfone membrane, and a nitrocellulose membrane. In some embodiments, the microporous membrane can be a virus removing membrane, such as, for example, an isotropic, skinless, polyvinylidene fluoride membrane, particularly such a porous membrane which has a titer reduction of at least about $10^8$ against $T_1$ bacteriophage and/or a $K_{UF}$ of at least about 15 psi when tested using liquid pairs having an interfacial tension of about 4 dynes/cm.

The virus removing membrane can be an ultrafiltration/diafiltration membrane that is capable of excluding 0.02 $\mu$m diameter, monodisperse, latex particles and is capable of being dried without loss of such ultrafiltration properties and which after being wet/dry cycled at least once will have a $K_{UF}$ flow rate at 10 psi, using 1-butanol saturated with water as the wetting liquid and water saturated with 1-butanol as the displacing liquid at ambient temperature, below 50 cc/min per square foot of membrane. Suitable ultrafiltration/diafiltration membranes include polysulfone membranes, such as polyethersulfone or polyphenylsulfone membranes.

The present inventive device can additionally comprise at least one additional porous medium, i.e., a third porous medium, interposed between the fibrous web and the second porous medium. In an embodiment, the third porous medium is preferably a second melt-blown fibrous non-woven web.

In an alternative embodiment, the present inventive device can additionally comprise a third porous medium having an upstream surface and a downstream surface, with the upstream surface of the third porous medium being in fluid communication with the downstream surface of the second porous medium. In one such alternative embodiment, the second porous medium preferably comprises a porous membrane, e.g., a nylon membrane, a polysulfone membrane, or an isotropic, skinless, polyvinylidene fluoride (PVDF) membrane.

The present inventive device can further comprise a nonporous structure which is in contact with a surface of at least one fibrous web and/or at least one other porous medium. In these embodiments, the present inventive device desirably further comprises one or more nonporous structures adhered to the device, e.g., to at least one surface of the fibrous web, so as to reduce evaporation of the biological sample.

Alternatively, or additionally, the device can include a nonporous structure such as a capillary. The capillary can be capable of delivering a biological fluid such as plasma or whole blood to the web and/or the other porous medium, or the capillary can be capable of withdrawing the biological fluid from the web and/or the other porous medium.

In addition, the present invention provides a porous composite structure comprising at least one porous sheet containing thereon a melt-blown fibrous non-woven binder web, wherein no more than about 50%, preferably no more than about 10%, or no more than about 5%, of the pores of the porous sheet are blocked by the melt-blown fibrous non-woven binder web. The melting point of the fibrous melt-blown non-woven binder web is preferably lower than that of an adjoining porous sheet. In the porous composite structure, at least one porous sheet can be a melt-blown fibrous non-woven web, and two porous sheets can be bound together by the melt-blown fibrous non-woven binder web. Similarly, in the porous composite structure, one of the porous sheets can be a microporous membrane and the other of the porous sheets can be a melt-blown fibrous non-woven web. Also, the porous composite structure can comprise a microporous membrane or an impermeable sheet with a melt-blown fibrous non-woven web adhered thereto.

The present invention further provides a filter element comprising the melt-blown fibrous non-woven web and a housing therefor. The present invention also provides a bag filter comprising a filter medium formed into a bag configuration with a closed end, an open end, an inside surface, and an outside surface, wherein the filter medium from which the bag filter is formed comprises the present melt-blown fibrous non-woven web. The bag filter can further comprise a collar secured to the open end of the filter. In some embodiments, the bag filter includes one or more seams which are thermally sealed or sewn and heat-sealed with a thermoplastic tape.

The present invention also provides a method of filtering a fluid comprising passing a fluid through the present melt-blown fibrous non-woven web.

The present invention also provides a method for preparing a melt-blown fibrous non-woven web comprising modifying the present melt-blown fibrous non-woven web to alter the Critical Wetting Surface Tension (CWST) of the web. For example, the web may be modified to have a CWST of at least about 55 dynes/cm, e.g., about 65 dynes/cm to about 115 dynes/cm, or more. In some embodiments, the web may be modified to have a selected CWST between about 73 and about 110 dynes/cm, more preferably between about 73 and about 100 dynes/cm, so as to obtain a desired Lateral Flow Time (LFT).

Similarly, the present invention provides a method for preparing a melt-blown fibrous non-woven web comprising modifying the present inventive melt-blown fibrous non-woven web to alter the voids volume of the web so as to obtain a desired LFT. For example, a melt-blown fibrous web can be produced wherein the voids volume is preferably in the range from about 60% to about 96%, more preferably in the range of about 64% to about 94%, to obtained a desired LFT.

The present invention also provides for a method of processing a fluid, for example, a biological fluid. One embodiment of the present inventive method comprises contacting the biological fluid receiving region of a device having at least one melt-blown fibrous non-woven web with a biological fluid sample containing an analyte and other substances. For example, the biological fluid can be blood or a blood product, and the analyte can be at least one of glucose, cholesterol, and a virus. In particular, the biological fluid can be a plasma-containing fluid, wherein the analyte can be a virus, and the biological fluid can include substances such as red and/or white blood cells. In one preferred embodiment of a method in accordance with the invention, plasma is separated from blood.

The present invention also provides a method of preparing a melt-blown fibrous non-woven web comprising extruding molten resin from two parallel rows of linearly arranged, substantially equally spaced nozzles to form fibers onto the surface of a cylindrical collector having a longitudinal axis arranged parallel to the rows of nozzles, wherein the rows of nozzles are offset from each other and are angled toward each other. The rows of nozzles are preferably offset from each other by about one-half the spacing between the nozzles within each row and the rows of nozzles are preferably angled toward each other by substantially equal but opposite angles, e.g., each of the rows of nozzles is angled by about 25° or less, preferably about 5° to about 20°, more preferably about 10° to about 16°, from a vertical plumb line originating at the center of the cylindrical collector.

While it is preferred for many or most purposes to align the rows of nozzles parallel to the cylindrical collector, the rows of nozzles may alternatively be located such as to form an angle, for example 5° to 20°, to the axis of the cylindrical collector, and the rows of nozzles may further be located such that the center line of the fiber stream coincides with the outer line of the cylindrical collector, or they may be offset such that a portion of or all of the fiber stream strikes the advancing face of the cylindrical collector, or they may be offset such that a portion or all of the fiber stream impinges on the receding side of the fiber stream.

The cylindrical collector can be rotated at any suitable surface velocity, generally at least about 20 m/min and preferably not exceeding about 600 m/min, although a higher surface velocity (e.g., about 1000 m/min or higher which can be obtained by rotating a 35 cm diameter cylindrical collector at about 900–1000 or more rpm) may produce a fibrous non-woven web which is superior for some applications. The cylindrical collector can have any suitable diameter, preferably about 5 cm to about 150 cm, more preferably about 10 cm to about 75 cm, and most preferably about 10 cm to about 44 cm.

The nozzles can be spaced any suitable die to collector (DCD) distance from the cylindrical collector, preferably about 1.5 cm to about 15 cm, and more preferably about 2 cm to about 12 cm. In some embodiments, the DCD can be about 2 cm to about 8 cm, or about 2 cm to about 5 cm. The cylindrical collector is preferably translated at a rate not exceeding about 2 cm/revolution, more preferably at a rate not exceeding about 1 cm/revolution, and most preferably at a rate not exceeding about 0.75 cm/revolution. Within each of the rows the nozzles can be spaced apart any suitable distance, generally about 2 cm or less, preferably about 0.25 cm to about 2 cm, more preferably about 0.1 cm to about 1.5 cm, and most preferably about 0.37 cm to about 1.2 cm, such as about 0.5 cm to about 1 cm. The parallel rows can be spaced apart any suitable distance, preferably such that the nozzle tip to nozzle tip separation between rows is about 1 to 2 cm. Moreover, the present inventive method is preferably carried out while a negative pressure is maintained between the rows of the nozzles.

Producing the Fibrous Web

A Single Row of Individual Nozzles

Figure 3:
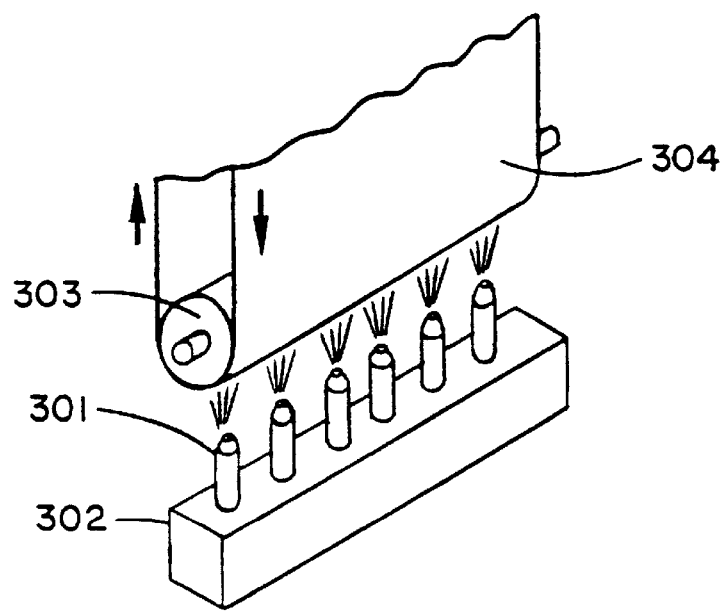
FIG. 3 is a perspective view of a melt-blowing apparatus with a single row of fiberizing nozzles.

An arrangement for collecting a fibrous web from a single row of individual fiberizing nozzles is shown in perspective view in FIG. 3, with each fiberizing nozzle 301 being connected to a double manifold 302, one portion of which is arranged to supply molten resin to the nozzles from an extruder and the other portion to supply heated air at controlled temperature and pressure. The nozzles 301 are arranged in a single line, spaced apart from each other by a distance which is preferably in the range between about 0.4 and 1.5 cm and more preferably in the range of about 0.6 to 1.2 cm. This arrangement yielded a striped product, which nevertheless has properties substantially superior to the products of the existing systems with respect to better fiber conformation, and has the ability to make finer fibers which in use remove smaller particles and have longer life in service.

The webs formed by the apparatus of FIG. 3 may be thick enough and sufficiently coherent to permit formation directly onto the outer surface of cylinder 303, from which they can be withdrawn continuously in the manner of U.S. Pat. No. 4,021,281; however, it may be expedient, particularly when the web weight is less than about 3 to 10 milligrams per square cm, to have the web collected on the surface of a supporting fabric 304 which may for example be an inexpensive non-woven, permitting the product to be collected, stored, and later used with the fabric in place or separated from the fabric prior to use.

Multiple Row Arrays of Fiberizing Nozzles

Figure 4B:
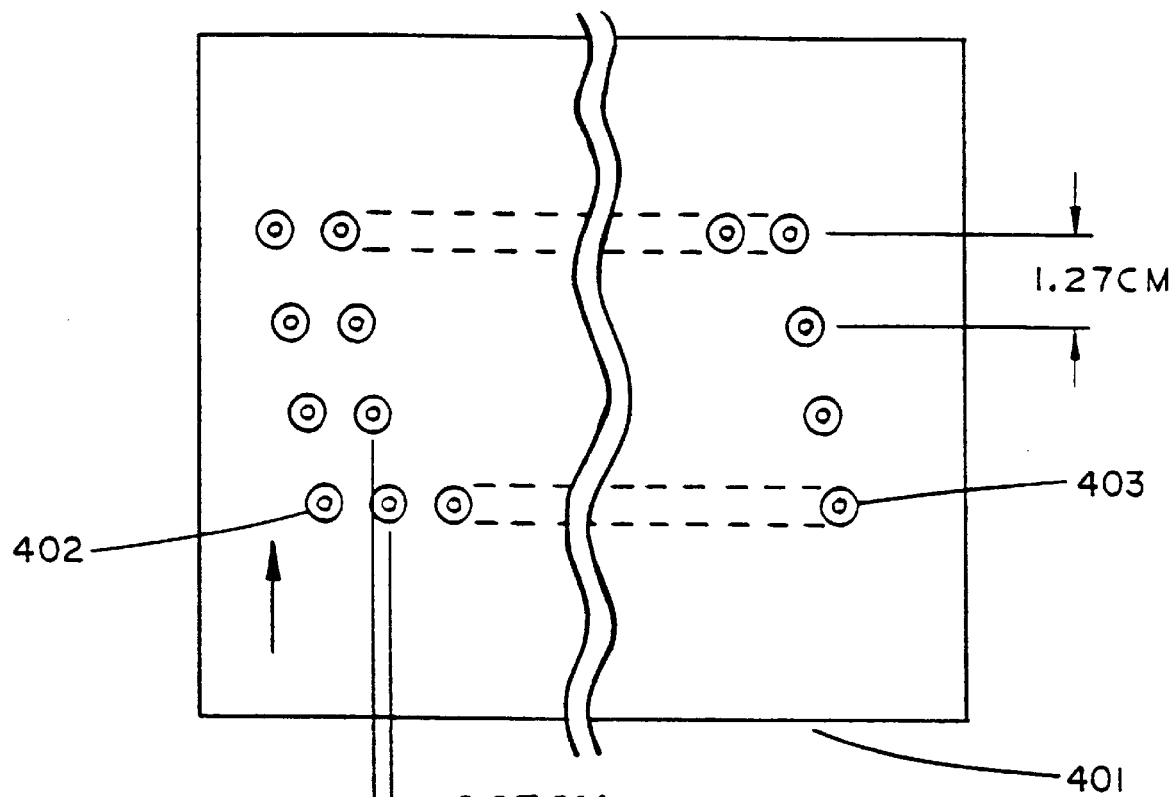
FIG. 4B is an enlarged plan view of the same apparatus depicted in FIG. 4A as seen along line A—A of FIG. 4A.
Figure 4A:
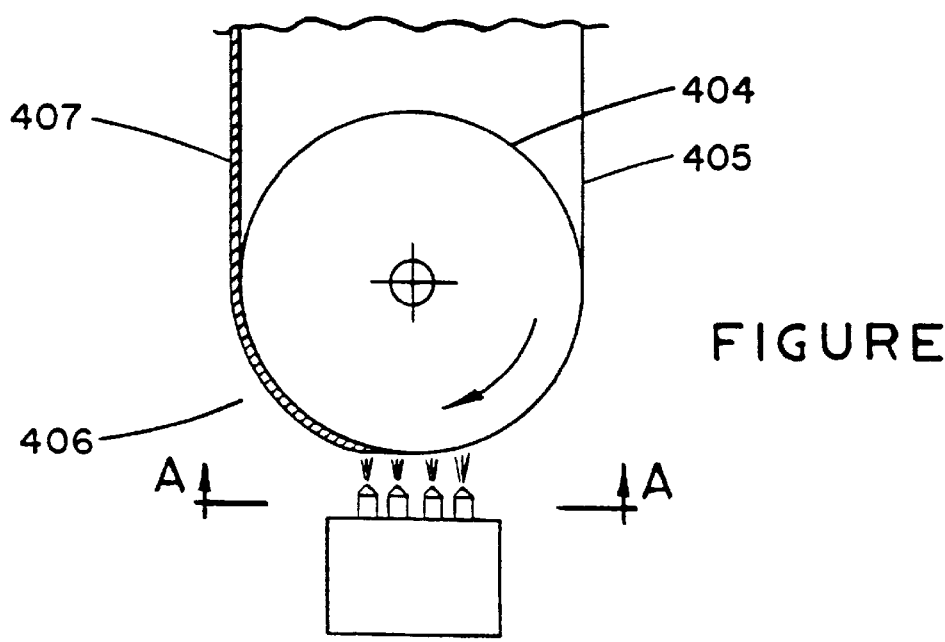
FIG. 4A is an end view of a melt-blowing apparatus with four rows of fiberizing nozzles.

An apparatus which was used in an attempt to reduce or to eliminate striping is shown in FIGS. 4A and 4B, where FIG. 4A is an end view of an apparatus differing from that of FIG. 3 only in the substitution of a fiberizer assembly with four rows of fiberizing nozzles, and FIG. 4B is an upwardly facing section along the line A—A of FIG. 4A. In FIG. 4B, 401 refers to the collection surface, while 402–403 delineates a row of 106 linearly located fiberizing nozzles in which the fiberizer nozzles are spaced apart by 0.84 cm, 402–403 being one of four such rows, the rows being spaced apart from each other by 1.27 cm. In FIG. 4A, 404 is a rotating cylinder, around 180° of which travels a 110 cm wide smooth surfaced non-woven fabric 405. The fabric is impinged upon by the fiber streams 406 from the (4×106= 424) fiberizing nozzles 402–403 in the manner shown in FIGS. 4A and 4B, thus forming a porous medium 407 loosely bonded to the fabric 405, from which the porous medium 407 may be removed and separately rerolled.

As fabric 405 travelled over the rotating cylinder 404, it was impinged upon by 424 fiber streams 406, each stream originating from a nozzle spaced 0.21 cm from its diagonal neighbor. Since each fiber stream could be seen visually to lay down a swath about 0.5 cm wide as it struck the surface of the fabric 405, and since the nozzles were on 0.21 cm centers, it was anticipated that a uniform or nearly uniform fiber distribution would be obtained, thus diminishing or eliminating striping; instead the striping was accentuated from that obtained with a single row die. The stripes were spaced 0.84 cm apart, with the intervening transparent portions containing about one half the quantity of fiber contained in the less transparent stripes.

Careful visual observation of the fiber streams while the apparatus was being operated revealed that as the fabric 405 to which the fiber streams were directed moved over the die in the direction of the arrows depicted in FIGS. 4A and 4B, the fiber stream originating from the first row of 106 dies 402–403 impinged on the fabric to form 106 ridges of fibers, each of which caused the 106 fiber streams from the following three rows to be deflected from the vertical direction of the nozzle from which they originated in a manner such as to deposit a substantial proportion of their fibers on the ridges made by the first row, thus enlarging the already deposited ridges of fibers rather than starting new ridges. To review, referring again to FIGS. 4A and 4B, with the fabric moving in the direction of the arrows, nozzles 402–403 deposited ridges which were located where one would expect, i.e., in line with the nozzles; however, the fiber streams from all of the other nozzles were visibly deflected towards the ridges made by the first row of nozzles 402–403, the last of the four rows surprisingly being deflected a full 0.63 cm. In this manner a product web was obtained which was heavily striped on 0.84 cm centers.

The aerodynamics which might account for this unexpected behavior have not been explained quantitatively, but qualitatively a consequence of Bernoulli's theorem can be applied, i.e., a rapidly moving stream of gas is deflected towards an adjacent solid surface, in this case toward the ridges formed by the leading row of fiberizing nozzles.

Crossed Fiber Streams

Figure 5:
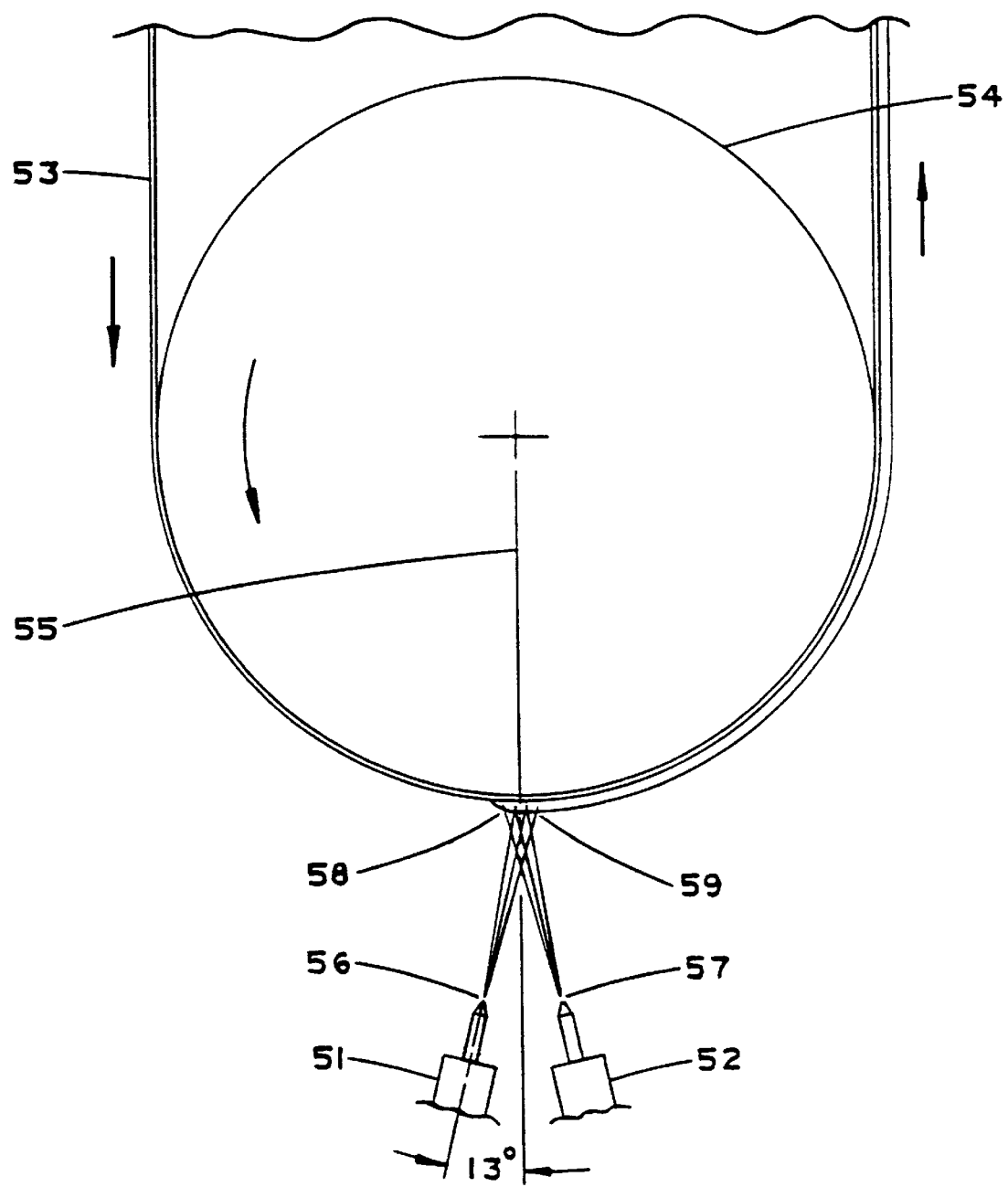
FIG. 5 is an end view of a melt-blowing apparatus with two rows of angled and offset fiberizing nozzles.

An end view of a configuration of a crossed fiber stream melt-blowing system of the present invention is shown in FIG. 5, in which 54 is a rotating cylinder over which a fabric 53, typically a disposable non-woven is drawn, moving counterclockwise around the metal cylinder 54 towards a rewind station, which is not shown. Double manifold 51, of length a few centimeters less than the width of web 53, feeds hot air and molten resin to a row 56 of fiberizing dies tilted towards the right relative to vertical plumb line 55 drawn from the center of cylinder 54, generating fiber streams which strike the collector cylinder at 59. A matching set comprising manifold 52 and nozzles 57 is tilted towards the left and deposits resin on the collector surface at 58; if the axial spacing (perpendicular to the paper) between adjacent nozzles is distance D, then the two rows of nozzles are offset from each other by distances 0.5D, thus the fiber streams cross between each other. The distance 58–59 by which they overlap may in the practice of the invention be as much as 1 cm or more. The distance 58–59 may be zero, and a limited negative lap (separation) may be acceptable in some circumstances. Over the whole range of overlap, from 1 cm or more to a negative lap, no interference between adjacent fiber streams can be visually detected, an observation very much contrary to the results described above for multiple rows of nozzles. As a result, media made using the crossed fiber stream system are more uniform, and, while not eliminated, striping is reduced.

The degree of overlap is determined in part by the DCD, which in the configuration of FIG. 5 is the distance from the nozzle tips 56 or 57 to the surface of cylinder 54. With a 15 cm diameter collection cylinder and an angle of tilt between the two sets of nozzles of 26°, and the distance between the nozzle tips 56–57 set to 1.4 cm, a preferred overlap is about 0.5 to about 1.0 cm for a relatively large DCD of about 6 to about 10 cm, and between about 0.23 cm to zero overlap for relatively smaller DCDs of about 4 to about 2.8 cm.

In general, the DCD is smaller when a porous medium of higher density with lower voids volume and higher tensile strength is desired. The DCD of the processes of the invention ranges from about 2.5 cm to about 11 cm. In one embodiment, the DCD ranges from about 2.7 cm to about 7.5 cm. Parameters other than DCD which can be varied to produce a desired product include the angles of tilt, which are generally preferred to be symmetrical, but which for some purpose may be varied to advantage, the distance from die tip 56 to die tip 57, the offset if any from the center line of the matched fiberizer set to the vertical plumb line 55 of the collection cylinder, and the temperature, flow rates, and fiberizing characteristics of the resin which is being fiberized, as well as the volume, temperature, and pressure of the air delivered to the fiberizing nozzles.

Throughout the many variations of operating conditions described above, the crossed fiber system has been consistent in showing no interaction between neighboring product streams; the fibers generated by this system collect on the target surfaces in the manner expected for a system of a given geometry.

The Scanning System

Figure 6C:
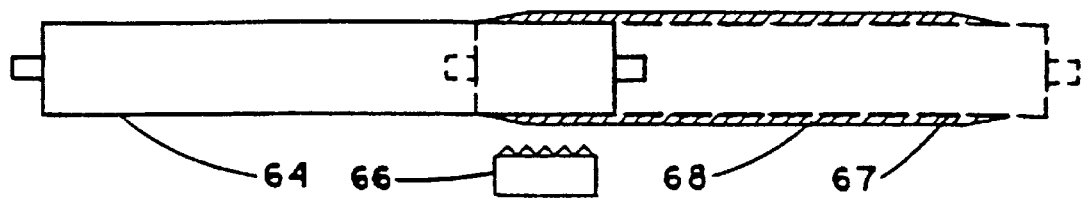
FIG. 6C is a side view of a melt-blowing apparatus showing the translation of the collecting cylinder.
Figure 6B:
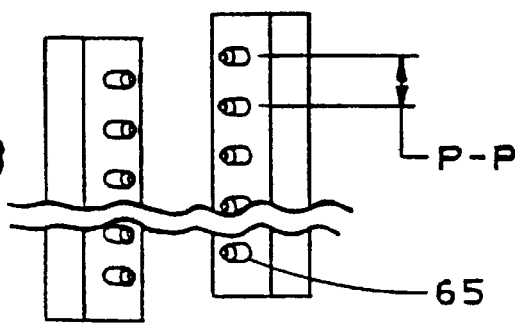
FIG. 6B is a top view of the same apparatus as seen along line A—A of FIG. 6A.
Figure 6A:
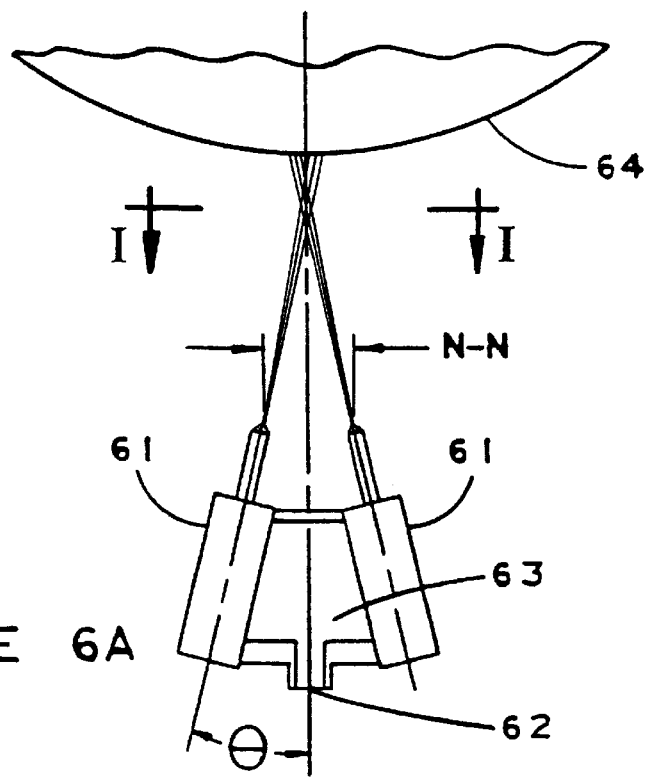

FIGS. 6A–6C depict the scanning system of the present invention. In FIG. 6A the manifolds 61 are located similarly to and have the same function as manifolds 51 and 52 of FIG. 5. The area between the two manifolds has been enclosed as shown and at both ends to form a cavity 62 fitted at its lower end with a cylindrical opening 63. Cylinder 54 of FIG. 5 has been replaced by cylinder 64, and fabric 53 has been removed. FIG. 6B is a partial view along line A—A in FIG. 6A, showing tilted nozzles 65 located on P-P centers, the nozzles of the one row offset by 0.5P from those of the other row. FIG. 6C shows in elevation view a crossed stream fiberizer assembly 66 located near to the right end of collector cylinder 64.

In use the fiberizer assembly 66 is stationary while collector cylinder 64 is rotated, for example at a surface velocity in the range of about 20 to 600 meters per minute, and may be simultaneously translated towards the right a rate of about 0.01 to 0.1 cm per revolution. The rotation and translation rates are maintained constant while collector cylinder 64 is moved across the fiberizer to position 67 shown in broken lines, in the course of which a fibrous web 68 is formed by the impinging fibers. The web grows in length until the translation is complete and the whole surface of the collector cylinder is covered. The cylinder of porous medium may then be slit along its length, and its tapered ends trimmed. The so formed sheet may be inspected on a light box where it is seen to be uniform and free of any visually detectable striping.

If while using the crossed fiber streams of the invention the translation per revolution (hereinafter T/R) is increased above 0.1 cm per revolution in about 0.04 cm or smaller increments while holding constant a given combination of fiberizing nozzle dimensions, nozzle placement, DCD, mandrel diameter, mandrel rotation rate, and resin composition, and each so made specimen is then examined sequentially on a light box, a T/R will be reached at which the existence of parallel stripes in the product becomes readily apparent. By then backing off from that T/R by about 0.04 cm, a product of excellent uniformity is produced, and such a product is encompassed by the present invention. Products made using the crossed fiber streams of the invention which show faint or moderate striping may still be superior with respect to uniformity when compared with products of any previous melt-blowing method; such products are also encompassed by the present invention.

The magnitude of the T/R which produces a stripe-free product is influenced by factors including the nozzle-nozzle spacing, which is preferred to be as small as is practical; fiberizing die assemblies with a 0.76 cm nozzle center to nozzle center spacing have been used to produce the examples of the invention, as preceding tests using similar apparatus spaced on 1.02 cm spacing were less successful. Under some circumstances, for example when operating with very large DCD's, stripe-free products may be obtained with nozzle spacing well over 1 to 2 cm, and such products fall within the scope of the present invention. Spacing less than 0.76 cm is desirable and may be possible, albeit such reduction would be somewhat restricted by design considerations such as the dimension of air and resin flow passages. Other criteria for achieving perfect uniformity are that rates of revolution, translation, and resin delivery must be constant throughout the formation of the entire length of the sheet.

Most of the examples of the present invention were performed using convenient T/R values which were a fraction, for example less than one quarter to one half of the largest T/R which would produce a stripe free product. In an experiment dedicated to exploring the maximum T/R possible, in which the air nozzle diameter was a relatively large 0.17 cm, the air temperature was 310° C., 305° C. resin was delivered at 0.51 g/min/nozzle and DCD was 4.1 cm, excellent uniformity on light box inspection was obtained in the T/R range from 0.12 to 0.44 cm, and uniformity remained almost as good up to T/R of 0.63 cm, with visible stripes appearing in the product at 0.76 cm.

In other experiments at various fiberizing conditions the onset of stripy conditions was seen to occur at much lower values. Occasionally conditions were such that striping appeared at a lower value, and then disappeared as the T/R was further increased up to about 0.29 cm (0.375×the 0.76 cm nozzle spacing), and a further "node" at which the striping became minimal has been observed at 0.48 cm (0.625×the 0.76 cm nozzle spacing).

Prior to the conception of the crossed fiber stream system for delivering fibers to a translating cylinder, attempts were made to use the translating cylinder with other types of fiber delivery systems, including single and double rows of nozzles (not crossed) with the same fiberizing nozzles and with alternate nozzles. None of these yielded other than clearly striped product.

Other fiberizing systems, for example those based on the processes described in the section titled "Background of the Invention", may yield unstriped product but such products are inferior with respect to uniformity of fiber diameter, weight distribution, and freedom from shot, twinning and roping, and are incapable of making media with average fiber diameters below about 3 to 5 $\mu$m.

Referring to FIG. 6A, the locations of the fiberizing nozzles is preferred to be such that the distance N—N between the nozzle tips is in the range from about 0.5 to 3 cm, and more preferred to be in the range of about 1 to 2 cm, and still more preferred to be in the range of about 1.2 to 1.6 cm, and it is preferred that the angle $\theta$ between the nozzle and the vertical plumb line from the center of the collector cylinder be within about 5° or less of equal but of opposite direction for both dies, and it is further preferred that the angle $\theta$ be in the range of about 3° to 25°, and more preferred to be in the range of about 5° to 20°, and still more preferred to be in the range of about 10° to 16°. The volume and type of fibers issuing from each side is usually preferred to be equal; however, products of interest for special purposes may be made by operating each side using different conditions, for example to combine high mechanical strength with very small fiber diameter.

The deposited porous medium may be slit lengthwise, removed, and laid flat, for use for example as a component of a diagnostic device, or as a filter, or it may be calendered to, for example, reduce its pore diameter to provide a filter medium with a desired absolute removal rating, e.g., an absolute removal rating of less than about 1.0 μm, for example, less than about 0.5 μm. Illustrative methods for determining the absolute removal rating include those described in U.S. Pat. No. 4,340,479.

The collector cylinder 64 of FIGS. 6A and 6C may be surfaced by a suitable release coating. Depending on the thickness, voids volume, and other characteristics of the porous medium, a tubular cylinder of porous medium may then be withdrawn from the collector cylinder and used for example as a filter with the flow from inside to out, or it may be pleated to form a seamless pleated filter element.

The crossed fiber stream arrangement of the invention is preferred to be used as the fiber generator with the scanning system of the invention because it permits high translation rates together with high fiber deposition rates while minimizing fiber loss due to overspray, and, because unlike arrays in which the nozzles are parallel, it can be used to make very uniform fibrous products with a very wide range of characteristics with precise lot to lot reproducibility. The media so made are uniform within the sensitivity of the tests which can be applied, such as weight per unit of area, thickness, voids volume, pore size, wicking rate, and particle removal capability.

Referring again to FIG. 6A, a useful mode of operation is achieved by attaching at connection 63 means to generate within chamber 62 a negative pressure in the range from zero to about 3" of water column, thereby achieving a more uniform product, some of which are described in example 44. Further, while it is an advantage of the crossed fiber stream system that both sets of fiber streams impinge on the collector cylinder on or close to a straight line, thus helping to minimize fibers which are not collected, nevertheless, when operating at relatively high air flow rates, the volume of air reaching the cylinder may be so high that some of the fibers bypass the collector cylinder, and are lost into the exhaust duct. Negative pressure applied to chamber 62 arts to prevent or diminish bypassing and to reduce to zero or near to zero the loss of fibers to waste.

By changing orientation, location, and geometry of the crossed stream fiberizers, changing resin flow rate, air flow rate, and temperature, and using nozzles with larger or smaller orifices, media can be made which as taken off of the machine have an average fiber diameter from less than 1 μm to more than about 20 to 50 μm, with a range of voids volumes from about 60% to about 94% and a range of thicknesses from less than 0.008 cm to 0.5 cm or more. Such media can be made with, for example, with good tensile properties, controlled pore size, thickness, fiber orientation, and voids volume.

If desired, multiple passes may be made as described above, while adjusting the DCD, to produce a single web having a desired combination or arrangement of two or more voids volumes. Illustratively, the thus produced web may have a first portion, and a second portion, wherein the first portion has a different voids volume then the second portion. For example, a first or upstream, portion of the web can have a higher voids volume than the second, or downstream, portion of the web. Accordingly, in one embodiment, e.g., in a device for separating plasma from a biological fluid, the biological fluid passes into a portion having a selected voids volume, for example, in the range of about 80% or more, and the plasma, separating from the biological fluid, passes into a portion having another selected voids volume, for example, in the range of about 70% or less.

In another embodiment, a fiberizer can be placed at an angle with respect to the collector cylinder, to produce a web having a graded pore structure and a graded voids volume.

When used as filters, media made in accordance with the invention provide a desired pore structure and/or filtration efficiency. For example, in some embodiments, filters made in accordance with the invention provide particle removal ratings as measured by, for example, the OSU (Oklahoma State University) test from 1 μm to 200 μm or more. Long life in service is obtained using these media due to their high voids volume and resistance to compression as the collected solids cause pressure to build up across the filter.

In accordance with the invention, the melt-blown webs may be prepared from a wide variety of synthetic polymeric materials, including, for example, polybutylene terephthalate (PBT), polyethylene, polyethylene terephthalate (PET), polypropylene, polymethylpentene, polychlorotrifluoroethylene, polyphenyl sulfide, poly(1,4-cyclohexylene dimethylene terephthalate), PETG (a polyester polymerized with an excess of glycol), nylon 6, nylon 66, nylon 612, nylon 11, and a polyamide-polyether copolymer, such as a polyamide/polyalkylene-oxide-diamine copolymer, e.g., a nylon 6 copolymer described as "80% nylon 6 with 20% polyethylene-oxide-diamine."

Terms and Concepts Used in Characterizing Media

The following section provides a summary of some of the terms and concepts used in characterizing media. Particular terms and concepts of interest include evaluation of fiber diameter, evaluation of uniformity, evaluation of the voids volume, diagnostic devices, lateral flow time (LFT), lateral diffusion rate, critical wetting surface tension (CWST), and protein binding by porous media.

These terms and concepts will be used in used in describing the preparation of media according to the invention in the Examples.

Evaluation of Fiber Diameter

Many of the applications of fibrous porous media are made possible or are better served if the diameters of the fibers are small. For example, filters used to provide optically clear fluids, or to remove bacteria or particles in the micrometer range, will have lower pressure drop and longer life in service if made using smaller fibers. Additionally, filters made for use in processing transfused blood and blood products, for example, filters made in the manner of U.S. Pat. Nos. 4,880,548 and 4,925,572, can be made smaller in size, hence have smaller internal hold-up volumes while retaining equal or better removal efficiency, thus delivering a larger proportion of the blood to the patient, or they can be made more efficient with no increase in blood hold-up volume within the filter.

The specimens of commercially available melt-blown media which have been examined have all had fiber diameter distributions such that the ratio of the largest diameter to the smallest is greater than ten. Using optical or scanning electron microscopy to accurately determine the average fiber diameter of such media is extremely difficult, if not impossible. Counting fibers by identifying individual fibers and measuring their diameter is easy when the range is small, for example when the largest fiber is less than about two to four times the diameter of the smallest; however, it is very difficult when the range is ten or more to one. In typical commercially available media, the same fibers run off the photo and then perhaps back on again, or down into the depths below the focal depth of an optical or scanning electron microscope and then perhaps up again. For these reasons, estimates of fiber diameter made by conventional melt-blowing have stated a range, for example 1 to 10 μm. In such a report a single 10 μm diameter fiber should be assigned a weight for averaging purposes 100 times that of a 1 μm fiber, and thus the sighting of one or two 1 μm diameter fibers has little impact.

In practice, it has been easy to make a product "containing 1 μm fibers", but the average diameter of all of the fibers has been many times larger, for example 5 or more times the diameter of the smallest fiber. The products of the present invention have fiber diameter ranges which are less than one third those of conventional media, permitting average fiber diameters to be determined with a precision estimated to be about ±5% by measuring the diameters of 100 fibers.

The evaluation of the mean diameter of fibers as reported herein has unless otherwise noted been accomplished using scanning electron microscopy to determine the diameter of at least 100 fibers using several fields, each of which typically contained about 20 to 30 fibers. Each fiber counted was identified and its diameter noted on the photo. Where necessary to establish the diameters of the finest fibers, magnifications of up to 2000× were used. Averages were computed as the root mean square (RMS), i.e., $$\text{RMS average diameter} = \left(\frac{\Sigma nd^2}{\Sigma n}\right)^{1/2}$$

wherein n is the number of fibers and d is the individual fiber diameter. This formula takes into account the greater contribution to weight and surface area by the larger diameter fibers. The arithmetic average, $$\frac{\Sigma nd}{\Sigma n},$$

hereinafter referenced as the average fiber diameter, is for the products of the invention about 10% lower.

Fiber surfaces areas were when required calculated as $$\text{Surface area}, m^2/g = \frac{4}{\text{RMSdiameter}, \mu m X \rho}$$

where ρ is the density in g/cc of the resin of which the fibers are composed.

Using this method for the evaluation of fiber diameter the procedure of the invention is capable of manufacturing PBT (polybutylene terephthalate) and polypropylene media with RMS average fiber diameters of about 1 μm or less, as is shown by examples 3, 4, 5 and 7 (below). At the other end of the scale, uniform media comprising 30 μm and larger diameter fibers have been made.

A survey of manufacturers of melt-blown fiber in the U.S.A., Europe, Asia, and the Americas turned up thirteen manufacturers who offer melt-blown web for public sale. A sample of the smallest diameter fiber produced was requested from each, a request to which nine responded. Those samples which claimed to have average fiber diameter of 3 μm or less were evaluated by using gas adsorption at 80° C. (the BET method) and calculating the average fiber diameter. None were smaller in average fiber diameter than 1.8 μm, and most were larger than 3 μm.

Evaluation of Uniformity

The methods of the invention make possible products with uniformity better than has been previously achieved by a melt-blowing process.

Among the tests which may be used to define uniformity of melt-blown products are: uniformity of fiber diameter; freedom from roping, in which pairs or triplets of fibers are twisted about each other; freedom from twinning, in which pairs of fibers are joined to each other along their length; a relatively narrow range of fiber diameter; and, most importantly, uniformity of weight and thickness from one part of the web to another. Products which are closer to uniformity in fiber diameter perform better when compared with less uniform products, because their pore sizes are more uniform, by virtue of which, when used for filtration, they retain finer particles more efficiently and pass filtered liquid with lower pressure drop. Roping and twinning effectively increase fiber diameter and cause fiber size distribution to be less uniform, hence are undesirable. Filters which are heavier or thicker from one place to another perform less efficiently because the thinner portions are less efficient with respect to particle removal, and the thicker portions increase the pressure drop generated by the passage of liquid through the filters. Non-uniform media perform poorly when used in diagnostic devices in which they are used for lateral flow transfer of liquids.

Evaluation of the Voids Volume

The data required to determine voids volume include the weight of the sheet per unit area, the density of the fiber, and the thickness of the sheet. Measurement of thickness is not straightforward because the media are compressible, which can cause large errors if inappropriate equipment is used. In the invention, thickness gauges were used in which a 7.62 cm diameter aluminum foot is attached to a gauge with 0.0001 inch (0.00025 cm) graduations. The gauge with its foot is mounted on a U shaped frame comprising on its lower arm a flat surface against which the foot of the gauge rests. The gauge foot was actuated downward by a 60 gram force spring, which together with the 80 gram weight of the foot, exert a compressive force on the test specimen of 140 grams, or 3.1 g/cm². This force compresses even the loftiest and most easily compressed of the media of the invention by less than about 1%.

The voids volume was then calculated in % as $$\% \text{ voids} = (t - W/\rho)t^{-1} \times 100$$

where t=thickness (cm), W=weight (g/cm²), and ρ=density of the fiber (g/cc).

Diagnostic Devices and Lateral Flow Time (LFT)

Nylon membranes, especially 5 μm absolute removal grade nylon membranes, have been widely used in recent years in filtration, particularly as a component of devices used for medical diagnostics, for example in devices which indicate pregnancy when contacted by a specimen of urine, or which measure the level of cholesterol in blood. In these and other diagnostic devices, a porous medium, which may be referred to as a substrate, is often required to serve as a part or as all of the structure of the device. In the following paragraphs a structure is described which while only one of many variations, is representative of many commercially used types of devices.

The purchaser of the diagnostic device, who may be an individual, a medical doctor, a veterinary doctor, a medical laboratory, or a hospital, generally uses the device by applying a specimen, for example of urine, saliva, blood or blood plasma, or other body fluid to a designated portion generally at one end of the substrate. The specimen is rapidly absorbed into the substrate and then is caused by the capillarity of the substrate to diffuse or flow laterally through the substrate. The substrate may contain insoluble particles which have been preplaced by the device manufacturer, and may contain as well soluble reagent(s) similarly preplaced in order to hold the reagent(s) in place. The preplaced particles, which may be attached to the fibers of the substrate by an inert binder such as sucrose, are picked up by the diffusing test fluid together with any soluble reagent(s), which then together with the reacted specimen diffuse further laterally to a "capture zone" at which the mixture may be immobilized by yet another reagent or by the configuration of the substrate. In the capture zone, the reacted product may be appraised visually, for example by a change in color as in a simple pregnancy test, or it may be evaluated spectroscopically in or out of the visible range, or it may be evaluated by a change in pH or electrical conductivity, among other means.

The time required for the test fluid to diffuse through the substrate from the area at which the test specimen is deposited to the capture zone is known as the lateral flow time, or LFT. The LFT is critical to the functioning of the device; for example it should not be so small so as to fail to dissolve a preplaced reagent, and consistent with the dissolution time or similar requirements it should be as small as possible in order to allow the user of the test to reach a conclusion as quickly as possible.

Nylon membranes, including those disclosed in, for example, U.S. Pat. No. 4,340,479, have been used as substrates for lateral flow in a variety of such devices; however, there has been a need for a porous medium which transfers liquids laterally more rapidly, i.e., one which has a smaller LFT than has been obtained using nylon membrane. A nitrocellulose membrane which has a somewhat lower LFT, which is, however, still too high for many or most applications, has been commercially available as an alternative to the nylon membranes described above. The nitrocellulose membrane is not inherently hydrophilic, and for this reason it is impregnated by the manufacturer with a surface active agent, without which it would not be wetted by and thus not penetrated by the specimens to be analyzed. The presence of the surface active agent has been characterized as very undesirable by manufacturers of diagnostic devices because it dissolves in the test sample and may change its behavior. However, nitrocellulose has nevertheless been used in some applications because its Lateral Flow Time, while still often higher than desired by the diagnostics industry, is lower than the LFT of nylon membrane.

The constructions used for diagnostic devices which employ porous media have in the past been limited by the availability of porous media with the desired characteristics. Embodiments of the invention provide a very wide range of porous media for use in these devices.

Testing Lateral Diffusion Rates

In order to measure the lateral diffusion rate of the products of the invention a test procedure was developed which simulates the lateral diffusion of the test liquid in commonly used tests: A suspension of blue dyed polystyrene spheres in water was obtained from Bangs Laboratories, Carmel, Ind., specified as "Royal Blue A1 0.303 $\mu$m diameter polystyrene dyed microspheres, stock number D0003030PB". Prior to use in the test, the concentration of the microspheres was reduced to 0.04% by adding one part of the suspension to 250 parts of water.

Figure 8:
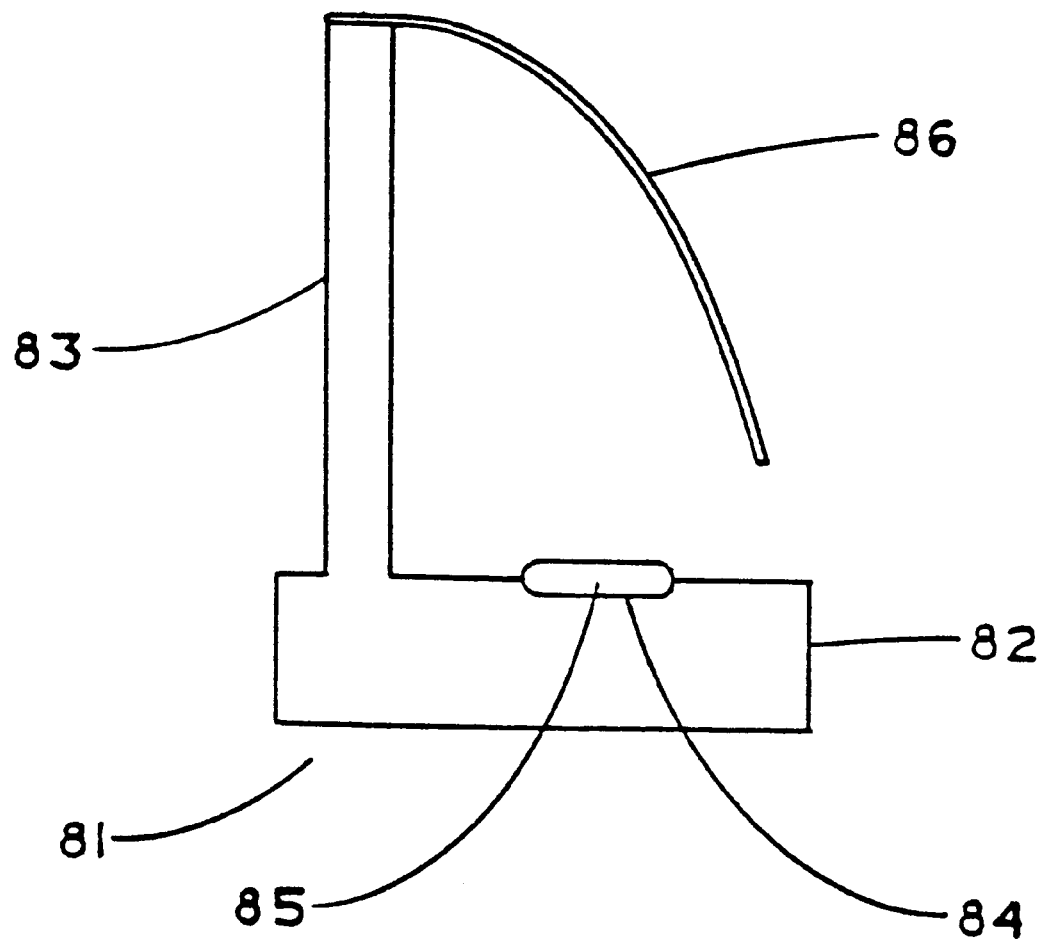
FIG. 8 is an elevation view of an apparatus to measure lateral flow times of materials such as the melt-blown fibrous non-woven web prepared in accordance with the present invention.

To perform the test, an apparatus generally in conformance with FIG. 8 is provided. FIG. 8 is an elevation view of a transparent plastic test device 81 comprising a platform 82, an upright post 83, and a shallow cavity 84. Two hundred microliters of the test suspension is placed in cavity 84, thereby forming pool 85. A test strip 86 is cut to 0.5×7 cm from the porous medium to be tested, and marked near one edge at 1, 3, and 5 cm from one end. The unmarked end of the test strip is then fastened to the top of post 83, thus cantilevering the marked end in the air above platform 82. Using tweezers, the cantilevered end of the test strip 86 is dipped into the center of pool 85, in which it is retained by capillarity, and the times are measured for the advancing front(s) to travel 2 cm, from the 1 cm to the 3 cm mark, and the time to travel 4 cm, from the 1 cm mark to the 5 cm mark.

Depending on the nature of the substrate, the blue spheres may advance coincidentally with the liquid front, or the blue spheres may be retarded, in which case a separate blue front is observed, and there is a gap between the blue front and the liquid front. If the blue spheres have reached the 4 cm mark at the same time as the liquid (i.e., the advancing fronts coincide) the "lag" is recorded as zero; if the blue spheres lag behind and have not fully advanced, the magnitude of the lag at 4 cm is recorded accordingly. A lag of more than about 1 mm is undesirable, and a zero lag is highly preferred for proper functioning of a diagnostic test.

Critical Wetting Surface Tension (CWST)

An important property of porous media which is not widely understood is Critical Wetting Surface Tension, or CWST. CWST is described in, for example, U.S. Pat. No. 4,880,548. Briefly, the CWST of a porous medium is defined in the '548 patent as equal to the average of the surface tensions of two liquids of which one is absorbed when a drop of the liquid is applied to the surface of the porous medium, while a drop of slightly higher surface tension liquid, for example two dynes/cm higher, will not be absorbed. Preferably, as will be noted in more detail below, webs according to the invention have a CWST of greater than about 65 dynes/cm, more preferably, greater than about 72 dynes/cm.

It has been discovered that the CWST of a porous medium has significant effects on behavior when used with liquids of surface tension below the CWST of the porous medium. The various products of the present invention, whether of polyester, polypropylene, or other resin may not be hydrophilic as made, and for applications such as diagnostic substrates they must be converted to the hydrophilic state, which is defined as the condition in which their CWST exceeds 73 dynes/cm, which is the surface tension of water.

In some embodiments, e.g., where it is desirable to obtain a specified range of Lateral Flow Times (LFTs), the webs according to the invention may be produced having a preselected CWST to obtain a desired LFT. In some embodiments including two or more fibrous webs, at least two of the webs may be produced with different CWSTs or different pore diameters or pore sizes, to obtain different desired LFTs. Of course, in those embodiments including at least one fibrous web, and at least one non-fibrous porous medium, the web(s) and/or the non-fibrous porous medium or media, may be produced to obtain different desired LFTs as described above.

Surface characteristics of the web can be modified, e.g., to alter the CWST, by chemical reaction including wet or dry oxidation, by coating or depositing a polymer on the surface, or by a grafting reaction. Grafting reactions may be activated by exposure to an energy source such as gas plasma, heat, a Van der Graff generator, ultraviolet light, electron beam, Cobalt 80 or other radioactive source or to various other forms of radiation, or by surface etching or deposition using a gas plasma treatment. With respect to gas plasma treatments, typical processes utilize, for example, at least one organic or inorganic gas. Illustratively, a process may utilize a single gas, e.g., oxygen plasma, or a mixture of gases, e.g., a mixture of ammonia plasma and the plasma of an inert gas such as argon. In some embodiments of the invention, the CWST may be modified as described in U.S. Pat. Nos. 4,880,548; 4,925,572; 5,152,905; and 5,258,127, and International Publication No. WO 93/04673.

Illustratively, webs according to the invention have a CWST in the range of about 58 dynes/cm or more, more preferably, about 65 dynes/cm or more. In some embodiments, the CWST is about 74 to about 78 dynes/cm. In other embodiments, webs according to the invention have a CWST in the range of about 80 to about 90 dynes/cm, e.g., about 82 to about 88 dynes/cm. In still other embodiments, webs according to the invention have a CWST of about 92 to about 98 dynes/cm. In other embodiments, webs have a CWST of about 100 dynes/cm or greater, e.g., in the range of about 105 to about 115 dynes/cm or greater.

In some of the examples of the invention, polybutylene terephthalate (PBT) media were hydrophilized prior to use by the conventional means of exposure to oxygen plasma; however, the oxygen plasma process is not a true graft, and unless the so made products are packaged to prevent exposure to ambient atmosphere, they may have unsatisfactory shelf life. Moreover, some oxygen plasma systems may require grafting for five or more minutes.

Accordingly, in an embodiment, a plasma grafting process, as described below, provides, among other advantages, a grafting system with a total time for grafting of less than about 5 minutes, e.g., about 1 minute or less. The total time may be as short as about 40 seconds. In this embodiment the CWST is raised to a closely reproducible CWST value, which is determined by the particular monomer used, and is relatively insensitive to variations of time and temperature.

In this embodiment, the CWST of the fibrous medium is raised to a specific CWST, reproducible to within about ±1 dynes/cm, by exposure first to a plasma of an inert gas, for example argon or helium, for a period which may be as short as about 10 seconds. The plasma is then discontinued, e.g., by turning off the power supply, and the vapor of an unsaturated monomer is introduced for a period which may be as short as about 20 seconds. Suitable monomers include hydroxypropyl acrylate (HPA), hydroxybutyl acrylate (HBA) and methacrylic acid (MAA), as well as other acrylate and allyl monomers.

The CWST values obtained by treating PBT media of the invention by this procedure are with HPA, HBA, and MAA respectively, 74, 76, and 76 dynes/cm, all within about ±1 dyne/cm.

In this procedure, step one may be as long as several minutes, and step two may also be of several minutes duration. The procedure may also include an intermediate step in which the inert gas is removed after step one, to a vacuum level of under about 10 µm.

The monomer may be delivered into the chamber onto a metal surface, a preferred metal being aluminum because it combines high thermal conductivity with the required chemical resistance, forming an evaporator, which may be fitted with a heater. The evaporator may be contained within a gas plasma chamber together with the media to be grafted, in which case the evaporator may be located within the plasma, or alternatively in a portion of the chamber in which no plasma is formed. In a third arrangement, it may be contained in a separate, usually smaller chamber appended to and communicating with the plasma chamber.

If the monomer has a vapor pressure in the range of less than about 10 µm of Hg at ambient temperature the evaporator is preferred to be fitted with a heater and a thermostatic control, however, if the vapor pressure of the monomer is more than about 10 to 20 µm at ambient, the heat required to evaporate the monomer may be adequately supplied by enlarging the bulk of the evaporator, for example by thickening it, thereby providing a sufficient supply of sensible heat to evaporate the monomer.

In this procedure the monomer may be applied directly to a surface within the evaporator, which may need to be heated in order to deliver monomer vapor into the plasma chamber. Such heating may cause the liquid monomer to polymerize, such that its vapor may contain dimers or trimers of the monomer. This undesirable condition is avoided in the invention by delivering the monomer into the space above the evaporator at a relatively slow rate, preferably from a syringe through a capillary, for example through a hypodermic needle of inside diameter about 0.1 to 0.3 mm. Such a device has been found to be capable of delivering monomer in the form of very small droplets at a rate in the range of, for example, about 0.1 to about 1.0 cc/minute.

The flow rate of monomer may thus be adjusted such that the fluid is delivered into the evaporator in the form of individual droplets. By selection of the appropriate hypodermic needle the procedure can be such that the individual droplets either evaporate before they reach the evaporator surface, or as an acceptable alternate do contact the surface but each drop evaporates from the surface before the succeeding drop reaches it. In the latter case, the evaporator surface may be observed to remain clean, the residence time at the surface being so short that no appreciable polymerization can occur.

Use of Mixed Monomers

It may be desirable to use mixed monomers. Media produced by the invention may be used for a wide variety of diagnostic tests, each of which may involve a different protein. For example, if the surface of the protein which is desired to be immobilized contains regions which are electropositive, then the fiber surfaces of a fibrous medium would be preferred to be electronegative to achieve immobilization. This could for example be achieved by using methacrylic acid (MAA) as the monomer; however, the adhesion so achieved may be stronger than desired. By using mixtures of monomers, for example by mixing MAA with hydroxypropyl acrylate (HPA) which exhibits low adhesion to proteins, any of a range desired degrees of adhesion becomes attainable. Preferably, each of the monomers is delivered at a constant rate. Preparing a mixture of the two monomers and then pouring the mixture onto the evaporator would, however, not produce the desired result because the MAA has a much higher vapor pressure than the HPA; as a result the MMA would distill off first, causing the product to vary in an uncontrolled fashion. This problem can be circumvented by using the dropwise delivery system in accordance with an embodiment of the invention; as each drop evaporates it delivers the desired ratio of the two components in a uniform and reproducible manner.

After the two or three steps have been completed, the chamber may be evacuated and then filled with air, the grafted polymer may be removed and used without further processing or may be subjected to washing, e.g., water washing, in order to remove any unbound residual material (e.g., contaminants which were present in the monomer composition), followed by drying. Weight gain depends on the surface area of the porous medium, and may range from less than 1% to up to about 10%. The temperature during the operation may remain essentially at the ambient. Preferred monomers include, for example, hydroxypropyl acrylate and methacrylic acid along with other similarly functional monomers such as acrylate and allylic compounds and other unsaturated compounds which are known to those familiar with the art of grafting.

In a variation of the above described procedure the unsaturated monomer may be used to form a plasma in step (a) in place of an inert gas, with similar end results.

A remarkable feature of this embodiment of the invention is that, unlike other grafting procedures known to those familiar with the art, the CWST produced over a wide range of concentrations and times of exposure when used to treat hydrophobic polyester substrates with, for example, MAA, HPA, or mixtures of the two, is about 74 to about 76 dynes/cm, the CWST produced with HBA is about 72 to about 74 dynes/cm.

Other means to achieve a permanent graft include the substitution of a variety of monomers, which may, for example, include an allyl or acrylic moiety along with one or more hydrophilic moieties such as carboxyl, amine, amide, pyridine and pyrrolidone; as well as cobalt 80 irradiation, UV exposure, or electron beam, in each case followed by exposure to an aqueous solution of a suitable monomer, which could for example be an acrylic alcohol, which must then be followed by washing and drying.

The CWST of porous media which may be used as substrates in diagnostic devices may have an important effect on Lateral Flow Time (LFT), for example, the LFT of PBT media which have been oxygen plasma treated to achieve a range of CWST values tends to be shortest at CWST values above about 100 dynes/cm and are longer in otherwise identical substrates which have CWST's in the 70 to 80 dyne/cm range.

Where applications require longer LFT's these may be obtained in a given substrate by reducing the CWST of the substrate with no alteration of pore size or voids volume; however, other methods for altering lateral flow times as described above are easier to control, and may for that reason be preferred.

Protein Binding by Porous Media

In some embodiments of the invention, devices according to the invention provide for filtering protein-containing fluids through a web such that there is reduced protein binding to the web.

The present invention may be used in diagnostic devices. In diagnostic applications the liquid sample to be tested is placed at one end of a porous strip through which it diffuses laterally. The diagnostic device may comprise a porous strip which has near its center, preplaced particles, which may be spherical, which have been precoated such as to bind the specific protein in the fluid sample as it diffuses along the strip. A function of the fiber surfaces of the strip is to hold the preplaced particles in place prior to use, and then during the test allow the moving liquid to dislodge the preplaced particles, which may be of submicroscopic dimensions and may have been attached to or coated by an enzyme, an antigen or an antibody, with the particles then being carried along by the flow of the liquid. It may be desired that the contents of the flowing liquid, be they solid particles in suspension or true solutions, should not be removed by adsorption on the fiber surfaces through which they pass. In other diagnostic applications some degree of adhesion is preferred, for example, to cause suspended particles coated by a proteinaceous reactant to adhere to the fiber surfaces sufficiently to hold them in place on the test strip during manufacturing and packaging, but not so strongly as to prevent the particles from being swept away when the liquid test sample diffuses laterally along the length of the strip.

The degree of adhesion required depends upon the composition of the porous medium internal surfaces and on the characteristics of the particular protein with which the particles have been coated, as well as upon the nature of the specimen to be analyzed, and the analyte of interest.

In many or most, if not all, cases the dissolved material and/or the coating on the particles is proteinaceous at least in part. The adsorption of Bovine Serum Albumin (BSA) and of Immunogammaglobulin (IgG) have been widely used as screening tests, i.e., tests to determine whether a given porous medium is more likely or less likely to adsorb proteins from solution or to hold back suspended particles, such as might be caused by adsorption of proteins attached to the particle surfaces.

Evaluation of the protein binding capabilities of the media of the invention using the BSA and IgG tests enables the user to select the type of lateral flow transfer medium which is optimal for the application; for example, the HPA treated media of the invention have by the BSA and IgG tests protein adsorption values of about 5 $\mu g/cm^2$, whereas the MAA treated media have a BSA adsorption value of about 5 $\mu g/cm^2$ and an IgG adsorption value of about 40 to 50 $\mu g/cm^2$. Media with IgG adsorption values intermediate between about 5 and about 50 $\mu g/cm^2$ may be desired, and these may be prepared by using, for example, a mixture of MAA and HPA in various proportions. For example using 30 parts by weight of MAA with 70 parts by weight of HPA yields a product with IgG adsorption of about 20 $\mu g/cm^2$. Other monomers or pairs of monomers may be employed using the procedures of the invention to provide higher, lower, or intermediate protein adsorbancy products.

In the present invention, e.g., as in the following Examples 34–36 and 41, protein binding was determined using a radioactive assay in which 2.5 ml of a BSA solution containing 250,000 cpm of $^{125}$I BSA (ICN 68031, Costa Mesa, Calif.) in a total of 250 $\mu g$ of BSA (Sigma A2153 Fraction V Powder, St. Louis, Mo.) in 10 mM phosphate buffer of pH 7 and 0.15 M NaCl is pumped at the rate of 0.5 ml per minute through a 13 mm disc of the porous medium to be tested. The disc is then removed from the holder, blotted on adsorbent paper, and analyzed for bound radioactivity in a gamma counter (Wallac RIA Gamma, Gaithersburg, Md.), from which the total amount of protein adsorbed is then calculated.

In an alternative or supplementary method for determining protein adsorption, immunogammaglobulin (IgG) was used as a representative type of protein. In the radioactive assay for IgG 2.5 ml of an IgG solution containing approximately 250,000 $\mu m$ of 125I labeled IgG (DuPont NEN, NEX-155, Wilmington, Del.) in a total of 250 $\mu g$ of IgG (Sigma I 5256, St. Louis, Mo.) in 10 mM phosphate buffer of pH 7 and 0.15 M NaCl was pumped at the rate of 0.5 ml per minute through a 13 mm disc of the porous medium to be tested. The disc was then removed from the holder, blotted on adsorbent paper, and analyzed for bound radioactivity in a gamma counter (Wallac RIA Gamma, Gaithersburg, Md.) from which the total amount of protein adsorbed was then calculated.

EXAMPLES 1–6

In order to prepare the porous medium of example 1, the scanning system of the invention was operated with a fiberizer assembly comprising two fiberizers each with 21 fiberizing nozzles with air apertures 0.13 cm in diameter supplied with air at 304° C. and 0.39 kg/cm² pressure. The two fiberizers, each with 21 nozzles on 0.76 cm centers were offset axially from each other by 0.38 cm, and were angled towards each other at an inclination of 13° from the vertical, with the distance N—N of FIG. 6B set at 1.42 cm. The two sets of intersecting fiber streams delivered polybutylene terephthalate (hereinafter PBT) resin at 293° C. at the rate of 0.44 grams per minute per nozzle. The fiber streams impinged over a distance of 4.1 cm (i.e., DCD=4.1 cm) on a 15 cm diameter by 137 cm long collection cylinder which was rotated at 512 rpm while it was simultaneously translated axially at the rate of 0.2 cm per revolution for the length of a single 124 cm stroke, thereby depositing on the surface of the collector cylinder in 1.2 minutes 0.0043 grams per $cm^2$ of fibrous porous medium which was then slit lengthwise, trimmed at both ends, and then removed from the cylinder, thereby forming a sheet 47.5 cm wide by 102 cm long. The air pressure and the DCD were then varied to produce five additional sheets with results as presented as examples 1–6 in Table I. All of the so formed sheets were examined on a light box, and were seen to be stripe-free and uniform. The sheets were very easy to manipulate, and could be stacked and removed repeatedly with no pilling or other visible surface disruption. No significant dimensional changes occurred during a three month storage period in a mixed stack of 24 sheets. This degree of dimensional stability is quite remarkable for a plastic product in some of which the solids content is as low as 8% by volume, with the remainder being air.

of the tensile strength is approximately 4:1. This reflects the degree of directional orientation of the fibers. An example of a more highly directional medium made using the procedures of the present invention may be seen in the SEM photo of FIG. 7.

The data of Table I were obtained using a single pass across the collection cylinder; however, multiple passes may be used by reciprocating the collection cylinder to the end of its stroke and back, often to advantage, for example when collecting thick webs, where the use of multiple passes provides the ability to adjust the DCD to allow for the thickness of the medium collected. In this way webs, or perhaps more properly battings, of uniform structure up to one or more centimeters in thickness may be made.

EXAMPLE 7

In order to prepare the porous medium of example 7, the scanning system of the invention was operated with a fiberizer assembly comprising two fiberizers each with 21 fiberizing nozzles with air apertures 0.106 cm in diameter supplied with air at 332° C. and 0.74 $kg/cm^2$ pressure. The two fiberizers, each with 21 nozzles on 0.76 cm centers were offset axially from each other by 0.38 cm, and were angled towards each other at an inclination of 13° from the vertical,

TABLE I

| | Test Conditions | | | Product Characteristics | | | | | |
|---|---|---|---|---|---|---|---|---|---|
| | Air | | | | Average | Tensile Properties | | | |
| | | | | Voids | Fiber | Strength $(glc)^1$ | | Elongation (%) | |
| Example No. | pressure $(kg/cm^2)$ | DCD (cm) | Thickness (cm) | Volume (%) | Diameter (μm) | $CMD^2$ | $MD^3$ | CMD | MD |
| 1 | 0.39 | 4.1 | 0.0185 | 82.5 | 4.2 | 230 | 90 | 5.0 | 5.0 |
| 2 | 0.79 | 4.1 | 0.029 | 89 | 1.1 | 510 | 130 | 9.7 | 14.7 |
| 3 | 1.06 | 4.1 | 0.054 | 94 | 1.0 | 440 | 110 | 8.5 | 13.5 |
| 4 | 1.06 | 3.6 | 0.042 | 92 | 0.9 | 500 | 150 | 8.0 | 13.2 |
| 5 | 1.06 | 3.0 | 0.027 | 88 | 1.0 | 440 | 200 | 6.8 | 11.3 |
| 6 | 1.06 | 2.8 | 0.021 | 84.2 | 1.2 | 390 | 240 | 6.0 | 84 |

[1] grams per linear centimeter.
[2] cross machine direction - perpendicular to the length of the sheet
[3] machine direction - parallel to the length of the sheet All of the examples 1 to 6 exhibit the low lateral flow times which are a desirable feature of the invention. Examples 3, 4 and 5 have root mean square (RMS) average fiber diameters respectively of 1.0, 0.9 and 1.0 μm (arithmetic averages 0.9, 0.8 and 0.9 μm), and are believed to be smaller in average fiber diameter compared with any melt-blown product currently or previously commercially available. Examples 5 and 6 are capable of removing very fine particles from liquid suspensions passed through them. For example, using the F-2 test developed at Oklahoma State University (OSU) and since adopted as a standard by a wide range of industries dealing with liquids such as fuels, lubricating oils, and liquid food products, the media of example 6 have been shown to remove particles larger than one micrometer in diameter in a single pass at low pressure drop with long service life and particle removal efficiency in excess of 99.9%.

All of the six examples have substantially higher tensile strength in the cross machine direction (i.e., perpendicular to the long (102 cm) direction of the sheet, hereinafter referred to as the CMD), compared with their tensile strength in the machine direction (MD); for examples 2, 3, and 4 the ratio with the distance N—N of FIG. 6A set at 1.42 cm, and the DCD (die to collector distance)=3.3 cm. The two sets of intersecting fiber streams were supplied with 318° C. polypropylene resin at the rate of 0.134 grams per minute per nozzle. The fiber streams impinged on a 15 cm diameter by 137 cm long collector cylinder which was rotated at 175 rpm while it was simultaneously translated axially at the rate of 0.11 cm per revolution for the length of a single 125 cm stroke, thereby depositing on the surface of the collector cylinder in 6.5 minutes 0.054 $g/cm^2$ of fibrous porous medium, which was then slit lengthwise, trimmed at both ends, and removed from the cylinder, forming a sheet 47.5 cm wide by 102 cm long. The so produced 0.0054 $g/cm^2$ sheet was 0.056 cm thick and had a voids volume of 89%, a linear average fiber diameter of 0.8 micrometers, and a root mean square diameter of 0.9 μm (hereinafter all average diameters will be reported as root mean square (RMS) diameters).

Figure 7:
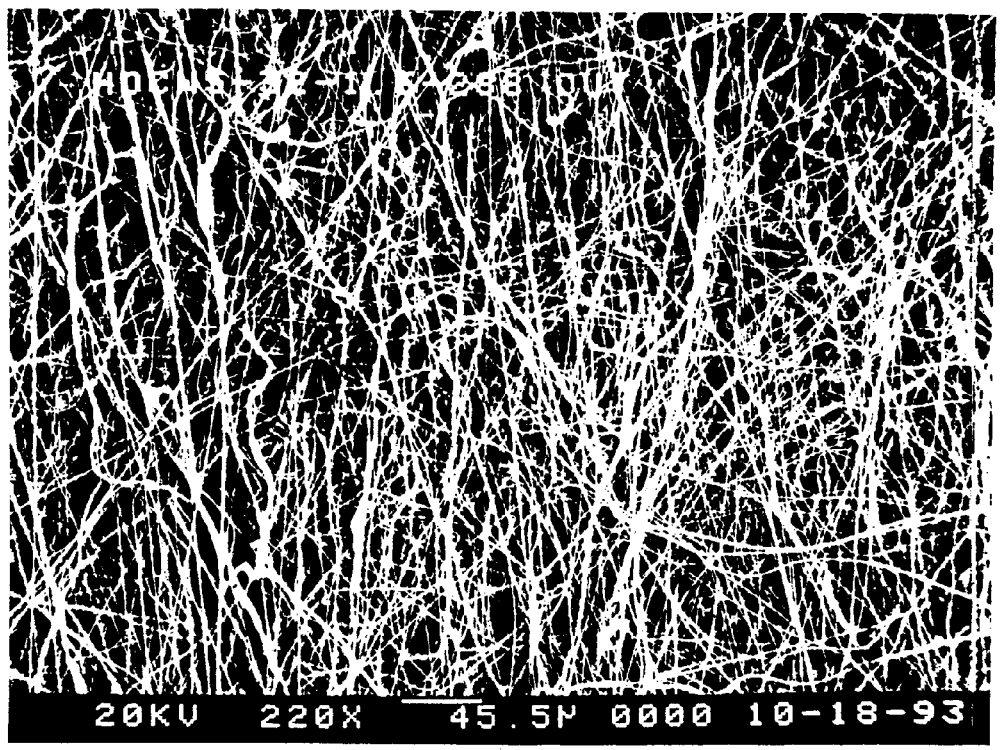
FIG. 7 is a scanning electron micrograph (220X) of a melt-blown fibrous non-woven web prepared in accordance with the present invention.

A scanning electron micrograph of the product at 220X is shown in FIG. 7, in which the machine direction is horizontal. The fibers are predominantly oriented about equally to the left and right of vertical in the cross machine direction, each making an approximate angle of 10° to 15° to the vertical. Also notable in FIG. 7 is the relative absence of roping, twinning, and shot which characterize hitherto made melt-blown media.

Tensile tests were run with the following results:

|  | MD | CMD |
|---|---|---|
| Tensile Strength, kg/linear cm: | 1.67 | 7.5 |
| Elongation, %: | 49 | 12 |

The ratio for the CMD/MD of tensile strengths is 4.5, reflecting the fiber orientation seen in FIG. 7.

EXAMPLE 8

A sheet of PBT resin was prepared in the manner of example 3 of the invention. Specimens were cut to 0.5×7 cm, five each in the MD and the CMD. Each of the ten specimens was then dipped into water at one end to a depth of about 0.3 cm, and the time was observed for the water to rise 2 cm. The average machine direction time was 15.9 seconds, and the average time in the cross machine direction was 9.6 seconds. These data reflect the fiber orientation of the sheet; the rate of capillary diffusion is greater in the CMD, which is the predominant direction of fiber orientation.

EXAMPLES 9–16

The apparatus of example 7 and procedures similar to those of example 7 were used with polypropylene resin to prepare examples 9–16. The machine settings and the resulting average fiber diameters are presented in Table II. The sheet weight was the same for all of the examples, namely 0.043 g/cm². The fiber diameters varied from 1.4 to 15 μm. All the products were uniform on light box inspection.

TABLE III

| Example No. | Specimen cut from Example No. | Lateral flow time (sec) 2 cm CMD | MD | 4 cm CMD | MD | Lag at 4 cm mark (mm) CMD | MD |
|---|---|---|---|---|---|---|---|
| 17 | 1 | 7.2 | 10.0 | 25.8 | 37.2 | 0 | 0 |
| 18 | 2 | 10.8 | 12.6 | 35.0 | 45.6 | 0 | 0 |
| 19 | 3 | 11 | 15 | 40.4 | 54.0 | 0 | 0 |
| 20 | 4 | 11.4 | 15.8 | 39.6 | 57.4 | 0 | 0 |
| 21 | 5 | 14.2 | 19.8 | 49.2 | 68.8 | 0 | 0 |
| 22 | 6 | 16.0 | 22.0 | 58.2 | 75.0 | 0 | 0 |
| 23 | NITRO-CELLULOSE 12 μm | 80 | | >240 | | 0 | |
| 24 | NYLON 5 μm | 96 | | >240 | | 4 | |

The MD lateral flow times are 17 to 45% higher compared with the CMD times, reflecting the orientation of the fibers. In the CMD tests the test suspension is thought to flow at small angle, i.e. closer to parallel to the fiber direction, hence faster liquid flow is obtained, along with no detectable interference with the passage of the microspheres. In the MD tests, the liquid flow is obstructed by the fibers across which they must flow because the fibers are near to perpendicular to the flow direction, hence the LFT's are longer.

The hydrodynamics of liquid suspensions are such that when the flow is parallel or near to parallel to an adjacent surface, the particles move away from the surface, and as a consequence the probability of a particle being adsorbed on the surface is reduced. Contrasted with this, flow at or near to perpendicular to fiber orientation increases the probability of collision and adsorption. For these reasons, a near to parallel orientation is preferred when minimum adhesion of particles is desired. When adsorption is desired, for example in the capture zone, or to remove an undesired component of

TABLE II

| Ex. No. | Resin Temp. (° C.) | Air Temp. (° C.) | Air Pressure (kg/cm²) | DCD (cm) | Mandrel (rpm) | Translation Rate (cm/rev) | Resin Rate (g/min/nozzle) | Thickness (cm) | Voids Vol. (%) | Average Fiber Diameter (μm) |
|---|---|---|---|---|---|---|---|---|---|---|
| 9 | 318 | 335 | 1.54 | 3.8 | 260 | 0.17 | 0.22 | 0.31 | 84.6 | 1.4 |
| 10 | 318 | 335 | 0.98 | 4.1 | 260 | 0.18 | 0.23 | 0.24 | 80.1 | 1.9 |
| 11 | 318 | 335 | 0.63 | 4.1 | 260 | 0.18 | 0.23 | 0.22 | 78.2 | 2.2 |
| 12 | 318 | 335 | 0.53 | 4.1 | 260 | 0.18 | 0.23 | 0.21 | 77.2 | 3.4 |
| 13 | 313 | 321 | 0.42 | 7.6 | 230 | 0.29 | 0.33 | 0.31 | 84.6 | 5.2 |
| 14 | 313 | 329 | 0.32 | 7.6 | 230 | 0.29 | 0.33 | 0.31 | 84.6 | 7.9 |
| 15 | 313 | 329 | 0.21 | 7.6 | 230 | 0.29 | 0.33 | 0.31 | 84.6 | 10.6 |
| 16 | 313 | 329 | 0.18 | 7.6 | 415 | 0.31 | 0.63 | 0.27 | 82.3 | 15.1 |

EXAMPLES 17–24

The media of examples 1 to 6 were Oxygen plasma treated to modify their surfaces, after which their CWST was 100 dynes/cm. Strips were then cut from each of the samples and subjected to the lateral flow test described above; the results are presented in Table III. All of the specimens had zero lag, and all of the lateral flow times tend to be at the low end of the range required for use in diagnostic devices. For comparison purposes, 12 μm pore size nitrocellulose and 5 μm pore size nylon membrane specimens were tested in a similar manner and were shown to have very much longer lateral flow times.

the sample, it may be accomplished or assisted by using the substrate with flow in the machine direction. Beyond these advantages there is a convenience factor for the user, who has a single grade of medium with two LFT times at his disposal.

EXAMPLES 26–30

The porous media of the invention have been made with voids volume varying from about 60% to about 96%. Higher voids volumes are obtained by using relatively lower feed rates of the molten resin, together with a higher DCD; conversely to obtain lower voids volumes (i.e., higher density) the DCD may be reduced and resin rate increased.

Figure 9:
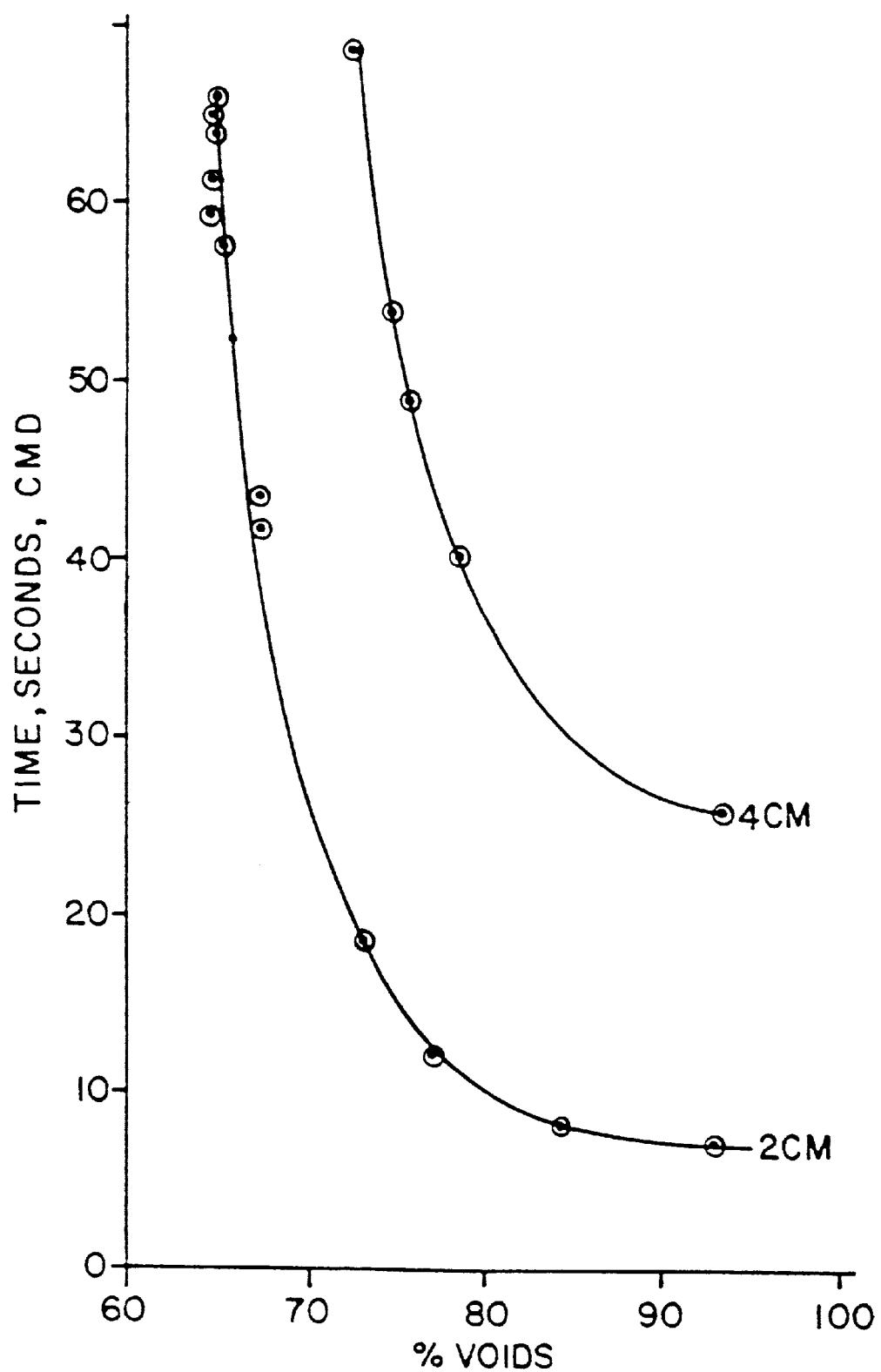
FIG. 9 is a graph depicting the lateral flow times (sec) in the cross-machine direction versus % voids volume for a melt-blown fibrous non-woven web prepared in accordance with the present invention.

In order to obtain a range of lateral flow times, a series of PBT media were prepared in which the sheet weight was constant at 0.0053 g/cm² while the voids volume was varied from 65% to 93%, adjusting conditions such that the average fiber diameter for all the specimens was in the range of about 6 to 10 μm. After exposure to oxygen plasma the CWST was 100 to 110 dynes/cm. The results are shown graphically in FIG. 9, which shows well controlled 2 and 4 cm LFT's varying from 7 to 64 seconds for the 2 cm span. The corresponding values for the 4 cm span range from 26 seconds to above 70 seconds. All of the measurements showed zero lag.

EXAMPLES 26–30

Another means for modifying the LFT of a porous medium is to reduce thickness, for example by calendering, thereby reducing its voids volume. Except for use of a smaller DCD, example 26 was prepared in the manner used to prepare example 2. Portions of example 26 were then calendered to reduce thickness and voids volume, followed by Oxygen plasma treatment, producing examples 26–30, for which the LFT data are shown in Table IV.

TABLE IV

| Example No. | Thickness (cm) | Voids Volume (%) | Lateral Flow (sec) | | | | Bead Front Lag at 4 cm (cm) |
|---|---|---|---|---|---|---|---|
| | | | CMD | | MD | | |
| | | | 2 cm | 4 cm | 2 cm | 4 cm | |
| 26 | 0.026 | 84.8 | 9 | 41 | 11.5 | 56 | 0 |
| 27 | 0.019 | 79.2 | 12 | 51 | 14.5 | 64 | 0 |
| 28 | 0.015 | 74.4 | 18 | 75 | 22.5 | 102 | 0 |
| 29 | 0.0115 | 65.1 | 27 | 109 | 27.5 | 151 | 0 |
| 30 | 0.0100 | 60.6 | 32 | 173 | 37.5 | 227 | 0 |

No lag was observed during the LFT tests. These LFT's cover the range expected to be most useful in the manufacture of diagnostic devices. The very smooth surfaces, increased toughness, and resistance to abrasion developed by calendering contribute to ease of automation for production and may be preferred for cosmetic reasons.

EXAMPLE 31

A set similar in function to that of examples 26–30 is prepared with fiber diameter as the variable and voids volume and CWST being held constant. The specimens with finer fiber have higher lateral flow times, thereby enabling a plot of LFT as a function of fiber diameter to be prepared, which would be useful in the preparation of a medium with a desired LFT.

EXAMPLE 32

A set similar in function to that of examples 26–30 is prepared using a single grade of porous medium, of which specimens are prepared with varying CWST over the range from 73 dynes to 110 dynes/cm. The lateral flow times range from about 10 seconds at CWST>100 to over 25 seconds at CWST=73 dynes/cm. The resulting LFT data may then be plotted against CWST, enabling a medium with a desired LFT to be made.

EXAMPLE 33

A substrate prepared in the manner of example 2 was cut to 23×25 cm and hung from a fluorocarbon rod in the center of a 50 liter chamber equipped with two 27×30 cm electrodes spaced about 25 cm apart, After evacuation to less than 5 μm of Hg pressure, Helium was passed into the chamber at a rate sufficient to maintain a pressure of 110 μm Hg within the chamber while vacuum pumping was continued. A plasma was formed by applying to the electrodes 500 watts of power at 13.56 megahertz for 30 seconds, at which time the helium flow was reduced to zero and the power was turned off while vacuum pumping was continued until the pressure dropped to 3 μm Hg, at which time the vacuum valve was closed and 2 cc of liquid hydroxypropylmethacrylate (HPA) monomer was metered into the chamber. The pressure within the chamber then rapidly increased to about 200 μm Hg, and during the next 3 minutes rose to about 450 μm Hg. At the completion of a 3 minute exposure, the chamber was pumped down to under about 20 μm Hg, and air was allowed to enter the chamber raising the pressure to ambient, after which the chamber door was opened and the specimen was removed. Weight gain due to grafting was 5.9%. CWST tests on about 4.5 cm centers over the whole area revealed a uniform CWST of 76 dynes/cm, which thereafter remained stable. An LFT test was run on the specimen, producing CMD times of respectively 15 and 48 seconds for 2 and 4 cm, and MD times of 24 and 72 seconds for 2 and 4 cm, all with zero lag.

The above described grafting procedure was repeated with numerous variations including the use of Neon and Argon as the inert gas as well as by using the HPA itself to form the plasma, at pressures varying from about 30 to 600 μm, and with a wide range of exposure times to the inert plasma from about 10 to 120 seconds and to the monomer ranging from about 30 seconds to 5 minutes. Remarkably, unlike some other grafting procedures, in which the results may vary with the radiation intensity, reagent concentrations, and time of exposure, the products all had a uniform CWST after treatment of 74 to 76 dynes/cm over their whole area. Scale up to larger apparatus operating at a frequency of 40 KHz has processed 45×100 cm sheets with essentially equal results. Other acrylate monomers, such as for example methacrylic acid and N-vinylpyrrolidinone, have been proved to be effective in obtaining alternate CWST values, and the chemistry is believed to be such that compounds containing one or more accessible double bonds and having a sufficient vapor pressure at ambient temperature may be reacted to produce a variety of results, which may include modification of their CWST values and of the LFT rates. Other benefits of CWST alteration exist, for example, a different CWST may improve the compatibility of the medium with a desired fluid. Illustratively, sulfuric acid, hydrofluoric acid, and solutions of sodium hydroxide in water have surface tensions in the range of 80 to 115 dynes/cm, causing their passage through a filter medium to be inhibited in the absence of media with high CWST values.

EXAMPLES 34–35

PBT products of the invention were prepared using the procedure of examples 1 and 2, and the fiber surfaces were then modified to a CWST of 76 dynes/cm using the Helium plasma—HPA vapor exposure system of example 33. A portion of each of the two specimens was clamped into a 13 mm diameter filter holder, and a solution of bovine serum albumin (BSA) which had been radioactively labelled was passed through the filter, following which the level of radioactivity in the effluent was measured and the resulting data used to calculate the weight of protein adsorbed. The resulting data for the two specimens, example 34 and 35, are set forth in Table V.

TABLE V

| Example No. | Material | Processing | Weight of BSA bound by a 13 mm disc ($\mu$g) |
|---|---|---|---|
| 34 | Media of Example 1 | As made, off machine | 58 |
| | | Processed by procedure of example 33 | 2.7 |
| 35 | Media of Example 2 | As made, off machine | 59 |
| | | Processed as example 33 | 2.4 |

EXAMPLE 36

A sheet of 0.2 $\mu$m pore size nylon membrane made by the process of U.S. Pat. No. 4,340,479 was tested to determine its protein adsorption characteristics using the BSA test described above. A 9"×10" specimen cut from the same sheet was grafted using the procedure of example 33. The BSA adsorption prior to and after grafting were respectively 114 $\mu$g/cm$^2$ and 3.7 $\mu$g/cm; after a methanol wash, water rinse, and drying, the BSA of the after grafted specimen fell to 2.4 $\mu$g/cm$^2$.

EXAMPLES 37–40

A copolymer incorporating about 80% of nylon 6 with about 20% of polyethylene-oxide-diamine was used to prepare 50×100 cm sheets using the apparatus of and in the manner of example 1, at a resin rate of 0.61 grams per minute per nozzle at 344° C., with air supplied at 361° C. The DCD was 4.1 cm, and the air pressure was varied over the range 0.56 to 1.25 kg/cm$^2$ to produce media with average fiber diameters of 2.5 and 5.6 $\mu$m. In separate similar operations media of the same composition were prepared with average fiber diameters of 8.1 and 10.2 $\mu$m. The voids volumes of each of the four sheets was approximately 74%, and the CWST of all four sheets was 92 dynes/cm. The LFT values were determined and are shown in Table VI.

TABLE VI

| Example No. | Air Pressure (kg/cm$^2$) | Thickness (cm) | Fiber Diameter ($\mu$m) | LFT (sec) CMD | MD |
|---|---|---|---|---|---|
| 37 | 1.25 | 0.030 | 2.5 | 20.6 | 31.2 |
| 38 | 1.16 | 0.019 | 5.6 | 19 | 26.6 |
| 39 | 0.81 | 0.019 | 8.1 | 17.6 | 23.4 |
| 40 | 0.56 | 0.020 | 10.2 | 15.2 | 18.4 |

Figure 10:
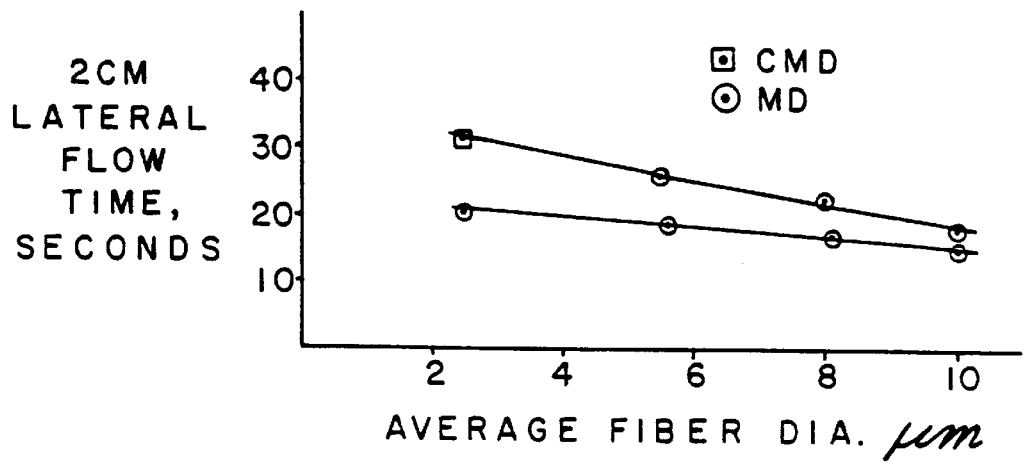
FIG. 10 is a graph depicting the lateral flow times (sec) in the machine direction (MD) and cross-machine direction (CMD) versus average fiber diameter for melt-blown fibrous non-woven webs prepared in accordance with the present invention.

As illustrated by the data set forth in Table VI and FIG. 10, in both the CMD and MD, as the average fiber diameter is increased, the LFT decreases in generally a linear fashion as shown in the plot of FIG. 10 of LFT versus average fiber diameter, which reflects the data of Table VI.

EXAMPLE 41

As measured by the BSA test the nylon copolymer of examples 37–40 has naturally low protein adsorption, with adsorption for a 13 mm disc ranging from about 8.3 $\mu$g for average fiber diameter 2.5 $\mu$m, to 1.2 $\mu$g for a specimen with average fiber diameter of 10.2 $\mu$m, values which are useful for many applications. In other applications, for example to fix the signal in the capture zone of a diagnostic device or to remove an undesirable component, higher protein adsorptions are preferred; for those the procedure of example 33 may be used with the HPA substituted by ammonia or with amines, preferably tertiary amines, to present amine groups on the fiber surface, or substituted by methacrylic acid or similar acidic acrylates to present carboxyl groups.

To demonstrate the increased protein adsorption, the nylon copolymer porous medium of example 37 was grafted using the grafting procedure of example 33, with helium in the first step and ammonia in the second step, and the product was then BSA tested; the BSA adsorption was 60 $\mu$g per 13 mm test disc. In a similar test methacrylic acid was used in the second step, achieving an adsorption level of 59 $\mu$g/13 mm disc. These alternates provide a choice of alkaline or acidic groups.

Examples 17 to 41 were prepared using melt-blown fibrous media with average fiber diameters ranging from about 1 to about 10.2 $\mu$m. Similar products have been made with average fiber diameters as large as about 20 to 25 $\mu$m, however, in media with relatively higher voids volumes the capillary force may be so small as to cause longer lateral flow times when a strip of medium is in a near to vertical position; for this reason fiber diameters in the range above about 10 to 20 $\mu$m are less desirable, but may be used in conjunction with voids volumes less than about 70 to 80%.

Multilayered Products

In accordance with the invention, the media may be utilized in multilayered products. For example, it may be desirable to include at least one additional layer for ease of use and/or ease in manufacturing. The layer(s) be used to provide support, protection, and/or to allow transfer of fluid from one layer to another.

Illustratively, the porous sheet media of the invention may be insufficiently rigid for some applications, for example for use in diagnostic devices. It may further be desirable to protect the porous media from mechanical damage during manufacture or from abuse during use. It may also be desired to attach a porous sheet to a supporting film in order to more conveniently carry it through an automated manufacturing process, for example to attach the porous sheet medium to a strip of film, e.g., polyester film, which may be perforated with holes which mate with sprockets similar to those used for photographic film. Some devices require two or more porous media layers to be bonded together while permitting free transfer of fluids between the layers.

With respect to fluid transfer, some devices such as diagnostic devices, e.g., devices used to separate plasma from a specimen of blood, utilize a porous sheet of fibrous material attached to a membrane filter of pore diameter such that the red cells contained in the blood are retained and are unable to enter the membrane while the plasma is free to pass into and through the membrane. Illustrative diagnostic devices are disclosed in, for example, U.S. Pat. No. 5,266,219.

Devices for separating plasma from blood have not been entirely satisfactory. Two reasons are believed to account for this. First, the porous medium which constitutes the upper layer to which the blood specimen is applied was unavailable with a sufficient degree of uniformity to make the product reproducible; the best porous medium available was visually striped and was not uniform, as was visually evident by observing that it was striped with the weight of material in the darker portion of the stripe being about twice or more the weight in the lighter portion of the stripe. The second cause was a weak bond between the porous medium and the membrane; since no permeable adhesive was available at the time the two layers were simply pressed together, thereby forming a very weak bond. Obtaining even a tenuous bond required excessive compression of the porous material, which reduced the voids volume of the fibrous medium to an undesirably low level. In these and similar applications the methods of the invention may be used to fly bond two layers together with minimal compression, thereby developing a bond of high strength while retaining high permeability to fluids in the porous layer(s).

The surface(s) to be bonded may be prepared for bonding by using the scanning method of the present invention to deposit on one or both surfaces as the bonding agent a low melting resin of fibrous form. Preferable resins include those having a glass transition temperature below ambient temperature, and a melting or softening point below those of the materials to be bonded. A variety of resins are suitable. Polyethylene and PETG (a polyester made with an excess of glycol) are examples of low melting bonding resins which may be used to bond, for example, PBT, nylon, polyethylene terephthalate, and other solid and porous materials.

For example, a low melting resin is fiberized using the scanning method of the invention with the resin delivery and scanning rates adjusted to deposit preferably about 1 to 20 g/m² of bonding fiber about 2 to about 10 μm in fiber diameter, or more preferably about 2 to 5 g/m² of bonding fiber about 3 to about 7 μm in diameter. The bonding fibers are impinged on either or both of the surfaces to be attached.

The binder fiber may be used to bond two fibrous sheets to each other, or to bond a fibrous sheet to a solid sheet. In the latter instance, the binder fiber may be deposited in either the fibrous or the solid sheet. In order to accomplish bonding, the two layers on one or both of which the binder fibers have been deposited, are subjected to gentle pressure while heated to above the softening point of the binder fiber for a period sufficient to accomplish bonding. When joining two layers wherein one layer is relatively thin, the time required to accomplish bonding may be about 10 seconds or less, and should generally be no longer than needed to accomplish the bond, as additional time may allow the molten bonding fiber to be absorbed by capillarity into the porous medium, thereby weakening the bond. Preferably, heat is applied to the side which is thinner and/or has higher thermal conductivity, to attain a temperature above the melting point of the binder fiber while the web and the other medium are gently compressed. When the heat is removed an effective bond will have been achieved. If each of the two layers is permeable, then the two bonded layers will have a permeability only slightly below that of two unbonded layers of the same media.

The fiber diameters and the weight per unit area of the binder fiber are such as to cover between about 1 to 30% of the area of the surface to which it is applied, and preferably between about 1 and 10% of the surface, and more preferably between about 2 and 5 percent of the surface, the more preferred range leaving about 95 to 98% open the surface on which the binder fibers were deposited. In this manner, transfer of plasma by capillarity between the porous medium and the membrane is free to proceed rapidly, while assuring that the two layers are well adhered to each other, and, because only gentle compression has been used, the two layers need not have been significantly reduced from their starting thicknesses or indeed not reduced at all.

As an example, if the product of example 19 or 20 were bonded as the upper layer to a nylon membrane such as, for example, a nylon membrane produced in accordance with U.S. Pat. No. 4,340,479, a drop of blood placed on the upper layer would within seconds saturate the nylon membrane with red cell free plasma. If the upper layer and the nylon membrane were attached to each other with a portion of the nylon membrane cantilevered beyond the upper layer, for example, in accordance with FIG. 19, the cantilevered portion of the membrane would rapidly become saturated by lateral diffusion of the clear plasma, which might then be used for a variety of diagnostic tests.

It may be desired that the adhesion between two layers be such that the bonding is adequate for an initial period, for example during shipment, unpackaging and use during the first portion of a test procedure, and be capable of easy, clean removal during a second part of a procedure. This is easily accomplished by using in the bonding procedure a lesser quantity of finer fibers, or by using finer fibers, or a combination of the two.

Figure 11:
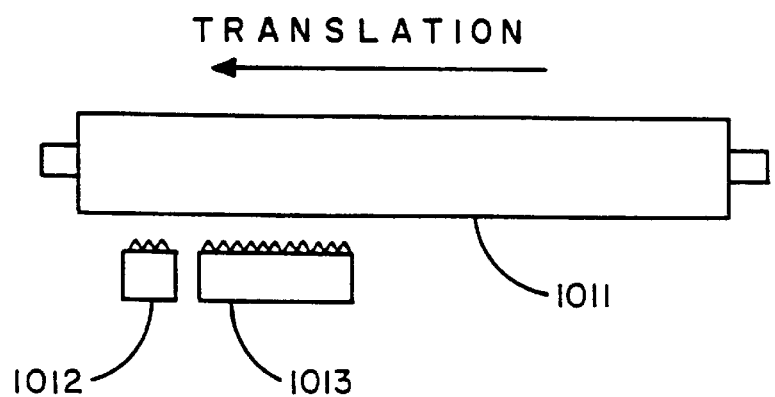
FIG. 11 is a side view of a melt-blowing apparatus useful in the preparation of laminates in accordance with the present invention.

In a preferred method for accomplishing the bonding of two layers, the binder fiber is deposited on the porous medium in the same operation in which the porous medium is formed, using an arrangement such as that shown in FIG. 11, in which the smaller of the two fiberizers 1012 and 1013 deposits binder fiber on a porous medium of the invention as it is being formed on the collector cylinder 1011, all during a single traverse of the target cylinder 1011 as it travels in the direction of the arrow.

The products used in the diagnostic device described above also benefit greatly from the availability of the fibrous media of the invention by substituting them for the nonuniform fibrous media previously available. The methods of the invention provide thinner layers of very uniform higher voids volume media, for example with the 94% voids volume of example 3, permitting plasma to be obtained with high efficiency from very small samples of blood, for example from as little as 10 μl of blood, while providing sufficient plasma to perform a diagnostic test.

With these improvements the devices described above, including those disclosed in U.S. Pat. No. 5,266,219 are well suited for automated production of a much improved product for obtaining plasma from small samples of blood.

In another application of the bonding system of the invention, the bonding agent has been applied to the surface of a membrane or other porous medium which may have an absolute removal rating in the range of about 0.04 to 10 μm, which is then bonded to a grooved plate for use in the dynamic microfilter described in the copending U.S. patent application Ser. No. 08/038,257.

EXAMPLE 42

Figure 12:
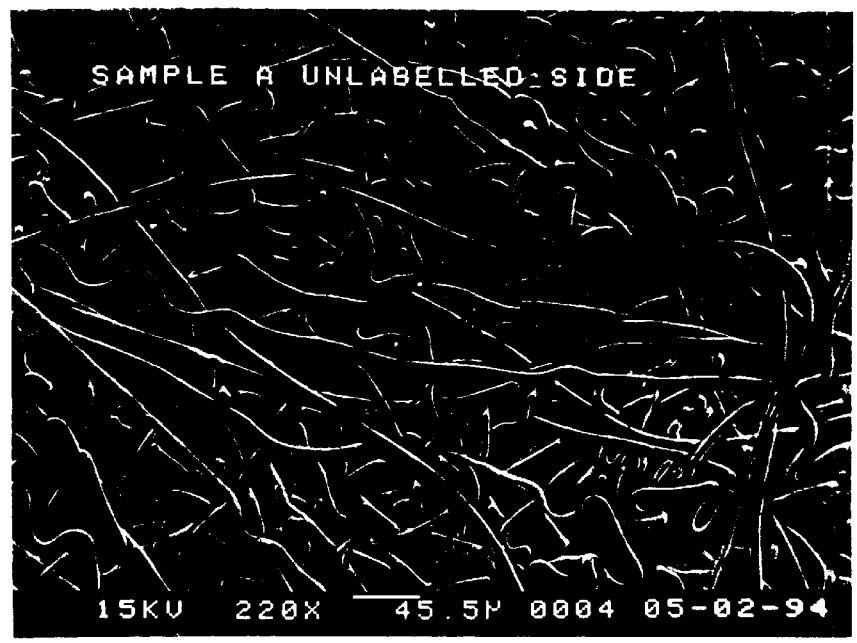
FIG. 12 is a scanning electron micrograph (220X) of a melt-blown fibrous non-woven web prepared in accordance with the present invention.

A porous sheet 45×100 cm was prepared using the crossed fiber streams and the scanning system of the present invention with 3.2 cm of mercury vacuum applied at connection 62 in FIG. 6, using a 0.13 cm diameter air nozzle and air pressure of 0.5 kg/cm², PBT resin rate 0.51 g per minute per nozzle of resin at 302° C., and a DCD of 4.1 cm; the thickness of resulting product was 0.020 cm, and weighed 0.0054 g/cm². An SEM of this specimen is shown in FIG. 12 at 220X. The diameters of all of the fibers shown on this photo and on three photos of neighboring areas were measured. More than 95% of the fibers were within the range of 3.5 to 7.7 μm diameter, i.e., a ratio of 1:2.2, which is a remarkably narrow fiber diameter range for a melt-blown product. The narrow fiber diameter range of the product made it practical and fast to determine the RMS average diameter by microscopy to be 5.9 μm with a standard deviation of 1.4 μm. Other examples of the present invention were similarly evaluated, and the results summarized in Table VII.

EXAMPLE 43

A porous fibrous sheet 45×100 cm was prepared using the crossed fiber streams and the scanning system of the present invention in the manner described for example 42 except that the air nozzle diameter was 0.11 cm diameter, the air pressure was 1.4 Kg/cm$^2$, and the DCD was 3.3 cm. The fiber diameter characteristics are shown in Table VII.

EXAMPLE 44

A porous fibrous sheet was prepared in a manner identical to example 43 except that the air pressure was 1.06 Kg/cm$^2$. The fiber diameter characteristics are shown in Table VII.

TABLE VII

| Porous Medium Example Number | 90% of the Fibers in diameter range ($\mu$m) | Ratio max/min | Average fiber diameter, $\mu$m (arithmetic) |
|---|---|---|---|
| 1  | 2.5–6.2  | 2.50 | 4.0  |
| 3  | 0.5–1.6  | 3.2  | 0.9  |
| 6  | 0.6–1.6  | 2.67 | 1.1  |
| 9  | 0.9–2.5  | 2.78 | 1.4  |
| 10 | 1–3      | 3.00 | 1.9  |
| 14 | 5–12     | 2.40 | 7.9  |
| 15 | 6.5–15   | 2.30 | 10.6 |
| 38 | 1.4–3.9  | 2.78 | 2.4  |
| 39 | 3.5–7.8  | 2.22 | 5.5  |
| 40 | 5.1–11.3 | 2.21 | 7.9  |
| 41 | 6.7–13.3 | 1.98 | 10.0 |
| 42 | 3.5–7.7  | 2.20 | 5.9  |
| 43 | 4.2–7.7  | 1.83 | 5.9  |
| 44 | 6.4–10.1 | 1.58 | 8.1  |

EXAMPLE 45

Figure 13:
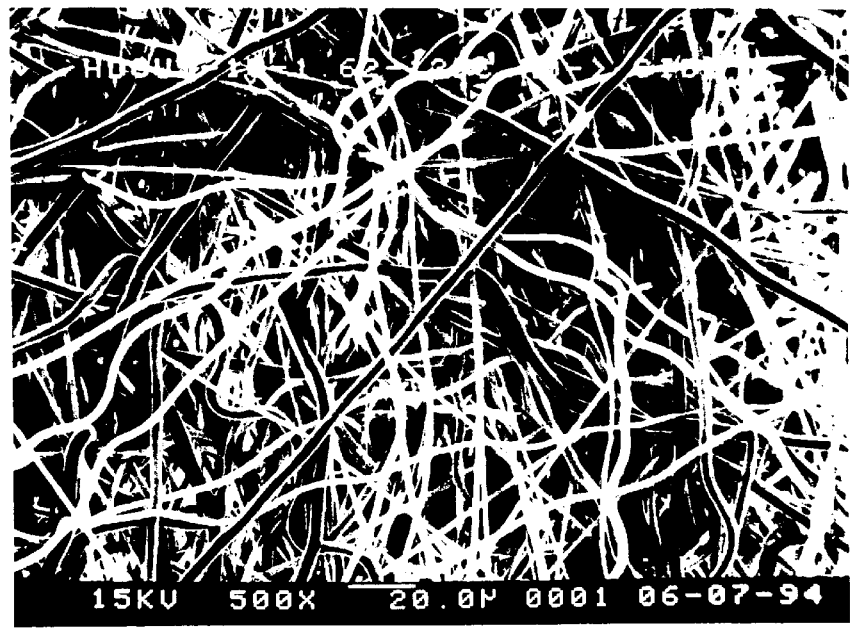
FIG. 13 is a scanning electron micrograph (500X) of a melt-blown fibrous non-woven web prepared in accordance with the present invention.

Example 45 was prepared in the same manner as example 42 except that the air nozzle diameter was 0.17 cm, the air pressure was 0.74 kg/cm$^2$, and the resin temperature was 304° C. The resulting product is shown in the SEM of FIG. 13 at 500X. Compared with FIG. 12, FIG. 13 appears at first glance to be less uniform. On analysis, a count of 100 fibers showed 39% of the fibers (those seen in the foreground) to be in the diameter range of 2.5 to 4.5 $\mu$m, with an average diameter of 4.2 $\mu$m, and the remaining 61%, in the lower plane of the SEM, were in the range of 1.1 to 2.3 $\mu$m, with an average diameter of 1.9 $\mu$m; only one fiber of the 100 counted was found between 2.3 and 2.8 $\mu$m, compared with 23 fibers between 2.2 and 2.3 $\mu$m and 27 fibers between 2.8 and 3.5 $\mu$m. This clearly establishes a bimodal distribution, which could be explained if the larger diameter fibers were assumed to travel directly from the fiberizer nozzles to the collector cylinder, whereas those of smaller diameter representing fibers which were diverted by the aerodynamics to travel a longer distance prior to contacting the collector cylinder. The fibers are seen to be oriented, with their direction of travel and deposition being in the CMD. The two types of fibers are each within a diameter range max.:mm. of approximately 2:1.

EXAMPLE 46

Figure 14:
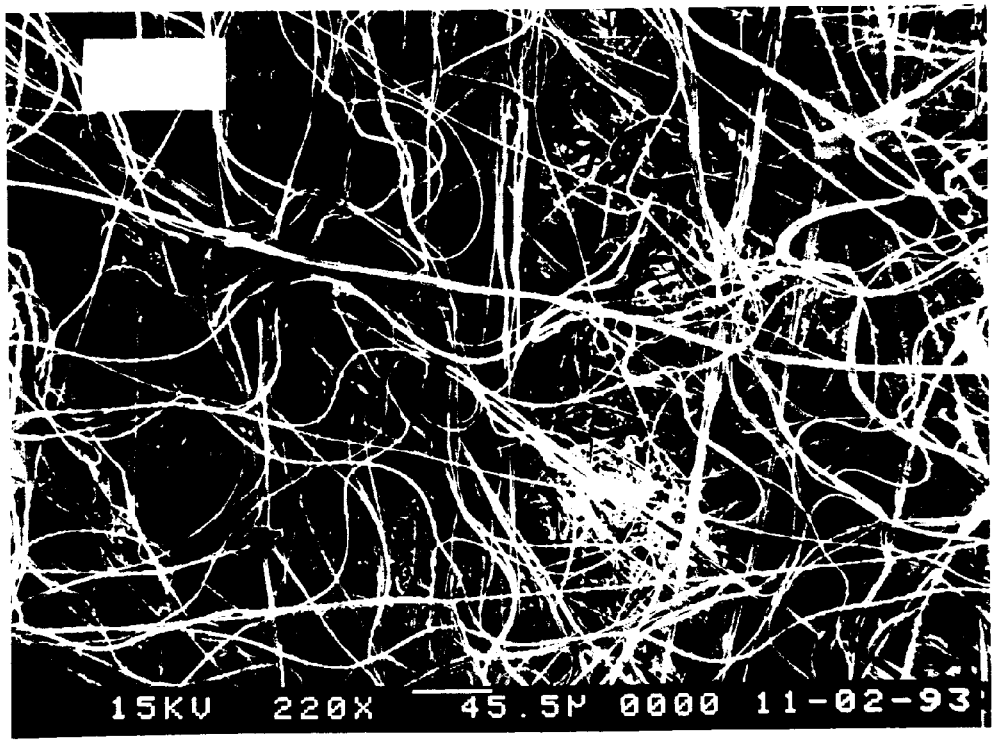
FIG. 14 is a scanning electron micrograph (220X) of a typical commercially available melt-blown fibrous non-woven web.

Example 42 (FIG. 12) may be compared with the SEM of example 46 shown in FIG. 14, a typical commercial product, which has 90% of its fibers in the range between about 0.5 and 5 $\mu$m, i.e., a max/min ratio of 10:1, not counting the oddly shaped mass in the upper left quadrant of the picture. Note also the large number of twinned fibers, along with occasional light roping.

EXAMPLE 47

Direct measurement of weight uniformity was accomplished by cutting 1" squares from test sheets. In one such test a 0.0064 g/cm$^2$ polypropylene sheet made using the process of the invention was cut along its 96 cm length to provide 91 2.540 cm squares representative of the length, or machine direction, of the sheet. Each square was weighed, and the linear average was calculated to be 0.0410 g/cm$^2$, with a probable error of 0.8%. Uniformity in the cross-machine direction of the 46 cm width of the sheet was similarly determined by cutting 39 2.540 cm squares in the cross machine direction; these were also 0.0410 g/cm$^2$ in average weight, with a probable error in the linear average of 0.7%. Of these probable error estimates, 0.2 to 0.3% or more may be due to errors in the dimensions of the cut squares.

EXAMPLE 48

An alternate means to determine uniformity of weight was provided by the use of a β-ray backscatter instrument, Model 103, made by the NDC Systems of 730 East Cypress Avenue, Monrovia, Calif. This instrument is fitted with a 0.64 cm diameter lens through which a controlled beam of β-radiation is passed. The lens is surrounded by a 3.5 cm diameter peripheral back-scatter collection system. The quantity of backscattered radiation is, when averaged, proportional to the weight per unit area of the sheet. The instrument is fitted with a recording system and with means to scan the lens assembly at a uniform rate, for example at 1.3 cm/second, over the surface of the sheet of which the weight is to be measured. The sheet of which the measurement is made must be suspended from its edges in a manner such that no metal is less than about 10 cm distant from the lens.

As described herein, the scanning was accomplished by a single pass at 1.3 cm/second in one direction over the sheet to be tested with the concentric lens assembly in light contact with the surface of the sheet. The recorder measures the numbers and intensity of the individual backscattered β-rays and averages their energy over a ten second period, providing a continuous line on the recorder chart. The accuracy of the system is such that when the sensor is repeatedly exposed to the identical cycle the recorded signal may vary on average by about ±0.5%.

Figure 15:
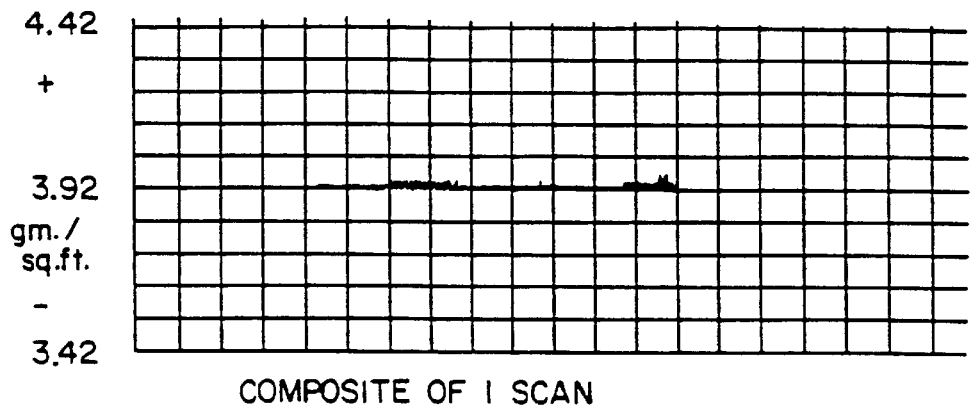
FIG. 15 depicts a β-ray backscatter record in the cross-machine direction for a melt-blown fibrous non-woven web prepared in accordance with the present invention.
Figure 16:
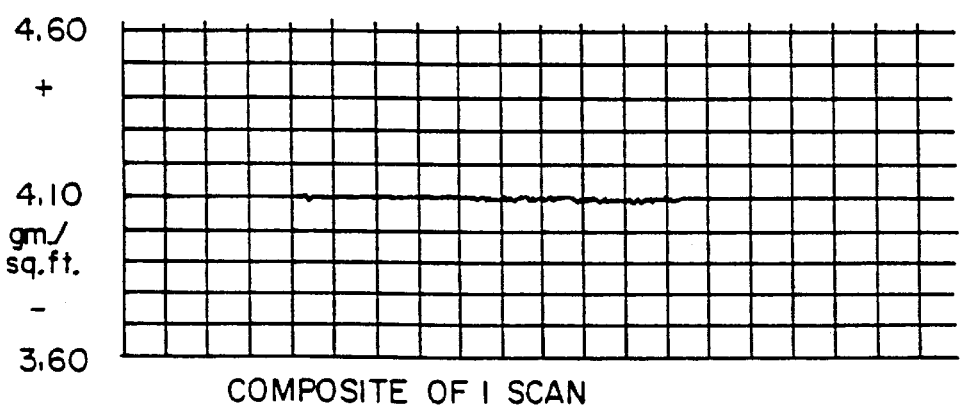
FIG. 16 depicts a β-ray backscatter record in the machine direction for the same melt-blown fibrous non-woven web prepared in accordance with the present invention as is the subject of FIG. 15.

FIGS. 15 and 16 shows the records obtained when a typical product of the present invention is scanned in the cross-machine direction and in the machine direction, respectively. In FIG. 15 the maximum deviation from the mean weight is (3.96–3.91)/2 or 0.025 grams/sq. ft. (0.27 g/m$^2$), in a sheet weight of 3.94 grams/sq. ft. (42 g/m$^2$), hence with a maximum deviation from the mean of 0.64%. Maximum deviation in the machine direction is shown in FIG. 16 to be 0.26%.

EXAMPLE 49

A typical product of the invention in the form of a 50×100 cm sheet with 85% voids volume was tested to determine its thickness 48 places on 10 cm centers. The mean thickness was 0.027 cm, the standard deviation was 0.7%, and the probable error was 0.4%, indicating a thickness uniform to within 1%.

EXAMPLES 50–56

The apparatus which was used to produce examples 50 to 56 was used with an air aperture 0.11 cm in diameter supplied with air at 301° C. DCD and air pressure were adjusted to prepare 3 lots of media with the characteristics noted in Table VIII, which were then grafted using the procedures described above under the heading "Use of Mixed Monomers," and tested to determine their BSA and IgG adsorptions in the manner described above. The results shown in Table VIII demonstrate the ability of the use of mixed monomers to adjust the protein affinities of the media of the invention. For comparison, product made using 100% HPA have IgG protein adsorption of about 3 µg per cm$^2$.

The media presented in Table VIII were grafted using the procedure described above, in this case by preparing a solution containing MAA and HPA in the indicated proportions, and delivering the solution dropwise through a 0.015 cm inside diameter hypodermic needle dropwise onto an evaporator connected with but located externally to the apparatus, the evaporator maintained at the ambient (normal room) temperature (approximately 21° to 22° C.).

Specific Embodiments of Devices

Devices according to the invention can be used with a variety of fluids, including biological fluids containing various analytes and other substances. Embodiments of the present inventive devices are particularly well-suited for use with blood and blood products, such as separating plasma from blood or other plasma-containing biological fluid, or separating a virus from plasma or other suitable biological fluid. The present inventive device may also be configured to separate large viruses (including viruses of about 0.08 µm in effective diameter or larger) from small viruses (including viruses of about 0.025–0.028 µm in effective diameter), or to separate mixtures of components chromatographically. The following specific embodiments of the present inventive device are described with to such illustrative uses.

In one embodiment, this device has a first region for receiving a sample of a biological fluid, e.g., blood, that includes plasma, and a second region into which said plasma flows separated from the blood. The device can include a first region for receiving a sample of a biological fluid that includes plasma, and a second region for accumulating the plasma. The placement onto the first region of a biological fluid comprising plasma and at least one cellular component such as red and/or white blood cells can result in plasma accumulating in the second region which is essentially red cell free and may be cell-free.

The device may further comprise at least one additional porous medium in fluid communication with the melt-blown substantially uniform fibrous web so that plasma may flow from the uniform fibrous web into the porous medium or media. For example, plasma from the uniform fibrous web may be wicked from the fibrous web into a downstream medium or media. The plasma in either the web or medium may be analyzed as appropriate. Thus, at least one analyte of interest may be detected in the web. Alternatively, or additionally, at least one analyte of interest may be detected in or on the downstream medium or media. In some embodiments, a device according to the invention may comprise a porous composite structure, including at least one melt-blown substantially uniform fibrous web and at least one porous medium downstream of the web.

In a preferred embodiment, a device according to the invention comprises at least one melt-blown substantially uniform fibrous web and at least one additional porous medium downstream of the web, wherein the additional porous medium comprises a microporous membrane that allows the plasma to flow from the uniform fibrous web into the membrane. As noted above, at least one analyte of interest may be detected in or on this downstream membrane. In some embodiments, a binding agent, e.g., a fibrous thermoplastic resin, may be interposed between the web and the microporous membrane.

In another preferred embodiment, a device according to the invention comprises at least two melt-blown substantially uniform fibrous webs configured to provide fluid communication between the webs. In one embodiment of the device, one of said melt-blown substantially uniform fibrous webs includes a region for receiving a biological fluid containing an analyte and other substances, and another melt-blown substantially uniform fibrous web includes a region into which said analyte flows without at least a portion of said other substances. In accordance with this embodiment, biological fluid can be placed on a first surface of a first melt-blown substantially uniform fibrous web, and the analyte, either separated from the other substances, or not separated from the other substances, can pass through a second surface of the web. This second surface of the web can be, but need not be, opposite the biological fluid receiving first surface. The analyte can pass through a first surface of the additional web into the analyte receiving portion of the additional web. In some embodiments, passing the biological fluid into and/or through the additional web provides for separating the analyte from the other substances in the biological fluid. The flow through at least one of the webs may be predominantly vertical, or predominantly horizontal. Similarly, the flow from one web to another may be predominantly vertically through the device, or predominantly horizontally through the device.

In one preferred embodiment, a device, comprising a melt-blown substantially uniform fibrous web and an additional porous medium comprising a microporous membrane in fluid communication with the web, further comprises at least one more porous medium, preferably an additional melt-blown fibrous web, even more preferably a second melt-blown substantially uniform fibrous web, wherein the microporous membrane is interposed between the additional web and the first web.

In accordance with this embodiment, plasma is allowed to flow from the first uniform web, through a microporous membrane, and into the second web. Preferably, the device is configured with the membrane arranged across the plasma flow path so that at least one analyte may be captured or isolated in or on the membrane. Illustratively, the plasma flows substantially laterally through the first fibrous web, then substantially perpendicularly through the analyte-capturing surface of the membrane, through the membrane surface opposite the analyte-capturing surface, and substantially laterally through the second fibrous web. Preferably, the microporous membrane of the device, interposed between the fibrous webs, may capture or isolate at least one analyte such as a virus or a bacterium, which may be analyzed. Even more preferably, the microporous membrane is removable, permitting analytical procedures to detect analytes which may have been captured in or on the membrane. Analyzing the analyte may include lysing the analyte, and, for example, amplifying the analyte's nucleic acid, preferably by a polymerase chain reaction. Analyzing may include examination by electron microscopy.

In an embodiment, the device is arranged for ease of separation, if necessary, of the membrane from the first and second webs at an appropriate time, e.g., after capturing an analyte such as a virus in or on the membrane, but before lysing the analyte, if necessary, and amplifying, as appropriate, a portion of the analyte's nucleic acid.

In some embodiments, the device includes at least one nonporous or substantially impermeable structure to provide, for example, support, reduced biological fluid evaporation, and/or maintained contact between the fibrous web and at least one additional porous medium. Alternatively, or additionally, at least one nonporous or substantially impermeable structure may assist in delivering biological fluid to the device and/or withdrawing biological fluid from the device.

FIGS. 17–24, and 26–32 illustrate embodiments of biological fluid processing devices according to the invention that include at least one melt-blown substantially uniform fibrous non-woven web. FIG. 23 illustrates an embodiment wherein a biological fluid processing device is placed in a container. Common elements of the devices have the same reference numbers.

For example, in the embodiments illustrated in FIGS. 17–20, and 26–32, a device 100 includes at least one melt-blown substantially uniform fibrous web 1, wherein the web preferably includes a biological fluid application area or zone 150 on at least a first surface of the web 1.

Figure 19:
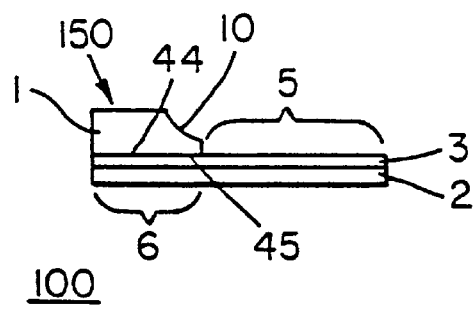
FIG. 19 is a side view of a preferred embodiment of the present inventive test strip utilizing a single web, an additional porous medium, and a substantially impermeable structure.
Figure 26:
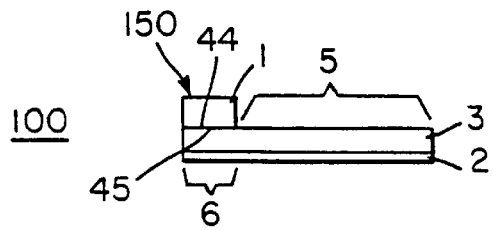
FIG. 26 is a side view of another embodiment of the present inventive test strip utilizing a single web, an additional porous medium, and a substantially impermeable structure.
Figure 32:
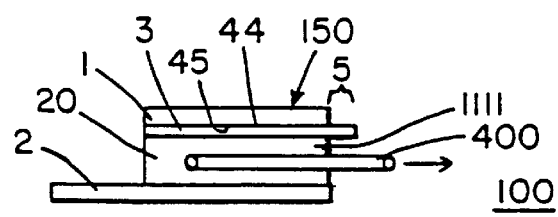
FIG. 32 is cross-sectional side view an embodiment of the present invention including a plurality of webs and a removable capillary.

The illustrated device of FIGS. 19, 26, and 32 also include at least one additional medium 3, which preferably comprises a porous medium such as a microporous membrane. The device may include a plurality of microporous membranes. The web 1 and the other medium 3, e.g., the membrane, may be bound together. For example, in the embodiments illustrated in FIGS. 19 and 26, a binding agent such as a fibrous resin may form a bond between the second surface 44 of the web 1 and the upstream surface 45 of the medium 3.

Figure 20:
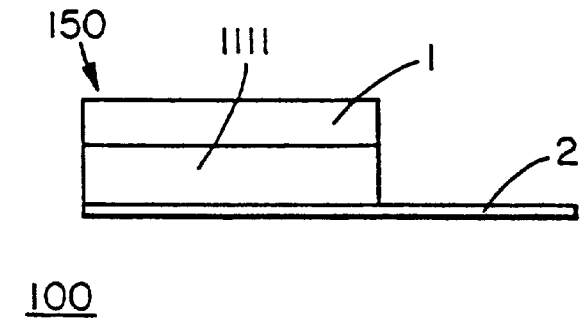
FIG. 20 is a side view of another embodiment of the present inventive test strip utilizing two webs and a substantially impermeable structure.

There can also be a bond between fibrous webs, e.g., a binding agent such as a fibrous resin may form a bond between melt-blown substantially uniform fibrous webs 1 and 1111 in the embodiment illustrated in FIG. 20. Additionally, or alternatively, in other embodiments, a bond can be formed using, for example, a pressure sensitive adhesive.

In some embodiments of the device, including those having a fibrous binding agent between the webs 1 and 1111 (FIG. 20); between the web 1 and the additional medium 3 (FIGS. 19, 26 and 32) and/or between the medium 3 and web 1111 (FIG. 32), the webs and/or medium may be separated at a suitable time, e.g., before determining the presence of the analyte(s).

In some embodiments wherein the web and membrane are bound, e.g., as illustrated in FIGS. 19 and 26, a first portion 6 of medium 3 is bound to the web 1, and a second portion 5 of the medium 3 extends beyond web 1. As illustrated in FIG. 32, wherein medium 3 is interposed between webs 1 and 1111, a portion of one surface of medium 3 is bound to a surface of web 1, and a portion 5 extends beyond the web 1, and a portion of another surface of medium 3 is bound to a surface of web 1111, and a portion extends beyond the web 1111.

As illustrated in FIGS. 19, and 29–31, the melt-blown substantially uniform fibrous web 1 may include at least one compressed portion 10. In the embodiment illustrated in FIG. 19, additional medium 3 comprises a porous medium, preferably a porous membrane.

Device 100 as illustrated in FIGS. 17–20 and 26–32 further includes at least one additional structure or member 2, preferably a substantially impermeable structure. More preferably, structure 2 comprises a nonporous plastic film or sheet.

Figure 17:
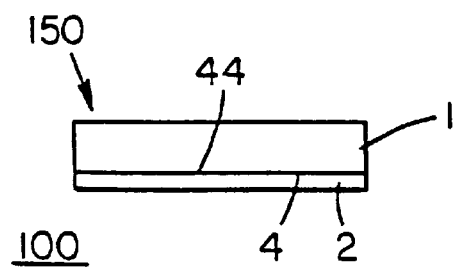
FIG. 17 is a side view of an embodiment of the present inventive test strip utilizing a single web and a substantially impermeable structure.
Figure 18:
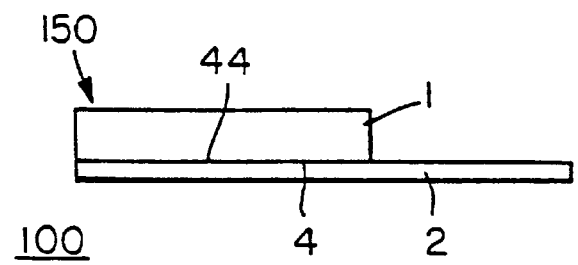
FIG. 18 is a side view of another embodiment of the present inventive test strip utilizing a single web and a substantially impermeable structure.
Figure 27:
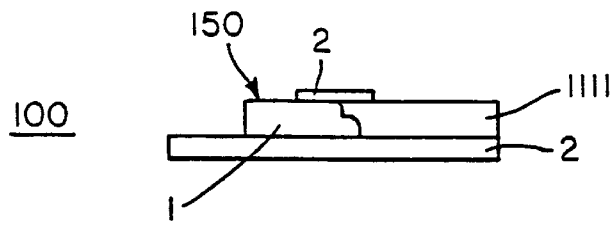
FIG. 27 is a side view of another embodiment of the present inventive test strip utilizing two webs, and two substantially impermeable structures.
Figure 28:
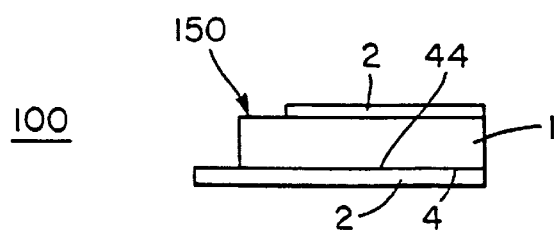
FIG. 28 is a side view of another embodiment of the present inventive test strip utilizing a single web, and two substantially impermeable structures.

Structure 2 may be bound to at least one fibrous web and/or at least one porous medium 3. For example, as illustrated in FIGS. 17, 18, and 28, first surface 4 of structure 2 may be bound to second surface 44 of fibrous web 1. Similarly, as illustrated in FIGS. 19, 20, 26, and 27, structure 2 may be bound to porous medium 3 (FIGS. 19 and 26), and/or fibrous webs 1 and/or 1111 (FIGS. 20 and 27). Two or more structures 2 may be bound to a device, as shown in FIGS. 27 and 28, for example. A variety of bonds are suitable. For example, a fibrous resin may be used to form the bond, and/or structure 2 may include an adhesive, such as a pressure sensitive adhesive.

Alternatively, or additionally, in some embodiments, for example, as illustrated in FIGS. 29–32, the device may include at least one substantially impermeable structure 400 such as a capillary, e.g., to deliver biological fluid the device and/or withdraw biological fluid from the device.

The device may include a plurality of melt-blown fibrous webs, with or without additional medium 3 and/or structure 2. As noted above, and as illustrated in FIGS. 20, 27, and 32, the device 100 may include at least one additional melt-blown substantially uniform fibrous web 1111. The webs 1 and 1111 may be bound to each other, e.g., via a binding agent such as a fibrous resin that forms a bond, for example in an embodiment according to FIG. 20. Additionally, or alternatively, at least one additional structure 2 may be utilized to maintain the contact between the webs, as illustrated in FIG. 27. Typically, with respect to the embodiment illustrated in FIG. 27, while webs 1 and 1111 are in physical contact with each other, there is no bond between them.

Figure 21:
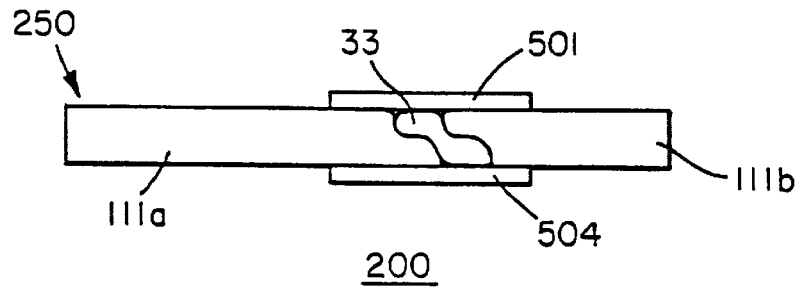
FIG. 21 is a side view of an embodiment of the present inventive test strip utilizing an interposed membrane.
Figure 22:
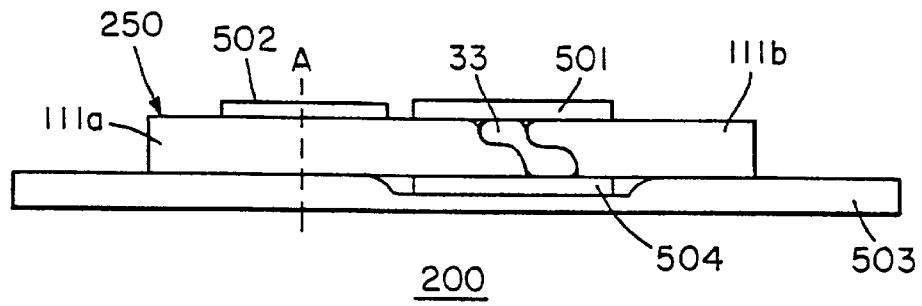
FIG. 22 is a side view of a more preferred embodiment of the present inventive test strip utilizing an interposed membrane.
Figure 24:
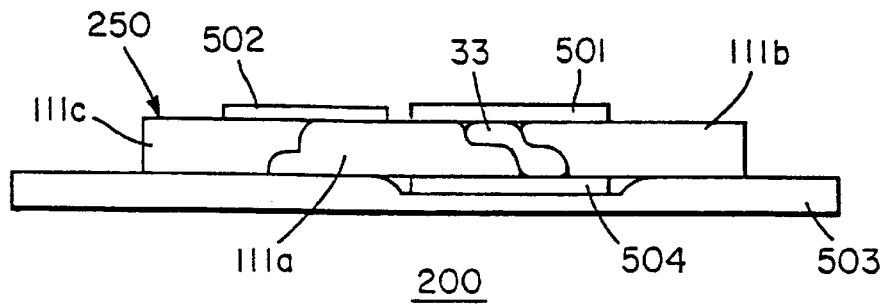
FIG. 24 is a side view of another embodiment of the present inventive test strip utilizing a three webs and a membrane interposed between two of the webs.
Figure 23:
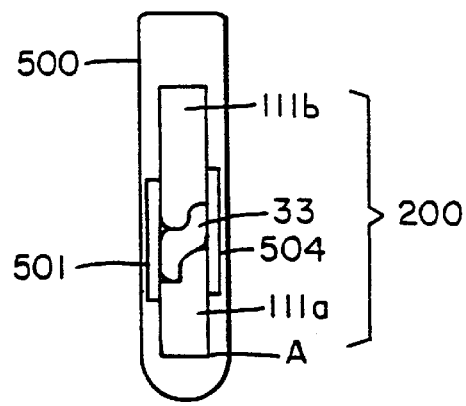
FIG. 23 is an embodiment of the present invention illustrating a test device placed in a container.

In other embodiments, for example, as illustrated in FIGS. 21, 22 and 24, a device 200 includes a plurality of melt-blown substantially uniform fibrous webs 111a, 111b, and another porous medium 33 such as a microporous membrane, interposed between the fibrous webs 111a and 111b. Device 200 may include at least one additional melt-blown substantially uniform fibrous web 111c, upstream of web 111a, as shown in FIG. 24.

Preferably, an upstream uniform fibrous web 111a (FIGS. 21 and 22) or 111c (FIG. 24) includes a biological fluid application area or zone 250. Typically, with respect to the embodiments illustrated in FIGS. 21, 22, and 24, there is no binding agent or bond between the webs 111a, 111b and the medium 33, and the physical contact between the webs and medium 33 allows efficient fluid communication.

The device may include at least one additional medium, preferably at least one substantially impermeable structure or member, such as at least one nonporous medium. As illustrated in FIGS. 21, 22, and 24, device 200 includes additional media 501 and 504, and device 200 in FIGS. 22 and 24 also includes additional media 502 and 503. Preferably, these additional structures 501–504 are nonporous media, such as a nonporous plastic sheets or films. Structures 501–504 in device 200, and structure 2 in device 100 may comprise the same or similar media.

In some embodiments, an additional medium such as a nonporous medium 2, and 501–504, provides for decreased evaporation, e.g., as biological fluid, and more particularly, plasma, passes through a web and/or another porous medium. For example, at least one nonporous medium 501–504 decreases evaporation as plasma passes through uniform web 111c and/or 111a, and porous medium 33. Similarly, the nonporous medium 2 may decrease evaporation as plasma passes through web 1 and/or 1111.

A nonporous medium may provide support for at least one porous medium, e.g., uniform web 111a, 111b, 111c, and/or porous medium 33, and/or provide maintained contact and allow efficient fluid communication between a plurality of media, e.g., between the fibrous webs 111a, 111b, and the porous medium 33, and/or between the fibrous webs 1 and 1111.

At least one medium such as a nonporous medium may provide a defined application zone for contacting the melt-blown fibrous web with the biological fluid. In an embodiment, a non-porous medium can be modified, e.g., perforated, wherein the preformation(s) provide the defined application zone. Another advantage of utilizing a nonporous medium to provide a defined application zone is to improve the separation efficiency of the web, by allowing more of the sample to enter the interior of the web, and minimize surface wetting of the web.

In general, the melt-blown fibrous non-woven web which contains a region for receiving the biological fluid sample will possess a substantially uniform structure. While other fibrous webs which may exist in the present inventive device are preferably also of such a substantially uniform structure, this is less critical in many applications. Thus, for example, in the embodiments depicted in FIGS. 17–24, and 26–32, non-woven webs 1 and 111a have such substantially uniform structures. While the present inventive device can comprise other porous media which can be melt-blown fibrous non-woven webs, and while such other melt-blown fibrous non-woven webs, such as non-woven webs 1111, 111b, and 111c of the embodiments depicted in FIGS. 20–24, and 27, need not have substantially uniform structures, such other porous media are preferably also substantially uniform melt-blown fibrous non-woven webs, particularly when such porous media are in fluid communication, either upstream or downstream, with a porous membrane which forms a part of the present inventive device.

As will be noted in more detail below, melt-blown substantially uniform fibrous webs according to the invention allow plasma or serum to be efficiently separated from a biological fluid such as blood, and allow the plasma or serum front to pass quickly and substantially evenly through the fibrous web. Additionally, embodiments of the invention allow a sufficient amount of plasma for a diagnostic test to be separated from a sample of, for example, less than about 20 µL of blood. For example, a sufficient amount of plasma for a diagnostic test can be separated from a sample of as little as about 10 µL of blood. Moreover, embodiments of the invention provide for efficient plasma separation from blood samples having a range of hematocrits, e.g., greater than about 30%. For example, efficient plasma separation can be obtained from blood samples having hematocrits in the range of about 34% to about 58% or more. Typically, blood samples placed in contact with devices according to the invention have hematocrits in the range of from about 38% to about 46%.

There are a variety of techniques for determining the plasma separation efficiency of fibrous webs produced in accordance with the invention, and a variety of types of blood samples may be evaluated by performing these determinations. A sample of blood may, for example, be obtained by a finger prick; a capillary, e.g., a microhematocrit tube; or withdrawn from a human or non-human by a syringe; or taken from donated blood, and placed in contact with the fibrous web.

Illustratively, using the configuration of the device in FIG. 17 for reference, the sample can be delivered to the porous web 1 at application area 150. When the sample is applied by contacting the web to a finger prick, the weight of the blood may be determined by weighing the device before and after application. Alternatively the blood volume may be measured using a pipette, or by other suitable means. The applied blood sample may be absorbed into the porous web of the device, after which a red cell front may be seen to travel lengthwise along the porous strip of web. After a short period, the red cells cease migrating while the colorless plasma continues to travel further along the length of the strip. The plasma containing portion may be used in or as a diagnostic device, for example to determine the proportion of a component of interest contained in the plasma, or for other useful purpose or purposes.

The weights or volumes of clear plasma collected and the efficiency with which the plasma was separated have been determined for the plasma separation devices of the invention by at least one of the methods described below.

In method #1, the tare weight of the device can be predetermined and the blood sample then applied as close as practically possible to one end of the strip. When migration is observed to cease, the device can be cut or otherwise separated to provide a section containing only clear plasma. The weight of the clear plasma collected $w_4$ can then be determined as follows:

(A) Calculate the weight of plasma collected:
  $W_1$=Tare weight of the test strip, grams.
  $W_2$–Weight of the test strip after application of the blood sample; thus the weight of blood applied is $W=W_2-W_1$.
  $L_1$=Length of the test strip, cm.
  $L_2$=Length of the section cut to contain only clear plasma.
  $W_3$=Weight of the section cut to contain only clear plasma.

Then the tare weight of the section cut to contain only clear plasma is $$\frac{L_2 W_1}{L_1}$$

and the weight of the collected plasma is therefore $$W_4 = W_3 - \frac{L_2 W_1}{L_1}$$

(B) Calculate the efficiency with which the plasma was collected.

The weight $W_5$ of plasma in a blood sample of hematocrit H% and weight W is $$W_5 = W\left(1 - \frac{H}{100}\right)$$

The plasma collection efficiency is therefore $$\frac{100 W_4}{W_5}\%$$

In method #2 the cut off section containing the plasma can be weighed and then washed with saline, then with water, and then dried and reweighed to allow calculation of the weight of the collected plasma.

In method #3 the efficiency of plasma collection may be defined as the length of the section of the test strip wetted by plasma divided by the total wetted length of the test strip and then multiplying by 100 to obtain the efficiency expressed as per cent (%). The total length wetted by the blood sample is the sum of the length wetted by the plasma and the length wetted by the red blood cells.

The assay methods described above should be used with due care to minimize errors due to evaporation by limiting the time that the specimens are exposed to the ambient atmosphere, thus reducing to a negligible level errors due to evaporation. Errors due to evaporation are minimized in the configuration illustrated in FIG. 28.

In any of the methods, the plasma collection efficiency can be calculated, providing that the hematocrit (H%) of the blood has been determined.

In accordance with some embodiments of the invention, webs produced in accordance with the invention provide efficient plasma separation using a single layer of web. The webs of the present invention provide efficient plasma separation when the plasma flow is directed parallel to or perpendicular to the fiber orientation. When the length of the test strip is in the cross machine direction (CMD), the plasma tends to flow closer to parallel to the fiber direction, hence the separation is generally accomplished in a shorter time. When the length of the strip is in the machine direction (MD), which is perpendicular to the orientation of a majority of the fibers, the separation is accomplished in a longer time.

Illustratively, a web can be produced as described earlier such that 90% of the fibers have a diameter ranging from a minimum fiber diameter to a maximum fiber diameter which is no more than about three times the minimum fiber diameter. The length of the web can be in the machine direction, or in the cross machine direction. After contacting the web with blood having a hematocrit of, for example, about 38% to about 45%, the plasma collection efficiency is typically greater than about 15%, using either type of web. In some embodiments, the plasma collection efficiency can be greater than about 25% using either type of web.

Preferably, with respect to flow parallel to the fiber orientation, the plasma collection efficiency can be greater than about 30%, and can be greater than about 40%. With respect to flow perpendicular to the fiber orientation, the plasma collection efficiency preferably can be greater than about 20%, and in some embodiments, the efficiency can be greater than about 25%.

In an embodiment of the invention, a strip such as for example that shown in FIG. 17 can be used to combine the separation of plasma from blood with the conventional means for diagnostic testing as described above. Illustratively, protein coated particles used for a diagnostic function can be placed on the porous strip in the conventional manner, at a location relatively closer to the center than to either end. A blood sample can be placed near one end, and the plasma wicks ahead of the red cells, picks up the preplaced particles, and moves on to the opposite end where a diagnosis can be made; for example spectrophotometrically or by a color change or other means known in the diagnostic art. Notably, such a device may be expected to function well as a diagnostic device even if in use the trailing red cells pass over the central area at which the protein coated particles were deposited.

Since different embodiments of the invention may include passing the plasma through regions of the web having one or more preplaced reagents, including soluble reagents, and/or passing the fluid through a plurality of porous media, the melt-blown substantially uniform fibrous webs according to the invention provide an optimum range of lateral flow times (LFTs) for the desired embodiment. Illustratively, while plasma passes quickly through the fibrous web ahead of, for example, the red blood cells, the LFT should be not so small so as to fail to dissolve a preplaced reagent and/or to fail to allow a sufficient amount of plasma to separate from the red cells. Additionally, consistent with the dissolution time or similar requirements, the LFT should be as small as possible in order to allow the user of the test to reach a conclusion as quickly as possible.

Of course, the uniform structure of webs according to the invention also make them suitable for processing previously separated plasma or serum, since the separated plasma passes quickly and substantially evenly through the fibrous web.

In accordance with the invention, the melt-blown fibrous webs include fibers having a substantially uniform fiber diameter, e.g., wherein 90% of the fibers of the web have a diameter ranging from a minimum fiber diameter to a maximum fiber diameter which is no more than about three times the minimum fiber diameter, e.g., a maximum fiber diameter no more than about 2.5 times the minimum fiber diameter, or a maximum fiber diameter no more than about 2.2 times the minimum fiber diameter.

In a more preferred embodiment, 90% of the fibers of the web have a diameter ranging from a minimum fiber diameter to a maximum fiber diameter which is no more than about two times, e.g., a maximum fiber diameter no more than about 1.8 times the minimum fiber diameter, or a maximum fiber diameter no more than about 1.6 times the minimum fiber diameter. In some embodiments, 90% of the fibers of the web may have a diameter ranging from a minimum fiber diameter to a maximum fiber diameter which is no more than about 1.5 times the minimum fiber diameter.

In accordance with the invention, webs can be produced including fibers having a selected substantially uniform fiber diameter. The fiber diameter is determined as described earlier.

For example, webs can be produced according to the invention including fibers having an average fiber diameter in the range of about 0.5 $\mu$m or less, to about 20 $\mu$m or more. More preferably, the average fiber diameter is in the range of about 0.7 $\mu$m to about 15 $\mu$m, even more preferably, about 0.7 $\mu$m to about 10 $\mu$m. In some embodiments, the range is about 1 $\mu$m to about 7 $\mu$m, for example, about 2 $\mu$m to about 6 $\mu$m. In one embodiment, a web according to the invention comprises fibers having an average fiber diameter of less than about 2 $\mu$m. For example, webs according to the invention include fibers having an average fiber diameter of about 1.9 $\mu$m, about 1.8 $\mu$m or about 1.6 $\mu$m.

In another embodiment, the fibers have an average fiber diameter of about 1.5 $\mu$m or less, and in some embodiments, about 1 $\mu$m or less. Illustratively, webs according to the invention comprises fibers having an average fiber diameter of about 1.3 $\mu$m, about 1.1 $\mu$m, or about 0.9 $\mu$m.

Of course, in some embodiments including two or more fibrous webs, at least two of the webs may have include fibers having different average fiber diameters.

In a preferred embodimrnt, melt-blown webs according to the invention include a substantially uniform weight distribution, e.g., varying by less than about 10%, even more preferably varying by less than 1%, over a unit area as described earlier.

Webs produced in accordance with the invention can have a variety of basis weights. Illustratively, the basis weight may be in the range from about 0.001 g/cm$^2$ (about 1 g/ft$^2$) or less to about 0.05 g/cm$^2$ (about 50 g/ft$^2$) or more. In some embodiments, the basis weight is about 0.03 g/cm$^2$ (about 30 g/ft$^2$) or less. More preferably, the basis weight is about 0.02 g/cm$^2$ (about 20 g/ft$^2$) or less, for example, in the range from about 0.002 g/cm$^2$ to about 0.012 g/cm$^2$ (about 2 to about 12 g/ft$^2$). Typical basis weights include about 0.002 g/cm$^2$, about 0.004 g/cm$^2$ (about 4 g/ft$^2$), about 0.005 g/cm$^2$ (about 5 g/ft$^2$), about 0.006 g/cm$^2$ (about 6 g/ft$^2$), and about 0.011 g/cm$^2$ (about 10 g/ft$^2$). Of course, in some embodiments including two or more fibrous webs, at least two of the webs may include different basis weights.

The present inventive melt-blown fibrous non-woven web is preferably also substantially free of roping, twinning, striping, and shot, and, in more preferred embodiments as described earlier, can be characterized by a tensile strength in a first direction at least about 1.2 times the tensile strength in a second direction 90° to the first direction.

The melt-blown substantially uniform fibrous webs of the present invention preferably have a substantially uniform voids volume. In some embodiments, e.g., where it is desirable to obtain a specified range of LFTs, the webs according to the invention can be produced with a preselected substantially uniform voids volume to obtain a desired LFT. One protocol for determining the lateral diffusion of the present melt-blown webs is described earlier, using an apparatus as illustrated in FIG. 8.

In accordance with the invention, the present melt-blown webs preferably have a substantially uniform voids volume of at least about 40%, e.g., in the range of from about 45% to about 98%. The voids volume may be determined as described earlier. In some embodiments, the voids volumes of the products of the invention vary by about 3% or less, e.g., about 0.2% or less, from sheet to sheet when measured over a 100 cm² area.

In some embodiments, the present melt-blown webs preferably have a substantially uniform voids volume in the range of from about 60% to about 94%, and more preferably, in the range from about 65% to about 90%. Illustratively, melt-blown webs in accordance with the invention can have substantially uniform voids volumes in the range from about 70% to about 85%, e.g., about 74%, about 77%, about 78%, about 80%, about 82%, or about 85%.

In some embodiments, melt-blown webs in accordance with the invention can have a substantially uniform voids volume in the range of about 75% to about 85%, more preferably, in the range of about 77% to about 83%. In one embodiment, melt-blown webs in accordance with the invention have a substantially uniform voids volume in the range of from about 78% to about 81%.

Of course, in some embodiments including two or more fibrous webs, at least two of the webs may have different voids volumes.

Melt-blown substantially uniform fibrous webs according to the invention preferably have a substantially uniform thickness. Illustratively, webs according to the invention include thicknesses in the range of from less than about 0.005 cm to about 0.5 cm or more.

In some embodiments, while the fibrous web includes a substantially uniform voids volume, a portion of the web may be compressed to improve the efficiency of processing. Accordingly, a section or portion of the web may include a different voids volume than the rest of the fibrous web.

For example, as shown in FIGS. 19, and 29–31, web 1 may include a compressed section 10. Illustratively, with respect to FIG. 19, while the area of the web that is not compressed, e.g., to the left of section 10, has a substantially uniform voids volume, e.g., about 75% or about 80%, the area of the web within section 10 has a smaller voids volume, e.g., less than about 60%.

As will be noted in more detail below, in some embodiments such as that depicted in FIG. 19, wherein another medium 3 such as a microporous membrane is arranged downstream of the web, and a portion 5 of the medium 3 extends beyond the edge of the web 1, a sample of biological fluid, e.g., a drop of fingerstick blood, is placed in contact with the fibrous web 1 at biological fluid application zone 150. The blood sample is absorbed almost instantly into porous medium 1, and red cells, unable to penetrate the small pores of the membrane are retained, while the plasma passes through the fibrous bond and diffuses laterally along membrane 3, providing an optically transparent plasma saturated membrane, thus enabling detection and identification of analytes in the plasma by for example infrared spectroscopy. The function of the compressed section 10 is to prevent blood cells from seeping laterally through web 1 onto the portion 5 of the medium 3. In some embodiments, a portion of the compressed section 10 can be rendered hydrophobic, to further minimize the seepage of cellular material laterally through the web.

Figure 25:
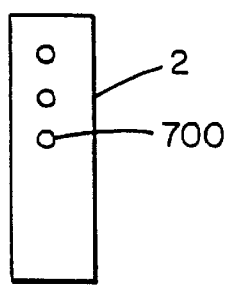
FIG. 25 is a bottom view of a medium configured to provide access therethrough.

In a variation of this procedure support structure 2 (as illustrated in FIG. 25) is a perforated non-porous strip, cut for example from a plastic sheet. As the plasma diffuses within membrane 3, chromatographic separation may take place. Chromatographic separation may take place for example due to size differences (e.g., bacteria or viruses), or due to differential surface affinities. Samples may then be taken at each of the perforations and amplified by a Polymerase Chain Reaction (PCR). Spectrographic analysis of the plasma fraction contained in the membrane over one or more of the perforations may be performed.

Figure 29:
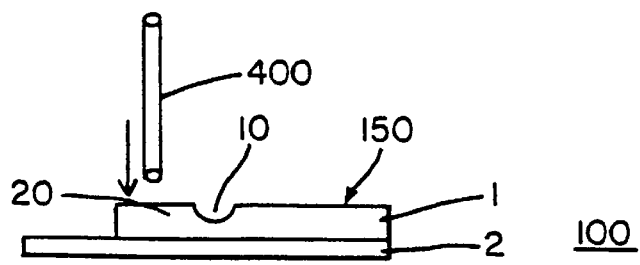
FIG. 29 is a side view of an embodiment of the present invention utilizing a single web and a nonporous structure for use with a capillary.
Figure 30:
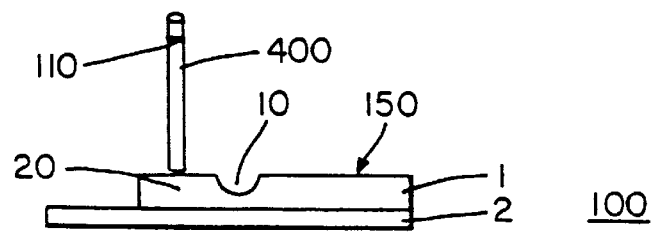
FIG. 30 illustrates one use of the capillary in accordance with the embodiment illustrated in FIG. 29.
Figure 31:
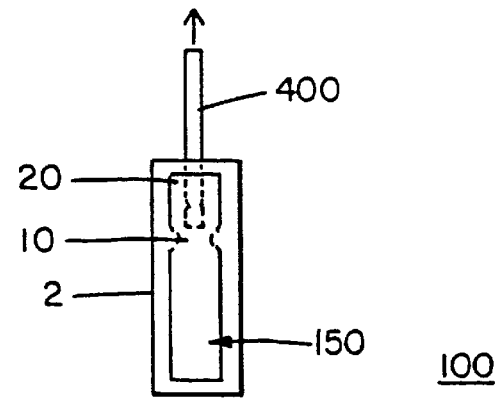
FIG. 31 is top view of an embodiment of the present invention including a capillary that can be removed from a web.

In other embodiments, for example as illustrated in FIGS. 29–31, the area of the web 1 that is not compressed, e.g., on either side of section 10, can have a substantially uniform voids volume, e.g., about 75%, and the area of the web within section 10 can have a smaller voids volume, e.g., less than about 60%. As will be noted in more detail below, in some embodiments, a sample of biological fluid, e.g., a drop of fingerstick blood, is placed in contact with the fibrous web 1 at biological fluid application zone 150. As the blood passes downwardly and laterally, and the plasma front passes ahead of the red cells, separated plasma passes through the web 1, into the portion 20 of the web. However, the compressed section 10 prevents blood cells from seeping laterally through web 1 into the portion 20. If desired, the plasma and/or the analytes flowing with the plasma, may be analyzed in the portion 20. Alternatively, or additionally, plasma may be withdrawn from portion 20 for further use and/or analysis.

For example, as illustrated in FIGS. 29 and 30, a capillary 400 may be placed in contact with device 100 (as shown by the arrow) so that plasma may be passed, by capillary action, from portion 20 into capillary 400. FIG. 30 illustrates plasma passing into capillary 400 to level 110.

In an alternative embodiment, as illustrated in FIG. 31, the device 100 includes capillary 400 inserted in the device before use. For example, device 100 can be configured so that capillary 400 is non-permanently inserted in web 1 or between web 1 and nonporous medium 2 before placing a drop of blood at application zone 150. Plasma passing through the web into region 20 will then fill the capillary 400. The capillary, now filled with plasma, may be withdrawn from the device as illustrated by the arrow in FIG. 31. The separated plasma, and/or the analytes contained therein, may be utilized, e.g., analyzed, as desired.

Additional Media

Preferably, devices according to embodiments of the invention include at least one additional medium, more preferably, two or more media, associated with the melt-blown substantially uniform webs of the invention. For example, devices according to the invention can include at least one medium downstream of the melt-blown substantially uniform fibrous web 1, 1111, 111*a*, or 111*c* (as illustrated in, for example, FIGS. 17, 20–22, 24, and 26–32 respectively). Of course, in some embodiments, devices according to the invention can include one or more media upstream of the melt-blown substantially uniform fibrous webs. A variety of additional media are suitable for use in the present invention, as will be noted in more detail below.

A device according to the invention may include at least one porous medium downstream of the melt-blown substantially uniform fibrous web to allow plasma or serum to pass from the fibrous web into, and possibly through, the downstream medium or media. Similarly, a device according to the invention may include at least one porous medium upstream of the melt-blown substantially uniform fibrous web to allow plasma or serum to pass from the upstream medium or media into, and possibly through, the downstream fibrous web.

Alternatively, or additionally, the device may include at least one nonporous medium upstream, downstream and/or otherwise associated with the fibrous web to provide, for example, at least one of decreased evaporation and/or support. In some embodiments, at least one nonporous medium maintains contact between a plurality of media. The nonporous medium can be configured so as to provide a defined application zone for contacting the melt-blown substantially uniform fibrous web with the biological fluid.

With respect to those embodiments including the use of at least one additional porous medium, suitable media include membranes, preferably microporous membranes. In some embodiments, the membranes are hydrophilic.

A variety of membranes are suitable for use in accordance with the invention. Suitable membranes include, but are not limited to any conventional membrane utilized in diagnostic procedures, e.g., to determine the presence of at least one analyte such as glucose, cholesterol, and a serum enzyme. Other suitable membranes include but are not limited to virus removing or separating membranes.

Suitable membranes include nylon 66 membranes, particularly those produced in accordance with U.S. Pat. No. 4,340,479; and virus removing or separating membranes, particularly those produced in accordance with published UK Pat. Applications GB 2 266 851 A, and GB 2,285,010; copending U.S. patent application Ser. No. 08/327,622, filed on Oct. 24, 1994, and copending U.S. patent application Ser. No. 07/882,473.

Exemplary virus removing membranes include ultrafiltration/diafiltration membranes that are produced in accordance with UK Pat. Application GB 2 266 851 A, and are capable of excluding 0.02 μm diameter, monodisperse, latex particles and are capable of being dried without loss of such ultrafiltration properties and which after being wet/dry cycled at least once will have a $K_{UF}$ flow rate at 10 psi, using 1-butanol saturated with water as the wetting liquid and water saturated with 1-butanol as the displacing liquid at ambient temperature, below 50 cc/min per square foot of membrane. Suitable ultrafiltration/diafiltration membranes include polysulfone membranes, such as polyethersulfone or polyphenylsulfone membranes, particularly those having a molecular weight cutoff rating from about 1,000 daltons to about 20,000 daltons, and those having a molecular weight cutoff rating from about 20,000 to 200,000 daltons and capable of excluding monodisperse latex particles greater than about 40 nanometers in diameter.

Other exemplary virus removing membranes include isotropic, skinless, polyvinylidene fluoride membranes, particularly such porous membranes which have a titer reduction of at least about $10^8$ against $T_1$ bacteriophage and/or a $K_{UF}$ of at least about 15 psi when tested using liquid pairs having an interfacial tension of about 4 dynes/cm. The $K_{UF}$ test method is described in, for example, UK Patent Application 2 266 851 A. In accordance with the $K_{UF}$ test method, the membrane to be tested is first thoroughly wetted with a wetting liquid that is capable of fully wetting the membrane. A displacing liquid, which is immiscible with the wetting liquid used to wet the membrane but has a low, stable interfacial tension, is placed in contact with the upstream side of the wetted membrane. Pressure is then incrementally applied to the displacing liquid, and the flow of the displacing liquid through the membrane is measured as a function of the applied pressure. The interfacial tension between the two liquids should be about 10 dynes/cm (10 mN/m) or less. A plot of the flow rate of displacing liquid, per unit area of the membrane, through the membrane as a function of applied pressure can be made, and a straight line can be drawn through the steep part of the resulting curve, using regression analysis, which will intersect the horizontal axis at a given pressure value. This point of intersection is deemed the $K_{UF}$ value and is directly related to the pore size of the membrane.

In a preferred embodiment, at least one porous medium is arranged downstream of a melt-blown substantially uniform fibrous web, so that fluid, e.g., plasma, may be passed from the web into the downstream porous medium or media.

For example, with respect to FIGS. 19, 26, and 32, additional medium 3 is preferably a microporous membrane arranged downstream of melt-blown substantially uniform fibrous web 1. Similarly, with respect to FIGS. 21 and 22, porous medium 33, which is preferably a microporous membrane, is arranged downstream of melt-blown substantially uniform fibrous web 111a.

In some embodiments, the additional medium comprises another melt-blown substantially uniform web. Thus, as shown in FIG. 24, additional melt-blown substantially uniform fibrous web 111a is arranged downstream of melt-blown substantially uniform fibrous web 111c. Similarly, as shown in FIG. 27, additional melt-blown substantially uniform fibrous web 1111 is arranged downstream of melt-blown substantially uniform fibrous web 1.

As will be noted in more detail below, the downstream porous medium or media preferably provide(s) a higher capillary attraction for the plasma than that of the upstream medium for the plasma. Accordingly, plasma may be passed efficiently from the web 1, 11, 111a, and 111c, in the embodiments illustrated in FIGS. 19–22, 24, 26, and 27.

In the embodiments illustrated in FIGS. 19, 26, and 32 wherein medium 3 comprises a porous medium such as a microporous membrane, more preferably a hydrophilic membrane, even more preferably a hydrophilic nylon membrane (FIGS. 19 and 32), or a PVDF membrane (FIG. 26), medium 3 is arranged downstream of the melt-blown substantially uniform fibrous web 1. In the embodiment illustrated in FIG. 32, medium 3 is interposed between melt-blown substantially uniform fibrous webs 1, and 1111.

Medium 3 preferably comprises a porous medium as it may be filled with the plasma passing through the fibrous web 1. For example, porous medium 3 can have a pore structure that prevents the penetration of red blood cells into the medium. Thus, at the junction between the fibrous web 1 and the porous medium 3, the porous medium 3 can act as a filter to separate red blood cells from the plasma, and the plasma can diffuse rapidly into the medium 3.

Second surface 44 of web 1 and first surface 45 of medium 3 may substantially overlap. In some embodiments, as shown in FIGS. 19, 26, and 32, a portion 5 of medium 3 may extend beyond the web 1.

Illustratively, with respect to FIG. 19, the medium 3 may be at least about twice the length of the web 1, e.g., about 2 to 5 times the length of the web 1, so that portion 5 is about the same length as the web 1. Additionally or alternatively, the medium 3 can be wider than the web 1 to produce portion 5.

With respect to FIG. 26, medium 3 may be more than about twice the length and/or width of the web 1. In one embodiment according to FIG. 26, the web 1 includes a sample application area of about 5 mm×5 mm, and the medium 3 has a width of at least about 3 times the width of the web 1 to allow the plasma to pass into the membrane (medium 3) in less than about 10 seconds.

Of course, with respect to FIGS. 17, 18, and 28, for example, wherein structure 2 comprises a nonporous medium, the analyte can be detected after the plasma passes laterally through the fibrous web 1.

In the embodiments illustrated in FIGS. 19, 26, and 32, the web 1 and medium 3, as well as the medium 3 and the web 1111 (FIG. 32), are preferably bound together by a binding agent such as a fibrous resin bond. The fibrous bond system can be very flexible with respect to the strength of the bond, which can be varied by changing the number and the fiber diameter of the fibers which upon softening by, for example, heating, accomplish bonding. Thus, the bond can be adjusted to permit web 1 and medium 3, and/or medium 3 and web 1111, to be easily separated at a desired time. Of course, when the separation is complete, the plasma containing portion may as an alternative be cut away from the red cell containing portion.

For example, once plasma has passed into the medium 3, web 1 may be separated therefrom, and the plasma in medium 3 may be further processed. Since the separated web may be discarded before further testing of the plasma, this may decrease the risk of exposure to blood transmitted disease(s).

Preferably, in those embodiments wherein medium 3 comprises a porous medium, at least a portion of the medium 3 is bound to the fibrous web by a binding agent such as fibrous resin bond, interposed between the second surface 44 of the fibrous web 1 and the upstream surface 45 of the medium 3, as shown in, for example, FIGS. 19 and 32. Similarly, with respect to the embodiment illustrated in FIG. 20, fibrous webs 1 and 1111 may be bound via a fibrous resin bond.

Illustratively, when using two or more fiberizers as described earlier, in the section entitled "Multilayered products", one of the fiberizers can be used to prepare the melt-blown web, and another fiberizer can deposit binding resin fibers on the melt-blown web as it is being formed on the collector.

Thus, a resin can be fiberized and deposited on the second surface 44 of the web 1 and/or the upstream surface 45 of the medium 3, and heated for a short time, to melt the resin without softening the surfaces of the web and medium 3. The web and medium can be gently compressed, and the heat removed, to provide an effective and permeable bond.

In other embodiments, as illustrated in FIGS. 21 and 22, a porous medium 33, more preferably, a microporous membrane, is arranged downstream of the web 111*a*. As with some of the embodiments previously described with FIGS. 19 and 26, the downstream porous medium may be filled with the plasma, without red blood cells passing into the medium. However, unlike the embodiments illustrated in FIGS. 19 and 26, there may be no adhesive or fibrous resin bond between the porous medium 33 and the fibrous webs 111*a*, 111*b* in the embodiments shown in FIGS. 21 and 22.

Illustratively, at least one nonporous medium 501 and/or 504, such as a plastic film including an adhesive, maintains the position of porous medium 33 between fibrous webs 111*a* and 111*b*, without a bond between web 111*a* and 33, and without a bond between 33 and web 111*b*. In a preferred embodiment, porous medium 33 is maintained in position between fibrous webs 111*a* and 111*b* so that bypassing of medium 33 is minimized or prevented. Porous medium 33 may extend laterally beyond the lateral edges of the ends of webs 111*a* and 111*b* (not shown). Additionally, there should be a distance between fibrous webs 111*a* and 111*b* so that the webs fail to contact one another, while remaining in fluid communication with each other through interposed porous medium 33. Similarly, with respect to the embodiment illustrated in FIG. 24, porous medium 33 is preferably interposed between fibrous webs 111*a* and 111*b* without a resin bond between 33 and the webs 111*a* and 111*b*. Preferably, there is no bond between fibrous webs 111*c* and 111*a*. For example, at least one nonporous medium including an adhesive, more preferably two nonporous media 502 and 503, each including an adhesive, maintain(s) webs 111*c* and 111*a* in fluid communication with each other.

In some embodiments, wherein the media 3 and 33 include a pore structure that blocks the passage of red and white blood cells, e.g., an absolute pore size of about 5 $\mu$m or less, more preferably, about 2 $\mu$m or less, the plasma entering the media 3 and 33 is essentially cell-free.

Another advantage to the use of media 3 and 33 with the pore structure as summarized above is that the media will provide a capillary attraction for the plasma that is higher than that of the fibrous web. Accordingly, this finer pored membrane allows plasma to be effectively wicked from, or sucked out of, the fibrous web 1 (FIGS. 19, 26, and 32) and 111*a* (FIGS. 21, 22, and 24).

In some embodiments, at least one analyte can be detected in the fibrous web 1 or 111*a*, e.g., after exposing the analyte(s) to at least one reagent in the web. Typically, however, at least one analyte passes with the plasma into the downstream medium or media, and the analyte can be detected in or on the downstream medium or media.

For example, with respect to the embodiments illustrated in FIGS. 19 and 26, wherein medium 3 comprises a porous membrane, more preferably a hydrophilic membrane such as a hydrophilic nylon membrane, e.g., a membrane produced in accordance with U.S. Pat. No. 4,340,479, at least one analyte in the essentially cell-free plasma in medium 3 may be analyzed, e.g., after exposure to at least one reagent, which may be present in the medium 3, without interference from the cellular material in the biological fluid sample. Of course, in those embodiments including an additional porous medium downstream of medium 3, e.g., fibrous web 1111 as illustrated in FIG. 32, at least one analyte in the essentially cell-free plasma in web 1111 may be analyzed without interference from the cellular material in the biological fluid sample.

Similarly, with respect to an embodiment illustrated in FIG. 26, wherein medium 3 comprises a virus removing or virus capturing membrane as described in for example, copending U.S. patent application Ser. Nos. 08/327,622, and U.K. Pat. Application GB 2 266 851 A, at least one analyte in the essentially cell-free plasma in medium 3 may be analyzed without interference from the cellular material in the biological fluid sample.

Typically, analysis includes, but is not limited to, calorimetric, spectrophotometric, pH, conductance testing, and/or amplification, to evaluate the presence of the analyte (s).

With respect to the embodiments illustrated in FIGS. 21, 22, and 24, which provide for passing plasma-containing biological fluid from the upstream substantially uniform fibrous web 111*a* through the porous medium 33 and into the downstream substantially uniform fibrous web 111*b*, the medium 33 provides for capturing or isolating at least one analyte, particularly, viruses, present in the plasma. In an embodiment, the virus-capturing membrane is a PVDF membrane produced in accordance with U.S. patent application Ser. No. 08/327,622, and the downstream substantially uniform web 111*b* is a fibrous melt-blown web produced as described above.

In a more preferred embodiment, wherein the plasma-containing biological fluid placed in contact with the upstream fibrous web 111a (FIGS. 21 and 22) or 111c (FIG. 24) comprises cell-containing biological fluid, e.g., whole blood including an anticoagulant, or fingerstick blood; rather than separated plasma, the upstream fibrous web 111a or 111c is easily physically separated to remove the cell-containing portion of the web from the plasma-containing portion of the web.

Illustratively, using the device 200 of FIG. 22 for reference, a drop of blood is placed in contact with the fibrous web 111a at application zone 250, and the blood diffuses into the web. The plasma front will pass through the web 111a ahead of the red cells. Once the plasma front passes sufficiently through the web, e.g., as the plasma reaches porous medium 33, but before the red cells reach location A, the web 111a is cut at location A to remove the cell-containing section. The separated plasma is allowed to continue to pass, via capillary action, through the upstream web 111a, through the analyte-capturing medium 33, and into downstream web 111b. The analyte(s), e.g., viruses, captured by medium 33 may later be determined, preferably after the analyte has been lysed, and the analyte's nucleic acid amplified.

With respect to the embodiments illustrated in FIGS. 21, 22, and 24, a method for analyzing the analyte preferably further comprises passing at least one wash and/or buffer solution through the device, preferably without using air or liquid pressure to pass the wash and/or buffer solution therethrough. Accordingly, preferably after the plasma has wetted the medium 33, the device 200 is placed in a container suitable for holding buffer solution, as shown in FIG. 23, so that the fibrous web 111a, for example, the plasma-containing portion of the web remaining after cutting at location A to remove the red cells, is facing the bottom of the tube, and the distal end (the end not contacting medium 33) of fibrous web 111b is facing the top of the tube.

In some embodiments (not shown), the distal end of 111b may extend beyond the top of the tube, which may provide for faster evaporation of the wash and/or buffer solution. After the solution(s) have sufficiently wicked or diffused through the device 200, the device is withdrawn from the tube, and medium 33 is separated from the fibrous webs 111a and 111b.

The analyte(s) captured or isolated in or on medium 33 may subsequently be detected. Preferably, when the captured analyte comprises at least one virus, the virus is lysed to release the viral nucleic acid, and at least a portion of the viral nucleic acid is amplified, preferably via a polymerase chain reaction, and detected. The presence of this portion of the viral nucleic acid indicates the presence of the virus. The lysis, amplification, and detection may be carried out as is well known in the art.

In some embodiments, the use of at least one wash and/or buffer solution may provide for removal and/or inactivation of undesirable material before determining the presence of the analyte. For example, after an analyte such as a virus is captured in or on the medium 33, the wash and/or buffer solution may separate and/or inactivate undesirable material such as at least one of a detergent, protein complex, RNase, DNase, or an enzyme inhibitor. Illustratively, since this undesirable material could interfere with the polymerase chain reaction, and thereby lead to inaccurate results, the wash and/or buffer solution can remove or inactivate the interfering material, and the analyte may be amplified and accurately determined. In some embodiments, e.g., wherein it may be desirable to utilize an increased volume of wash and/or buffer solution, the distal end of web 111b may extend beyond the top of the container 500, to allow the solution to evaporate faster. This allows additional fluid to be added to the container 500, and wicked through the device 200.

As noted earlier, certain embodiments of the invention include the use of at least one nonporous medium. For example, structure 2 (FIGS. 17–20 and 26–32), and structures 501–504 (FIGS. 21, 22, and 24) can comprise nonporous media. Typically, at least one nonporous medium is a plastic film or sheet, e.g., a polyester film such as Mylar™ and the like. Generally, as will be noted in more detail below, at least one nonporous medium provides support for the device, and/or minimizes evaporation of biological fluid, especially plasma, as it passes through the device.

For example, it may be desirable to include a nonporous medium for support, particularly when the fibrous web and/or the downstream membrane is insufficiently rigid and/or might be damaged while, for example, performing the analyte analysis. In some embodiments, it may be desirable to include a support for ease in carrying out an automated or semi-automated analysis. Also, at least one nonporous medium may provide for ease in manipulating the device, e.g., by allowing the user to hold the device without contacting the wetted or unwetted porous medium, or to ease or make the manufacturing process more efficient.

As illustrated in FIG. 22, the device 200 includes medium 503, such as a nonporous plastic film, e.g., a polyester film, for support. Similarly, structure 2 (in FIGS. 17–20 and 26–32) may provide structural support for the device. In one embodiment, nonporous medium 503 (in FIGS. 22 and 24) includes an adhesive that binds to fibrous webs 111a and 111b, and nonporous medium 504. Similarly, nonporous medium 2 includes an adhesive that binds to fibrous webs 1 and 1111 (FIG. 27) or fibrous web 1 (FIG. 28). With respect to FIGS. 22 and 24, in addition to providing structural support for the device, this arrangement, i.e., wherein medium 503 includes an adhesive, allows medium 33 to be easily separated from fibrous webs 111a and 111b as will be noted in more detail below.

Alternatively or additionally, with respect to FIG. 22, the portion of medium 503 extending beyond the first fibrous web 111a, i.e., ahead of the biological fluid application zone 250, allows the device to be manipulated without contacting the porous medium or media of the device. Illustratively, after a drop of blood is placed on the device 200 at application zone 250, the device can be held without placing one's finger in contact the wetted web 111a. In some embodiments, for example, as illustrated in FIG. 22, medium 503 can extend beyond web 111a and 111b so that either or both extensions can be used as a handle. Such an arrangement may be useful when, for example, device 200 is cut at location A, so that the extension of 503 beyond web 111b can be used as a handle.

Similarly, with respect to FIGS. 18, 20, and 28–32, a portion of structure 2 can extend beyond the web 1 (FIGS. 18, 20, and 28–31) or web 1111 (FIG. 32) of device 100 for ease in handling. Structure 2 can be extended beyond the web 1 or 1111 in any direction, and can extend beyond web 1 or 1111 in more than one direction. If desired, structure 2 in FIG. 19 can be extended beyond medium 3 in one or more directions, to provide a better handle.

In some embodiments, medium 501 (as illustrated in FIGS. 21, 22, 24), and/or structure 2 (as illustrated in FIGS. 27, and 28), which preferably comprise nonporous media such as a plastic film, also provides for minimizing the evaporation of the biological fluid, or portion thereof, e.g., plasma. In some embodiments, this allows more of the biological fluid to be separated and passed through the porous medium 33 (FIGS. 21, 22, and 24) or fibrous web 1 (FIGS. 27 and 28). Even more preferably, medium 501 also includes an adhesive that allows medium 501 to be bound to fibrous webs 111a, 111b, and porous medium 33.

Similarly, structure 2 can include an adhesive to allow that structure be bound to a fibrous web 1 and 1111 and/or porous medium 3, as illustrated in, for example, FIG. 27. Among other advantages, in addition to providing reduced evaporation, the use of a nonporous medium with an adhesive may minimize the possibility the porous medium 33 (FIGS. 21, 22, and 24) or fibrous web 1111 (FIG. 27) could shift in position, would could reduce the effectiveness of the device. Furthermore, the use of a nonporous medium with an adhesive may allow the porous medium 33 to be more easily separated from the device. In some embodiments, a fibrous resin bond as described earlier can be used to bind at least one medium 501–504 or structure 2 to the device. For example, medium 504 can include a fibrous resin bond between medium 33 and medium 504, wherein the number and diameter of the fibers are adjusted to permit media 33 and 504 to be separated at a desired time.

In the embodiments illustrated in FIGS. 21 and 22, device 200 includes a medium 504, which preferably also comprises a nonporous medium such as a plastic film, and may also provide for minimizing the evaporation of the plasma. With respect to an embodiment of FIG. 22, wherein media 501, 504, and 503 all comprise nonporous media, media 501 and 503 preferably include an adhesive, while medium 504 does not. Accordingly, medium 501 is bound to fibrous webs 111a, 111b, and porous medium 33, and medium 503 is bound to the fibrous webs 111a, 111b, and medium 504. This arrangement allows porous medium 33 to be easily separated from the device 200 at a desired time. For example, before analyzing the analyte(s) captured in or on medium 33, a portion of nonporous medium 501 may be grasped and pulled, thus pulling medium 501 and porous medium 33 away from the fibrous webs 111a and 111b. Typically, after removal, porous medium 33, along with medium 501, is exposed to at least one reagent, so that the captured analyte (s) may eventually be detected.

It should be noted that at least one of media 501 and 504 may extend further along the length of the device 200, to cover a greater portion of the surface of fibrous web 111a and/or 111b, which may further decrease the evaporation of the biological fluid. Structure 2 may be utilized similarly with respect to covering webs 1 and/or 1111 in device 100 as illustrated in FIGS. 27 and 28.

However, with respect to device 200, while reducing evaporation from the medium or media upstream of fibrous web 111b (e.g., 111a and porous medium 33) is generally desirable, in some embodiments, reducing evaporation of the plasma from fibrous web 111b itself may be less desirable. For example, as the evaporation from fibrous web 111b may allow more fluid to wash through porous medium 33 and wash the captured analyte, e.g., to remove undesirable material, it may be desirable to allow such evaporation.

As will be noted in more detail below, and as illustrated in FIGS. 22 and 24, an additional medium 502, which may also comprise a nonporous medium such as a plastic film, may also provide for minimizing evaporation upstream of fibrous web 111b. With respect to FIG. 24, additional medium 502 can also maintain fibrous webs 111c and 111a in position, to provide fluid communication between the webs.

In some embodiments, it may be desirable to provide a more defined biological fluid application zone for the device. For example, if it is desirable to increase the likelihood that the biological fluid will be applied to a particular section of the web, a medium 502 such as a nonporous medium, more preferably a polyester film, may be arranged as shown in FIGS. 22 and 24. This may be particularly desirable for less sophisticated users of the device, who might apply the biological fluid at the wrong end of the device. Additionally, regardless of the sophistication of the user of the device, it may be desirable to cover the non-application zone of the most upstream web of the device, as this may minimize the spread of the sample on the surface of the web. Accordingly, more of the biological fluid enters the interior of the web, allowing more efficient plasma separation.

Of course, it may also be desirable to provide a more defined biological fluid application zone with respect to the embodiments illustrated in FIGS. 17, 18, 20, and 29–32 for similar reasons. In some embodiments, e.g., as illustrated in FIG. 22, medium 502 may also provide for minimizing evaporation.

With respect to providing a more defined application zone, in another embodiment, a melt-blown substantially uniform fibrous web is bound to a impermeable structure 2 in a configuration similar to that illustrated in FIG. 18. However, in this alternative embodiment, the portion of structure 2 extending beyond web 1 forms the biological fluid application zone. Illustratively, a drop of blood is placed on the extended portion of structure 2 so as to contact fibrous web 1, and the blood can be wicked laterally through the web.

As noted earlier, some embodiments of the invention include the use of at least one nonporous medium such as a plastic film, e.g., a polyester film, to provide, for example, support, minimal evaporation, and/or a defined application zone. Alternatively, or additionally, in some embodiments, the nonporous medium can be modified or configured to provide access to a porous medium such as the fibrous web 1 or a membrane, e.g., to provide a defined application zone, and/or to allow sampling or detection of the analyte in the porous medium.

Illustratively, with respect to FIG. 19, in one embodiment of the invention, wherein structure 2 is a nonporous medium, bound to fibrous web 1, the nonporous medium can be modified, e.g., perforated, before being placed in contact with the web 1, so that at least one analyte passing into the web can be detected. For example, as shown in FIG. 25, wherein structure 2 comprises a nonporous plastic sheet such as a polyester film, the structure can include a row of holes 700. Preferably, holes 700 are located somewhat centrally along the length of structure 2. Typically, the hole diameters will be in the range of from about 0.1 mm to about 1 mm.

Accordingly, once structure 2 including holes 700 has been bound to fibrous web 1, and after the biological fluid has wetted the web, the analyte(s) may be separated, chromatographically, due to for example, differences in size, or in their surface characteristics. The separated or captured analyte of interest, e.g., a virus, bacterium, or nucleic acid, can be sampled through successive holes 700, and identified. In some embodiments, nonporous media can contact both faces of fibrous web 1, and either or both of the nonporous media can include holes 700, for sampling. Of course, at least one nonporous medium, including holes 700, may be used in accordance with other embodiments of the invention. For example, the devices illustrated in FIGS. 19–22, and 24, may include at least one nonporous medium with holes, for sampling or access to a fibrous web and/or membrane.

A variety of other embodiments are encompassed by the present invention. Devices can be configured to provide unidirectional flow, e.g., wherein the biological fluid is applied to one end of the device; or bi- or multi-directional flow, e.g., wherein the biological fluid is applied to a more central portion of the device. For example, with respect to the device 100 illustrated in FIG. 17, the biological fluid application zone 150 can be anywhere along the surface of web 1.

Devices may include a plurality of fibrous webs and/or other media, especially porous media, e.g., membranes. For example, a plurality of melt-blown substantially uniform fibrous webs may be placed in a vertical or horizontal configuration as illustrated in, for example, FIGS. 20 and 27, respectively. The device may include webs in vertical and horizontal configuration. Different webs may include, for example, different voids volumes, fiber diameters, and/or reagents. Webs may be bound, or unbound. The webs may be bound directly, e.g., with a binding agent between the webs, or bound indirectly, e.g., with a support medium. Illustratively, as shown in FIG. 20, fibrous webs 1 and 1111 may be secured together via a binding agent, or, as illustrated in FIG. 24, fibrous webs 111a and 111c may be secured together via at least one nonporous medium. Similarly, as illustrated in FIG. 27, fibrous webs 1 and 1111 may be secured together via at least one nonporous medium.

Additional fibrous webs and/or other porous media may be included in devices according to the invention. Devices may include one or more webs and one or more porous membranes. Different webs may vary with respect to, for example, at least one of voids volumes, CWST, zeta potential, protein binding characteristics, fiber diameter, weight, thickness, and/or reagents. Similarly, in those embodiments including one or more other porous media, e.g., microporous membranes, different porous media may vary with respect, to, for example, voids volumes, CWST, zeta potentials, protein binding characteristics, thickness, porosity, and/or reagents.

Of course, since devices according to the present invention are suitable for a variety of diagnostic applications, the characteristics of a web and/or membrane can differ from one device to another. Illustratively, a device for detecting the presence of Factor VIII can include a web having a CWST of about 74 to about 76 dynes/cm and provide for appropriate protein binding. An alternative device for detecting the presence of glycoproteins (e.g., on red cells) can include a web having a CWST of about 80 to about 90 dynes/cm, have a positive zeta potential, and provide for increased protein binding.

Other embodiments are included within the scope of the invention. For example, in one embodiment, including the use of at least one melt-blown substantially uniform fibrous web in a horizontal configuration similar to that illustrated in FIGS. 21 and 22, the upstream fibrous web and the membrane are as described with respect to those Figures, however, the most downstream porous medium is not the melt-blown substantially uniform fibrous web 111b. In this embodiment, the most downstream porous medium is a third porous medium that has a sufficient capillary attraction for the plasma or serum that the fluid is wicked through the membrane into this downstream medium. Illustratively, this downstream porous medium is a melt-blown fibrous web that need not be substantially uniform.

In another embodiment, a device according to the invention includes at least one upstream membrane, and at least one downstream melt-blown non-woven fibrous web. For example, a sample of biological fluid such as blood may be placed in contact with a membrane, and fluid may be wicked through the membrane into the downstream web by capillary action. It may be desirable to cause hemolysis of the red cells in the blood as it passes into the membrane. For example, a membrane having a pore size of about 0.65 $\mu$m may cause the red blood cells to hemolyze and release glycosylated hemoglobin as the fluid passes through the membrane and into the web. The hemoglobin may then be detected.

In other embodiments, e.g., including the use of insoluble particles preplaced in at least one web and/or membrane, devices according to the invention provide a "capture zone" for detecting the presence of at least one analyte. For example, one or more porous media may include one or more preplaced insoluble particles and soluble reagent(s). The preplaced particles can be picked up by the diffusing test fluid together with any soluble reagent(s), which then together with the reacted analyte diffuse into a capture zone at which the mixture can be immobilized by yet another reagent. Alternatively, the mixture can be immobilized by the configuration of the porous medium. For example, the pore structure of the porous medium, e.g., the pore size or the pore diameter, may be large enough to allow unreacted particles to pass through, but small enough to capture or sieve aggregated particles that include the reacted analyte. Regardless of the immobilization protocol, the immobilized mixture can then be detected to determine the presence of the analyte(s).

Illustrative Uses

The devices produced in accordance with the invention are compatible with a variety of diagnostic testing protocols, including wet or dry analysis, calorimetric or spectrophotometric analysis, evaluation of pH changes or electrical conductance, and electrochemical analysis, e.g., silicon substrates and biosensors. For example, melt-blown fibrous webs, with or without additional porous media, can be used with electrode test strips for electrochemical sensors. Illustrative electrochemical sensors can be used for amperometric or potentiometric detection. Exemplary biosensors are disclosed in, for example, U.S. Pat. Nos. 4,545,382 and 5,262,067; European Pat. Nos. 0,127,958 and 0,351,891; and International Publication WO 94/27140. One example of a suitable biosensor is a glucose sensor.

They are also compatible with biotechnology related analyte detection protocols, e.g., immunoassays and amplification protocols. The present invention is suitable for both human and veterinary applications.

The present inventive devices can be compatible with automated systems. For example, melt-blown fibrous webs, with or without a nonporous support medium and/or additional porous medium, can be passed through automated systems that dispense one or more reagents to one or more desired regions of the web(s) and/or additional porous media. Illustratively, once a plastic support layer is attached to one or more melt-blown fibrous webs, an automated system can determine the orientation of the device, and pass the web/plastic composite under spray apparatus dispensing the reagents desired. If desired, at least one plastic layer can be applied to another portion, e.g., the top surface of the composite, prior to cutting to width. Of course, the present inventive device can also be compatible with automated analysis systems, e.g., to read the test results after applying biological fluid to the device.

The present invention is suitable for providing a desired amount of processed fluid. For example, in some embodiments, the present invention provides a desired amount of separated plasma. Illustratively, some embodiments of the invention may provide about 3 $\mu$L or more, e.g., about 30 μL, of separated plasma. If desired, a portion of the separated plasma may be collected and removed from the device. For example, as noted earlier, plasma passing into portion 20 of web 1 (FIGS. 29–31) or web 1111 (FIG. 32) may pass into capillary 400, which can be removed from contact with the device.

A method according to the instant invention provides for processing a plasma-containing biological fluid, by contacting with such a fluid at least one melt-blown web as described herein. In a preferred embodiment, wherein the plasma-containing biological fluid is also a cell-containing fluid, e.g., blood, the method comprises contacting the web with blood, and separating plasma from the blood. Even more preferably, the separated plasma is essentially cell-free. In some embodiments, at least one analyte of interest (e.g., in the plasma) is detected in the melt-blown substantially uniform fibrous web.

Methods according to the invention may include passing plasma from a melt-blown substantially uniform fibrous web into one or more additional porous media downstream of the web. Illustratively, as noted above, plasma from the uniform fibrous web may be wicked from the fibrous web into the downstream medium or media, and at least one analyte of interest may be detected in or on the downstream medium or media. In a preferred embodiment, the method includes capturing or isolating at least one analyte in or on a microporous membrane downstream of the melt-blown substantially uniform fibrous web.

With respect to analyte detection in the web, and/or in or on the downstream media, methods according to the invention include, but are not limited to, calorimetric, spectrophotometric, pH, and/or conductance testing to evaluate the presence of the analyte(s). The presence of the analyte(s) may be detected by the level of radioactivity present. Additionally, as will be noted in more detail below, the method may include capturing and/or isolating at least one analyte, and then amplifying and detecting at least a portion or a component of the analyte to indicate the presence of the analyte(s). Typically, those embodiments of the method comprising amplification of a portion of the analyte include lysing at least one captured analyte such as a virus to release the viral nucleic acid, i.e., DNA or RNA, and then amplifying at least a portion of the nucleic acid. Preferably, amplification includes utilizing a polymerase chain reaction to amplify a portion of the nucleic acid.

The following examples further illustrate the present invention and, of course, should not be construed as in any way limiting its scope.

EXAMPLES 57–62

In the following examples 57–62, the fibrous webs are treated with oxygen plasma, as generally described with respect to U.S. Pat. No. 5,258,127.

The fibers are modified by exposure to oxygen plasma generated by a 2 kilowatt 40 kilohertz power input in a 0.5 cubic meter chamber for about 5 to about 15 minutes at a temperature of about 50° C. to about 80° C. at a gas pressure of about 135 mtorr. The fibers are modified whereby the surface of the web is modified from its natural hydrophobic state, causing it to become hydrophilic, such that a drop of water placed on its surface is rapidly absorbed into its pores. After modification, the web has a CWST of about 110 dynes/cm.

EXAMPLE 57

A device is constructed having a configuration corresponding generally to that illustrated in FIG. 22. The upstream and downstream sections of melt-blown fibrous webs (111*a* and 111*b*, respectively) are produced in accordance with the invention. The webs, which each comprise polybutylene terephthalate (PBT) fibers having an average diameter of about 1.1 μm, each having a voids volume of about 78%. The webs are about 0.018 cm thick. Each web has a basis weight of about 5 g/ft$^2$. After oxygen plasma treatment the webs have a CWST of about 110 dynes/cm. The webs are trimmed to a width of about 8 mm, and web 111*a* is trimmed to about 20 mm long and web 111*b* is trimmed to about 30 mm long, with the length of the strips parallel to the fiber orientation.

A 0.004 cm thick polyvinylidene fluoride (PVDF) membrane (33) having a $K_{UF}$ of about 17 psi is produced in accordance with published UK Patent Application GB 2,285,010, and interposed between the ends of the fibrous webs, as is discussed below. The membrane is trimmed to about 5 mm wide and a length of about 8 mm.

Nonporous polyester films, commercially available from Adhesive Research Inc, (Glen Rock, Pa.), as Arcare™, under the part numbers as listed below, are used to provide media 501–504. Polyester strips 501 and 504 (part no. 78-15), which include diagnostic grade adhesive grade AS 110 on one side, are about 2 mils thick, and about 10 mm long. Polyester strip 503 (part no. 78-43), which also includes diagnostic grade adhesive grade AS 110 on one side, is about 3 mils thick, and about 55 mm long. Polyester strip 502 (part no. 77-59) is about 1 mil thick, and includes AS 110 grade adhesive. Polyester strip 502 is about 14 mm long. Strips of these media are cut to 8 mm wide.

The membrane is interposed between the fibrous webs in the following manner. Polyester strip 501 is placed so that the adhesive layer contacts and overlaps fibrous web 111*b*, binding it thereto, with a portion of polyester strip 501 extending beyond the end of the web. The membrane 33 is placed in contact with the adhesive layer of polyester strip 501 and fibrous web 111*b*, so that about 2.5 mm of the membrane contacts and overlaps the end of web 111*b*.

Fibrous web 111*a* is placed in contact with the adhesive layer of 501, and membrane 33, so that about 2.5 mm of the membrane contacts and overlaps the end of web 111*a*. The membrane 33 is bound to strip 501 via the adhesive layer of 501, and the fibrous webs 111*a* and 111*b* are bound to strip 501 via the adhesive layer of 501. Membrane 33 is in physical contact with webs 111*a* and 111*b*, but there is no adhesive between membrane 33 and the webs. There is a distance of about 2 mm between the membrane facing ends of the fibrous webs 111*a* and 111*b*.

Polyester strip 504 is then placed over the ends of webs 111*a* and 111*b*, and the interposed membrane 33. The adhesive layer of 504 faces downward, so that it may be placed in contact with the adhesive layer of 503. The adhesive layer of 503 is also placed in contact with the webs 111*a* and 111*b*. Polyester strip 502 is placed on the first fibrous web 111*a* as shown in FIG. 22 to define a blood drop application zone of about 3 mm and to minimize evaporation and surface wetting.

Once all the media are assembled, the device may be trimmed to provide a width of about 5 mm.

A drop of blood is placed on the first fibrous web in the blood application zone, and the fluid rapidly enters the web. Within a short time, the upstream web is completely wetted, with the clear plasma front reaching the membrane, and the red blood cell front lagging behind. Once the plasma reaches the membrane, the red blood cell containing portion of the upstream web is cut off. The remaining portion of the upstream web shows no red color.

As shown in FIG. 23, the device is placed in a plastic test tube 500, of which the inside diameter is approximately 7 mm, and the depth is 90 mm. The tube contains about 40 μL of a buffer solution, physiologically buffered saline (PBS). The device is placed in the tube with the cut portion of the web facing down, contacting the bottom of the test tube and the buffer solution. The plasma and buffer solution wicks through the fibrous web 111a, membrane 33, and into web 111b. After approximately 4 hours, the device is removed from the tube. The PVDF membrane 33 is removed from the fibrous webs 111a and 111b by bending the ends of the device, grasping an end of polyester strip 501 with a forceps, and pulling the strip 501. The strip 501 debonds readily from the fibrous webs 111a and 111b, but not membrane 33. Since the adhesive side of strip 501 contacts membrane 33, and the adhesive side of strip 504 does not, strip 501 is pulled away from the device along with membrane 33.

EXAMPLE 58

A device is constructed having a configuration corresponding generally to that illustrated in FIG. 24. This device is constructed in a manner similar to that described in Example 57. Webs 111a and 111b are as generally described in Example 57, however, fibrous web 111a is about 15 mm long, which is about 5 mm shorter than that used in Example 57. The webs, which each comprise polybutylene terephthalate (PBT) fibers having an average diameter of about 1.1 μm, each having a voids volume of about 78%. The webs are about 7.2 mils (0.018 cm) thick. Each web has a basis weight of about 5 g/ft$^2$. After oxygen plasma treatment the webs have a CWST of about 110 dynes/cm.

Fibrous web 111c is produced in accordance with the invention. The web, which comprises polybutylene terephthalate (PBT) fibers having an average diameter of about 1.2 μm, has a voids volume of about 80%. The web is about 0.040 cm thick, and the weight is about 10 g/ft$^2$. The web has a CWST of about 110 dynes/cm. The web is trimmed, so that the length is about 8 mm.

The PVDF membrane, and the polyester strips, are as described with respect to Example 57. However, polyester strip 503 is about 60 mm long, so as to also allow contact with fibrous web 111c. The media are placed in contact with each other as generally described in Example 57, However, web 111c is placed in contact with web 111a and polyester strip 502 before polyester strip 503 is placed on top of the overlapping ends of webs 111c and 111a. Strip 503 adheres to webs 111a, 111b, and 111c. Webs 111c and 111a are in physical contact without a bond between them.

A drop of fingerstick blood is placed on the first fibrous web 111c in the blood application zone, and the fluid rapidly enters the web. The clear plasma front passes ahead of the red cells, through web 111c and 111a, and contacts PVDF membrane 33. Once the plasma reaches the membrane, the red blood cell containing portion of web 111a is cut off, so that web 111c and a portion of web 111a are separated from the device.

The device is contacted with buffer solution, and the membrane removed as described with respect to Example 57.

EXAMPLE 59

A device is constructed having a configuration generally corresponding to that shown in FIG. 19.

A melt-blown fibrous web 1 is prepared in the manner of the invention which comprises approximately 3 μm diameter PBT fibers with a voids volume of about 80%, thickness about 0.020 cm, weighing about 0.0055 g/cm$^2$, and with a polyethylene binder fiber on one face applied as described in the invention. This web is then oxygen plasma treated to a CWST of about 110 dynes/cm. The so formed sheet is then cut to provide a strip 16 mm wide×70 cm long. The fibrous web is then compressed at its two edges to compress a one mm wide portion of each edge of the fibrous web as shown at FIG. 19 to reduce the thickness at its outer edges by about 50%.

In a separate operation, a strip 50 mm wide by 70 cm long is cut from a 0.65 μm pore size 0.005 cm thick nylon membrane prepared in accordance with U.S. Pat. No. 4,340,479. The two strips are then assembled with the 25 mm nylon membrane strip resting on the surface of a hot plate, and the 16 mm wide strip of fibrous web is then laid with its binder fiber face down centrally located on the strip of nylon membrane. Gentle pressure is then applied, for example by laying a 5 cm thick by 2 cm wide×70 cm bar of aluminum on the web. Heat is then applied to the underside of the membrane for a sufficient period to melt the binder fiber, but not so long as to allow it to diffuse into the pores of the media by capillarity. The nylon membrane is bonded on its lower surface to an adhesive coated polyester film, in order to provide a more rigid structure.

The strip is then cut into two equal parts along its length, and each of the two parts is then cut to yield 100 diagnostic strips of the invention, each 7 mm wide, each capable of receiving about 15 μL of blood placed on the web surface (the sample placement surface) and delivering a 1.7 cm length of plasma saturated nylon membrane, at which time the red cells contained in the portion 150 of FIG. 19 is cut off. Plasma recovery is typically in excess of about 30 to 40%.

In use, the 15 μL of blood is placed on the 7 mm square fibrous web sample placement area; the blood is absorbed and plasma appears within about one second on the 7 mm portion of the membrane directly bonded to the fibrous web, and then diffuses within seconds along the cantilevered length of the membrane. Light can then be passed through the plasma in the membrane to perform a spectrographic test, to identify an analyte or analytes, or other tests known to those familiar with the art may be applied.

In an alternative construction, the polyester film is perforated as shown in FIG. 25 and is assembled such that its unperforated end is located under the sample placement area. This then allows diagnostic tests to be made using transmitted light with no interference from the polyester film; further, by testing each of the perforated areas, a chromatographic analysis may be made, which could, for example distinguish bacteria separated from viruses as the plasma diffuses through the membrane.

EXAMPLE 60

A series of devices were constructed, each having a configuration generally corresponding to that shown in FIG. 28, including a melt blown fibrous web 1 and a nonporous polyester film 2. The film 2 included an adhesive so that it can be bound to web 1.

The melt-blown fibrous web 1 was produced in accordance with the invention. The web comprises polybutylene terephthalate fibers, hereinafter referred to as PBT. The web was prepared with the following operating conditions: Air temperature was 311° C., and air pressure was 2.25 Kg/cm² through air orifice diameters of 0.107 cm, and the two sets of intersecting fiber streams delivered PBT resin at 305° C. and at the rate of 0.59 grams per minute per nozzle. The fiber streams impinged at a distance of 3.0 cm (i.e., DCD=3.0 cm) on a 17.3 cm diameter by 152 cm long collection cylinder which was rotated at 500 rpm while it was simultaneously translated axially at the rate of 0.2 cm per revolution for the single length of a 127.4 cm stroke, thereby depositing on the surface of the collecting cylinder in 1.4 minutes 0.0054 grams per cm² of fibrous web, which was then cut to 106 cm long, slit lengthwise, and removed from the cylinder, forming a sheet 54 cm wide×106 cm long. The product characteristics were: thickness 0.0183 cm, average fiber diameter 1.3 μm, and the voids volume was 78.1%.

The fibers were modified by about 7 minutes of exposure to oxygen plasma to produce a web having a CWST of about 110 dynes/cm.

A portion of the 54×106 cm sheet was attached to a nonporous polyester film, commercially available from Adhesive Research Inc. (Glen Rock, Pa.), as Arcare™, under the part number 78-15. The film included diagnostic grade adhesive grade AS 110 on one side, and was about 0.005 cm thick. Another sheet of this nonporous polyester film was attached to the other surface of the web. However, as shown in FIG. 28, the sheet on one surface of the web was shorter than the other, to provide an application zone 150. The shorter sheet of nonporous film was trimmed before attachment to the web, and provided an application zone of about 3 mm.

A series of test specimens were cut from this composite to 0.5 cm×6.0 cm, their length being in the cross machine direction (CMD), i.e., the length of the 5×60 mm strip is perpendicular to the length of the 54×106 cm rectangular sheet from which it was cut.

Samples of 20 μL of freshly drawn blood with anticoagulant were measured by pipette and then placed about 0.1 to 0.2 cm from the end of the 0.5×6.0 cm strips. The blood was then observed to spread along the length of the web, and clear plasma appeared ahead of the red cells within about 10 seconds. The plasma front continued to advance, until wicking stopped. The time to completion, i.e., the time from when the sample first contacted the strip, to the time that the sample was fully imbibed and flow stopped, was determined. The length of the strip wetted by the plasma, and the length of the strip wetted by the red blood cells was measured, and the efficiency of plasma collection or recovery was then calculated as described earlier as method #3. The plasma collection efficiency was determined as shown in Table IX.

TABLE IX

| Hematocrit, | Length of Section, mm | | Plasma Recovery, | Time to Completion, |
|---|---|---|---|---|
| % | Red Cell | Plasma | % | Seconds |
| 32.5 | 23.7 | 14.6 | 38 | 556 |
| 34.0 | 23.0 | 14.5 | 39 | 460 |
| 38.0 | 24.7 | 12.2 | 33 | 579 |
| 38.0 | 24.0 | 10.5 | 30 | 728 |
| 38.6 | 23.1 | 13.9 | 38 | 745 |
| 42.0 | 24.5 | 12.1 | 33 | 820 |

As shown in Table IX, device according to the invention provide efficient plasma recovery for blood having a range of hematocrits.

EXAMPLE 61

A series of devices were constructed, having a configuration generally corresponding either to that shown in FIG. 27, including melt-blown fibrous webs 1 and 1111, and nonporous plastic films 2, or FIG. 28, including melt-blown fibrous web 1, and nonporous films 2. The descriptions of the configurations of the webs 1 and 1111 are summarized in Table X wherein medium 1 refers to web 1, and medium 11 refers to web 1111.

TABLE X

| | | Description of Device Media Configuration | | | |
|---|---|---|---|---|---|
| Device | Reference | | Media Configuration | | |
| Example # | FIG. # | Media 1 Type | Media 1 Length | Media 11 Type | Media 11 Length |
| 61E | 28 | 61A | 40 mm | not used | not used |
| 61F | 28 | 61B | 40 mm | not used | not used |
| 61G | 27 | 61D | 05 mm | 61B | 35 mm |
| 61H | 27 | 61D | 10 mm | 61B | 30 mm |
| 61I | 27 | 61C | 05 mm | 61B | 35 mm |
| 61J | 27 | 61C | 10 mm | 61B | 30 mm |

The films each included an adhesive, so that the films could be bound to the webs 1 and 1111 (FIG. 27 configuration) or web 1 (FIG. 28 configuration). The device corresponding generally to the configuration shown FIG. 27, differed from that shown in the Figure in that the film 2 used to define the blood application zone 150 extended to cover the remainder of the top surface of web 1111.

The melt-blown fibrous webs 1 and 1111 were produced in accordance with the invention, using PBT fibers. The description of the media configuration is summarized in Table X, and the fiberizing conditions are summarized in Table XI. The webs were treated with oxygen plasma, to produce webs having a CWST of about 110 dynes/cm.

TABLE XI

| | | | | | | Fiberizing Conditions | | | | | | | | |
|---|---|---|---|---|---|---|---|---|---|---|---|---|---|---|
| Device Example # | Air Temp. °C. | Resin Temp. °C. | Air Pressure Kg/cm² | DCD cm | Cylinder RPM | g Resin Per Min. Per Nozzle | Translation Rate cm/rev | No. Pass | Stroke cm | Stroke Time | WEB gm/cm² | WEB Thickness cm | Fiber dia μm | Voids Vol. % |
| 61A | 317 | 309 | 2.45 | 3.0 | 500 | 0.69 | 0.254 | 1 | 127.4 | 1.00 | .0043 | .0152 | 1.1 | 79 |
| 61B | 317 | 309 | 2.46 | 3.0 | 500 | 1.08 | 0.203 | 1 | 127.4 | 1.25 | .0054 | .0185 | 1.1 | 78 |
| 61C | 317 | 309 | 2.45 | 3.0 | 500 | 0.69 | 0.254 | 2 | 127.4 | 2.00 | .0086 | .0305 | 1.1 | 79 |
| 61D | 317 | 309 | 2.46 | 3.0 | 500 | 1.08 | 0.203 | 2 | 127.4 | 2.51 | .0108 | .0371 | 1.1 | 78 |

The devices having a configuration corresponding to that shown in FIG. 28 were constructed in the manner generally described in Example 60. The web 1111 was 40 mm in length, as indicated in Table XI. As noted above, Table XI includes the description of the media utilized for those devices having the general configuration shown in FIG. 27.

The devices having a configuration corresponding to that shown in FIG. 27 were constructed as follows:

The webs were cut into sections about 75 mm×about 40 mm. The plastic films were cut to a size of about 75 mm×about 5 mm for Examples 61G and 61I, and about 75 mm×about 10 mm for Examples 61H and 61J. The adhesive protective layer, or parting layer, was removed, and the long side of the film was overlapped onto one surface of the web 1111 by about 2–3 mm and brought into contact with the web, so that the adhesive contacted the web. The other web, web 1, was then brought in contact with both the web 1 and the film 2, so that about 2–3 mm of the webs 1 and 1111 overlapped, and at least about 2–3 mm of the adhesive layer of the film 2 contacted a surface of web 1. There was no adhesive between webs 1 and 1111, but each web was adhered to film 2. The surface of web 1 that was not covered by film 2 was the sample application zone 150.

Another plastic film 2 was cut of sufficient size to cover the entire other surface of webs 1 and 1111, as illustrated in FIG. 27. The plastic film 2 was of sufficient size to end beyond the end of web 1, to provide a handle for the device, as illustrated in FIG. 28. The adhesive protective layer of this second film 2 was cut and partially removed so that the adhesive was placed in contact with fibrous webs 1 and 1111. A portion of the adhesive layer cover remained adhered to the film to provide an easy to use handle. This remaining layer covered the top portion of film 2 that extended beyond web 1.

A portion of the 54×106 cm sheet was attached to a nonporous polyester film, commercially available from Adhesive Research Inc. (Glen Rock, Pa.), as Arcare™, under the part number 78–15. The film included diagnostic grade adhesive grade AS 110 on one side, and was about 2 mils thick. Another sheet of this nonporous polyester film was attached to the other surface of the web. However, the sheet on one surface of the web was shorter than the other, to provide an application zone 150. The shorter sheet of nonporous film was trimmed before attachment to the web, and provided an application zone of about 3 mm.

A series of test specimens were cut from this composite 0.5 cm×6.0 cm, their length being in the cross machine direction (CMD), i.e., the length of the 5×60 mm strip is perpendicular to the length of the 54×106 cm rectangular sheet from which it was cut.

All of the devices were tested in the following manner:

Samples of 20 μL of freshly drawn blood with anticoagulant were measured by pipette and then placed about at application zone 150, e.g., 0.1 to 0.2 cm from the end of the webs 1.

With respect to the devices configured in accordance with FIG. 27, the blood was then observed to spread along the length of the web 1 and into web 1111, and clear plasma appeared ahead of the red cells within about 10 seconds.

With respect to the devices configured in accordance with FIG. 28, the blood was then observed to spread along the length of the web 1, and clear plasma appeared ahead of the red cells within about 10 seconds.

For all of the tests, the plasma front continued to advance, until wicking stopped. The time to completion, i.e., the time from when the sample first contacted the strip, to the time that the sample was fully imbibed and flow stopped, was determined. The length of the strip wetted by the plasma, and the length of the strip wetted by the red blood cells was measured, and the efficiency of plasma collection or recovery was then calculated as described earlier as method #3. The plasma collection efficiency was determined as shown in Table XII.

TABLE XII

| Device Example # | Hematocrit, % | Length of Section, mm | | Plasma Recovery, % | Time to Completion, Seconds |
|---|---|---|---|---|---|
| | | Red Cell | Plasma | | |
| 61E | 40 | 22.2 | 10.6 | 32 | 547 |
| 61F | 40 | 21.0 | 11.0 | 34 | 489 |
| 61G | 40 | 17.4 | 17.0 | 49 | 266 |
| 61H | 40 | 14.6 | 16.1 | 52 | 143 |
| 61I | 40 | 18.6 | 15.4 | 45 | 355 |
| 61J | 40 | 17.7 | 15.0 | 46 | 296 |

As shown in Table XII, the plasma separation efficiency for devices including different types of fibrous media (FIG. 27 configuration) is greater than for those devices including a single type of fibrous medium (FIG. 28 configuration).

For example, the device configured as Example 61H, containing as Medium 10 mm of a medium described in Example 61D and as Medium 11 30 mm of a medium described in Example 61B, yielded higher plasma recovery (over 50%) and a faster time to completion than a device configured as 61F (which contains a single type of fibrous medium, described in Example 61B).

The data further described the effect of shorter distances of decrease in thickness of the Medium 1 of FIG. 27. Shortening the distance had a small effect on plasma recovery (compare (Example 61H to Example 61G) and (Example 61J to Example 61I)) but had a larger effect on time to completion (again compare (Example 61H to Example 61G) and (Example 61J to Example 61I). Decreasing the thickness of Medium 1 had a pronounced effect on time to completion. For instance, when the Medium 1 thickness went from 0.0371 (as in Example 61H) to 0.0305 (as in Example 61J), the time required to imbibe and wick the drop of blood doubled (from 143 sec. to 296 sec.).

EXAMPLE 62

A series of devices generally corresponding to the configuration to that shown in FIG. 27 are constructed as described in Example 61.

The devices are used for a blood glucose test. Glucose oxidase and an organic redox dye are added to fibrous web 1111 at preselected locations, so that the clear plasma passing into the web 1111 contacts both the glucose oxidase enzyme system and the organic redox dye. The blood glucose contacts the glucose oxidase, and through a series of enzyme directed reactions, the dye is chemically modified to cause a color change. The color change is compared to a reference standard, and the blood glucose level is determined.

All of the references cited herein, including publications, patents, and patent applications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method for preparing a melt-blown fibrous nonwoven web, comprising surface modifying a melt-blown fibrous non-woven web characterized by a 2 cm lateral flow time of about 40 seconds or less in a first direction to alter the critical wetting surface tension (CWST) of the web to between about 65 and about 100 dynes/cm so as to obtain a desired LFT.

2. A method for preparing a melt-blown fibrous nonwoven web, comprising surface modifying a melt-blown fibrous non-woven web characterized by a 4 cm lateral flow time of about 225 seconds or less in a first direction to alter the critical wetting surface tension (CWST) of the web to between about 65 and about 100 dynes/cm so as to obtain a desired LFT.

3. The method of claim 1, wherein 90% of the fibers of said web have a diameter ranging from a minimum fiber diameter to a maximum fiber diameter which is no more than about three times the minimum fiber diameter.

4. The web of claim 2, wherein 90% of the fibers of said web have a diameter ranging from a minimum fiber diameter to a maximum fiber diameter which is no more than about three times the minimum fiber diameter.

5. A method for preparing a melt-blown fibrous nonwoven web, comprising modifying a melt-blown fibrous nonwoven web characterized by a 2 cm lateral flow time of about 40 seconds or less in a first direction to alter the voids volume of the web so as to obtain a desired LFT.

6. A method for preparing a melt-blown fibrous nonwoven web, comprising modifying a melt-blown fibrous nonwoven web characterized by a 4 cm lateral flow time of about 225 seconds or less in a first direction to alter the voids volume of the web so as to obtain a desired LFT.

7. A method for preparing a melt-blown fibrous nonwoven web, which method comprises preparing a melt-blown fibrous nonwoven web characterized by a 2 cm lateral flow time of about 40 seconds or less in a first direction with hydrophilic oriented fibers with an average fiber diameter in the range of about 1 to about 25 μm so as to obtain a desired lateral flow time.

8. A method for preparing a melt-blown fibrous nonwoven web, which method comprises preparing a melt-blown fibrous nonwoven web characterized by a 4 cm lateral flow time of about 225 seconds or less in a first direction with hydrophilic oriented fibers with an average fiber diameter in the range of about 1 to about 25 μm so as to obtain a desired lateral flow time.

9. The method of claim 7, wherein the average fiber diameter is in the range of about 2 to about 15 μm.

10. The method of claim 7, wherein said hydrophilic oriented fibers are of a copolymer of about 80% nylon and 20% polyethylene-oxide-diamine.

11. The method of claim 7, wherein said hydrophilic oriented fibers are of a copolymer of about 80% nylon and 20% polyethylene-oxide-diamine.

12. The method of claim 8, wherein the average fiber diameter is in the range of about 2 to about 15 μm.

13. The method of claim 8, wherein said hydrophilic oriented fibers are of a copolymer of about 80% nylon and 20% polyethylene-oxide-diamine.

14. The method of claim 8, wherein said hydrophilic oriented fibers are of a copolymer of about 80% nylon and 20% polyethylene-oxide-diamine.

15. The method of claim 1, wherein the web has a lateral flow time (LFT) in a second direction 90° to the first direction that is different than the LFT in the first direction.

16. The method of claim 2, wherein the web has a lateral flow time (LFT) in a second direction 90° to the first direction that is different than the LFT in the first direction.

17. The method of claim 5, wherein the voids volume is in the range from about 60% to about 90%.

18. The method of claim 6, wherein the voids volume is in the range from about 60% to about 90%.

19. A device for processing a biological fluid comprising a first melt-blown fibrous web, a second melt-blown fibrous web, and an isotropic, skinless, polyvinylidene fluoride membrane interposed between the first and second webs, said device allowing fluid communication between the first and second melt-blown fibrous webs and through the membrane, wherein at least the first melt-blown fibrous web comprises fibers such that 90% of said fibers have a diameter ranging from a minimum fiber diameter to a maximum fiber diameter which is no more than about three times the minimum fiber diameter, and wherein said first melt-blown fibrous web has a critical wetting surface tension (CWST) at least about 65 dynes/cm.

20. The device of claim 19, wherein said membrane has a titer reduction of at least about $10^8$ against $T_1$ bacteriophage.

21. The device of claim 19, wherein said membrane has a $K_{UF}$ of at least about 15 psi when tested using liquid pairs having an interfacial tension of about 4 dynes/cm.

22. A method for detecting an analyte in a biological fluid comprising:

contacting a melt-blown fibrous web with a biological fluid containing at least one analyte and other substances, said web comprising fibers such that 90% of said fibers have a diameter ranging from a minimum fiber diameter to a maximum fiber diameter which is no more than about three times the minimum fiber diameter;

passing the biological fluid through the web and separating at least one analyte from at least a portion of the other substances in the biological fluid;

amplifying at least a portion of the analyte; and detecting the analyte.

23. The method of claim 22 wherein amplifying at least a portion of the analyte includes amplifying at least a portion of a nucleic acid present in the analyte.

24. The method of claim 23 wherein amplification includes utilizing a polymerase chain reaction.

25. The method of claim 22 wherein the biological fluid comprises blood, and at least one analyte comprises a virus.

26. A melt-blown fibrous nonwoven web having a weight distribution varying by less than about 10% over a unit area wherein the web is substantially free of roping, twinning, and shot.

27. The web of claim 26 having a weight distribution varying by less than about 5% over the unit area.

28. The web of claim 27 having a weight distribution varying by less than about 1% over the unit area.

29. The web of claim 26 having a weight distribution varying by less than about 10% when measured in both the longitudinal and transverse directions, said weight distribution measured along 0.64×13 cm areas and on 2.54 cm squares.

30. The web of claim 27 having a weight distribution varying by less than about 5% when measured in both the longitudinal and transverse directions, said weight distribution measured along 0.64×13 cm areas and on 2.54 cm squares.

31. The web of claim 26, wherein the web comprises a polymer selected from the group consisting of polybutylene terephthalate, polyethylene terephthalate, nylon 6, nylon 66, and a polyamide-polyether copolymer.

32. The web of claim 26, having a plurality of layers.

33. The web of claim 26, having a voids volume in the range of from about 60% to about 94%.

34. The web of claim 33, having a voids volume in the range of from about 65% to about 90%.

35. The web of claim 26, having a basis weight in the range of from about 0.02 g/cm$^2$ to about 0.05 g/cm$^2$.

36. The web of claim 26, comprising fibers such that at least about 90% of the fibers have a diameter ranging from a minimum fiber diameter to a maximum fiber diameter which is no more than about three times the minimum fiber diameter.

37. A melt-blown fibrous nonwoven web having a weight distribution varying by less than about 5% over a unit area, the web having a voids volume in the range of from about 60% to about 94% wherein the web is substantially free of roping, twinning, and shot.

38. The web of claim 37, wherein the fibers have an average fiber diameter of less than about 50 µm.

39. A melt-blown fibrous nonwoven web having a weight distribution varying by less than about 10% over a unit area, wherein the web is substantially free of roping, twinning, and shot, wherein the web comprises a polymer selected from the group consisting of polybutylene terephthalate, polypropylene, polyethylene, polymethylpentene, polychlorotrifluoroethylene, polyphenyl sulfide, poly(1,4-cyclohexylene dimethylene terephthalate), PETG, a polyester polymerized with an excess of glycol, nylon 6 copolymer of 80% nylon 6 with 20% polyethylene-oxide-diamine.

40. A device comprising melt-blown fibrous nonwoven web having a weight distribution varying by less than about 10% over a unit area, wherein the web is substantially free of roping, twinning, and shot, disposed in a housing.

41. The device of claim 40, wherein the housing includes an inlet and an outlet and defines a fluid flow path between the inlet and the outlet, and the web is disposed across the fluid flow path.

42. The device of claim 41, wherein the web comprises a plurality of layers.

43. The device of claim 41, comprising a plurality of melt-blown fibrous nonwoven webs.

44. A method of processing a fluid comprising contacting a melt-blown fibrous nonwoven web with the fluid, the web having a weight distribution varying by less than about 10% over a unit area wherein the web substantially free of roping, twinning, and shot.

* * * * *